US012798233B2

(12) United States Patent
Yamada

(10) Patent No.: US 12,798,233 B2
(45) Date of Patent: Nov. 17, 2026

(54) HEAD UNIT AND LIQUID EJECTION APPARATUS

(71) Applicant: SEIKO EPSON CORPORATION, Tokyo (JP)

(72) Inventor: Toshimichi Yamada, Chino (JP)

(73) Assignee: SEIKO EPSON CORPORATION (JP)

( * ) Notice: Subject to any disclaimer, the term of this patent is extended or adjusted under 35 U.S.C. 154(b) by 104 days.

(21) Appl. No.: 19/079,915

(22) Filed: Mar. 14, 2025

(65) Prior Publication Data

US 2025/0289218 A1 Sep. 18, 2025

(30) Foreign Application Priority Data

Mar. 15, 2024 (JP) ................................ 2024-041320

(51) Int. Cl.

| | |
|---|---|
| ***B41J 2/045*** | (2006.01) |
| ***B41J 2/14*** | (2006.01) |
| *B41J 2/01* | (2006.01) |

(52) U.S. Cl.

CPC ......... *B41J 2/04541* (2013.01); *B41J 2/0451* (2013.01); *B41J 2/04581* (2013.01); *B41J 2/04588* (2013.01); *B41J 2/14* (2013.01); *B41J 2/14233* (2013.01); *B41J 2/01* (2013.01); *B41J 2/04501* (2013.01); *B41J 2/14201* (2013.01); *B41J 2002/14354* (2013.01)

(58) Field of Classification Search

CPC .. B41J 2/04541; B41J 2/0451; B41J 2/04581; B41J 2/04588; B41J 2/14; B41J 2/14233; B41J 2/01; B41J 2/04501; B41J 2/14201; B41J 2002/14354

See application file for complete search history.

(56) References Cited

U.S. PATENT DOCUMENTS

2015/0054876 A1* 2/2015 Nakazawa ........... B41J 2/04541 347/14
2021/0094282 A1* 4/2021 Takagi ................. B41J 2/04536
2022/0134740 A1* 5/2022 Saito ...................... B41J 2/0451 347/10

FOREIGN PATENT DOCUMENTS

JP 2015-039856 A 3/2015

* cited by examiner

*Primary Examiner* — Henok D Legesse
(74) *Attorney, Agent, or Firm* — Harness, Dickey & Pierce, P.L.C.

(57) ABSTRACT

A head unit includes: a first pressure chamber and a second pressure chamber; a nozzle communicating with the first pressure chamber and the second pressure chamber; a first piezoelectric element configured to output a first residual vibration signal; a second piezoelectric element configured to output a second residual vibration signal; and a residual vibration signal acquisition circuit configured to acquire a composite residual vibration signal, in which the residual vibration signal acquisition circuit includes a waveform shaping circuit configured to output a shaped residual vibration signal obtained by shaping a signal waveform of the composite residual vibration signal, a first hold circuit configured to hold a maximum value of the shaped residual vibration signal, a second hold circuit configured to hold a minimum value of the shaped residual vibration signal, and a period signal output circuit configured to output a residual vibration period signal.

10 Claims, 13 Drawing Sheets

| [SIH,SIM,SIL] | Sa | | Sb | | OE | | |
|---|---|---|---|---|---|---|---|
| | Pp1 | Pp2 | Pp1 | Pp2 | Ps1 | Ps2 | Ps3 |
| LD [ 1 , 1 , 0 ] | H | H | L | L | L | L | L |
| MD [ 1 , 0 , 0 ] | H | L | L | L | L | L | L |
| SD [ 0 , 1 , 0 ] | L | H | L | L | L | L | L |
| ND [ 0 , 0 , 0 ] | L | L | H | H | L | L | L |
| CD [ 1 , 1 , 1 ] | L | L | H | H | L | H | L |

HEAD UNIT AND LIQUID EJECTION APPARATUS

The present application is based on, and claims priority from JP Application Serial Number 2024-041320, filed Mar. 15, 2024, the disclosure of which is hereby incorporated by reference herein in its entirety.

BACKGROUND

1. Technical Field

The present disclosure relates to a head unit and a liquid ejection apparatus.

2. Related Art

As described in JP-A-2015-039856, in a liquid ejection apparatus in which a piezoelectric element is driven to eject ink from an ejector, it is known a technique for detecting a signal corresponding to residual vibration generated after the piezoelectric element is driven and determining a state of the ejector based on a detection result of the signal.

However, from the viewpoint of further increasing a detection speed when detecting the residual vibration generated after the piezoelectric element is driven, the technique described in JP-A-2015-039856 is not sufficient, and there is room for further improvement.

SUMMARY

A head unit according to a first aspect of the present disclosure including:

- a first pressure chamber whose volume changes according to a drive signal;
- a second pressure chamber whose volume changes according to the drive signal;
- a nozzle communicating with the first pressure chamber and the second pressure chamber and configured to allow a liquid to be ejected;
- a first piezoelectric element configured to output a first residual vibration signal according to first residual vibration generated according to a volume change of the first pressure chamber;
- a second piezoelectric element configured to output a second residual vibration signal according to second residual vibration generated according to a volume change of the second pressure chamber; and
- a residual vibration signal acquisition circuit configured to acquire a composite residual vibration signal corresponding to the first residual vibration signal and the second residual vibration signal, wherein
- the residual vibration signal acquisition circuit includes
  - a waveform shaping circuit configured to output a shaped residual vibration signal obtained by shaping a signal waveform of the composite residual vibration signal,
  - a first hold circuit configured to hold a maximum value of the shaped residual vibration signal in a predetermined period as a maximum residual vibration signal,
  - a second hold circuit configured to hold a minimum value of the shaped residual vibration signal in the predetermined period as a minimum residual vibration signal, and
  - a period signal output circuit configured to output a residual vibration period signal according to a period of the shaped residual vibration signal.

A liquid ejection apparatus according to a second aspect of the present disclosure including:

- a drive circuit configured to output a drive signal;
- a first pressure chamber whose volume changes according to the drive signal;
- a second pressure chamber whose volume changes according to the drive signal;
- a nozzle communicating with the first pressure chamber and the second pressure chamber and configured to allow a liquid to be ejected;
- a first piezoelectric element configured to output a first residual vibration signal according to first residual vibration generated according to a volume change of the first pressure chamber;
- a second piezoelectric element configured to output a second residual vibration signal according to second residual vibration generated according to a volume change of the second pressure chamber; and
- a residual vibration signal acquisition circuit configured to acquire a composite residual vibration signal corresponding to the first residual vibration signal and the second residual vibration signal, wherein
- the residual vibration signal acquisition circuit includes
  - a waveform shaping circuit configured to output a shaped residual vibration signal obtained by shaping a signal waveform of the composite residual vibration signal,
  - a first hold circuit configured to hold a maximum value of the shaped residual vibration signal in a predetermined period as a maximum residual vibration signal,
  - a second hold circuit configured to hold a minimum value of the shaped residual vibration signal in the predetermined period as a minimum residual vibration signal, and
  - a period signal output circuit configured to output a residual vibration period signal according to a period of the shaped residual vibration signal.

DESCRIPTION OF EMBODIMENTS

A preferred embodiment of the present disclosure will hereinafter be described using the drawings. The drawings to be used are for the sake of convenience of description. The embodiment to be described below does not unduly limit contents of the present disclosure described in the claims. All configurations to be described below are not necessarily essential elements of the present disclosure.

1. CONFIGURATION OF LIQUID EJECTION APPARATUS

Figure 1:
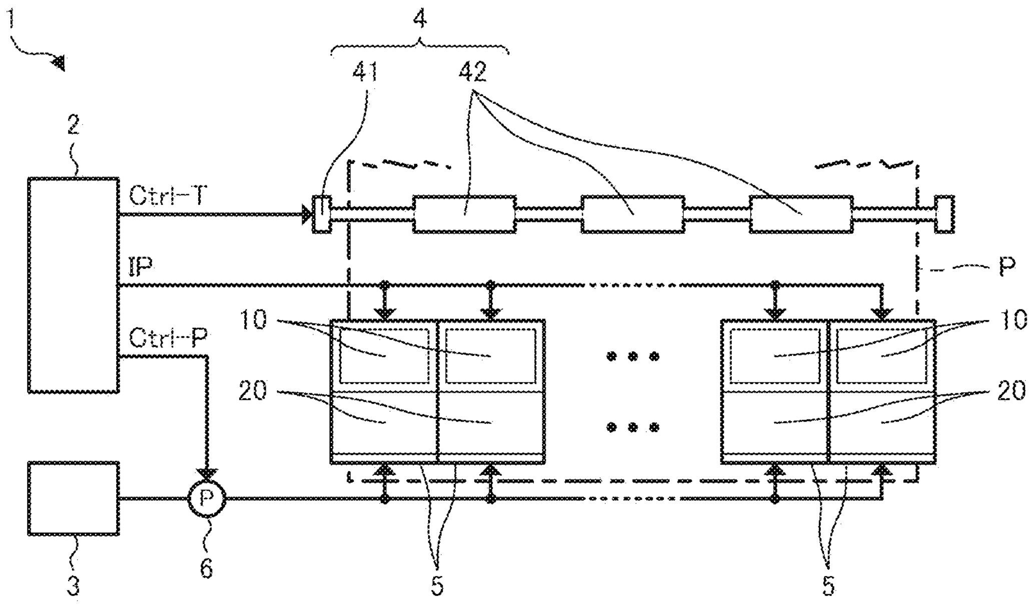
FIG. 1 is a diagram showing a schematic configuration of a liquid ejection apparatus.

FIG. 1 is a diagram showing a schematic configuration of a liquid ejection apparatus 1. As shown in FIG. 1, the liquid ejection apparatus 1 is a so-called line type inkjet printer that ejects ink, which is an example of a liquid, at a desired timing to a medium P conveyed by a conveyance unit 4 to form a desired image on the medium P. The liquid ejection apparatus 1 is not limited to the line type inkjet printer, and may be a serial type inkjet printer. Further, the liquid ejection apparatus 1 is not limited to the inkjet printer, and may be a color material ejection apparatus used for manufacturing a color filter for a liquid crystal display or the like, an electrode material ejection apparatus used for forming an electrode for an organic EL display, a field emission display (FED), or the like, or a bioorganic material ejection apparatus used for manufacturing a biochip, and further may be a three-dimensional shaping apparatus, a textile printing apparatus, or the like. Here, in the following description, a direction in which the medium P is conveyed may be referred to as a conveyance direction, and a width direction of the medium P thus conveyed may be referred to as a scanning direction.

As shown in FIG. 1, the liquid ejection apparatus 1 includes a control unit 2, a liquid container 3, a conveyance unit 4, a plurality of ejection units 5, and a circulation unit 6.

The control unit 2 includes a processing circuit such as a central processing unit (CPU) or a field programmable gate array (FPGA), and a storage circuit such as a semiconductor memory device. The control unit 2 outputs a signal for controlling each element of the liquid ejection apparatus 1 based on image data supplied from an external device such as a host computer (not shown) disposed outside the liquid ejection apparatus 1.

The liquid container 3 retains ink serving as an example of a liquid to be supplied to the ejection units 5. Specifically, the liquid container 3 retains ink of a plurality of colors to be ejected to the medium P, such as black ink, cyan ink, magenta ink, yellow ink, red ink, and gray ink. As such a liquid container 3, an ink cartridge, an ink pack that is shaped like a bag and is formed of a flexible film, an ink tank in which ink can be replenished, or the like may be used.

The circulation unit 6 supplies the ink retained in the liquid container 3 to the ejection units 5 based on a circulation control signal Ctrl-P output by the control unit 2. Further, the circulation unit 6 also collects the ink discharged from the ejection units 5 based on the circulation control signal Ctrl-P output by the control unit 2. That is, the circulation unit 6 causes the ink to circulate in the liquid ejection apparatus 1. Such a circulation unit 6 may include, for example, a pump for generating a flow of the ink in the liquid ejection apparatus 1.

The conveyance unit 4 includes a conveyance motor 41 and conveyance rollers 42. A conveyance control signal Ctrl-T output by the control unit 2 is input to the conveyance unit 4. The conveyance motor 41 operates based on the conveyance control signal Ctrl-T, and the conveyance rollers 42 rotate due to the operation of the conveyance motor 41. The medium P is conveyed along a conveyance direction by the rotation of the conveyance rollers 42.

Each of the plurality of ejection units 5 includes a drive module 10 and an ejection module 20. A corresponding image information signal IP output by the control unit 2 is input to each of the plurality of ejection units 5, and the ink retained in the liquid container 3 is supplied to each of the plurality of ejection units 5. The drive module 10 controls an operation of the ejection module 20 based on the image information signal IP. Accordingly, the ejection module 20 ejects the ink supplied from the liquid container 3 at a predetermined timing according to the control of the drive module 10.

In the liquid ejection apparatus 1 according to the embodiment, the ejection modules 20 respectively provided in the plurality of ejection units 5 are located side by side along a scanning direction so as be equal to or longer than a width of the medium P. The drive module 10 of each of the plurality of ejection units 5 causes the ejection module 20 to eject ink at a timing synchronized with the conveyance of the medium P. The ink ejected from each of the plurality of ejection modules 20 lands on a desired position of the medium P. Accordingly, a desired image is formed on the medium P.

Figure 2:
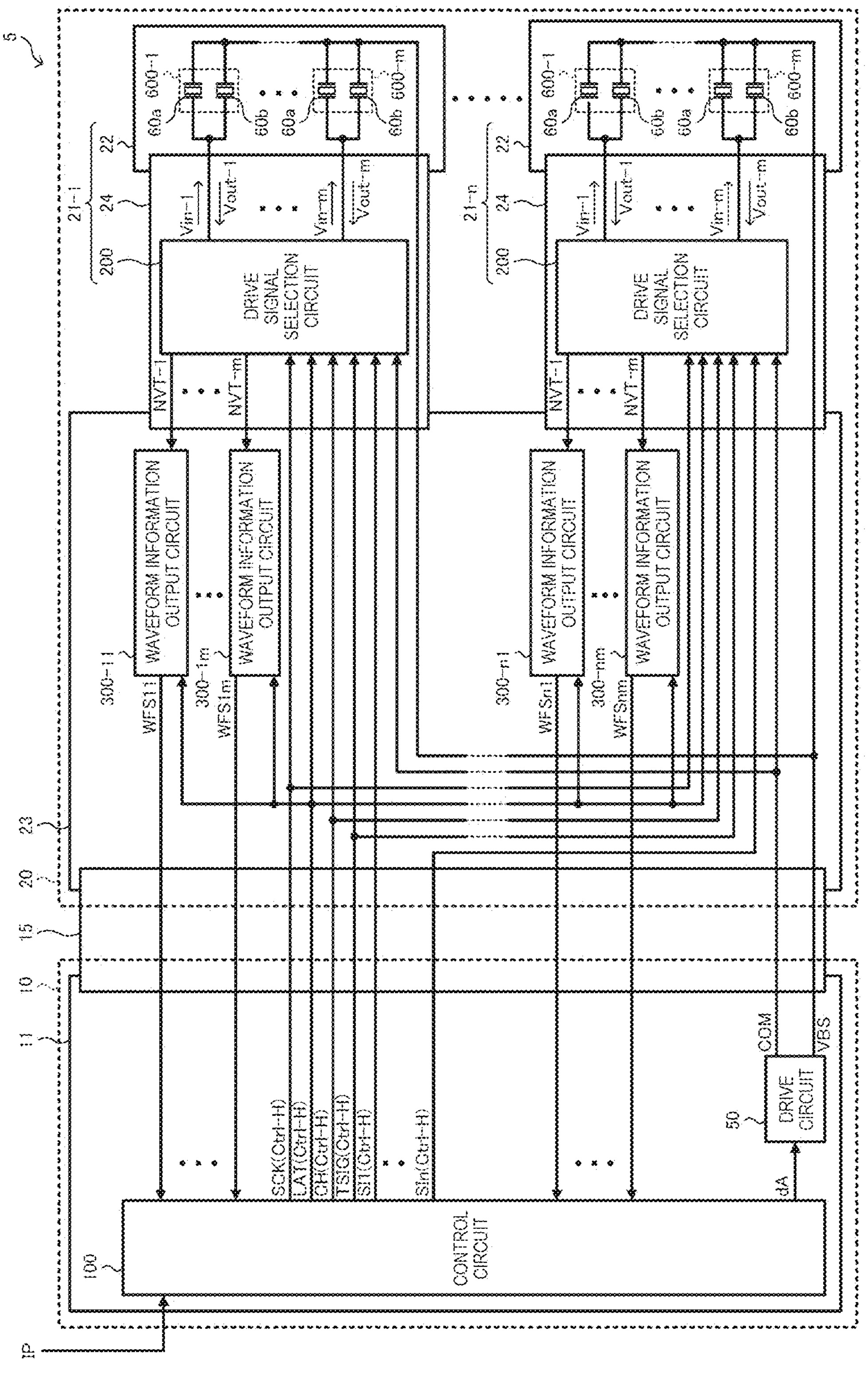
FIG. 2 is a diagram showing a schematic configuration of an ejection unit.

Next, a schematic configuration of the ejection unit 5 will be described. FIG. 2 is a diagram showing a schematic configuration of the ejection unit 5. As shown in FIG. 2, the ejection unit 5 includes the drive module 10 and the ejection module 20. In the ejection unit 5, the drive module 10 and the ejection module 20 are electrically coupled to each other via a cable 15. Here, examples of the cable 15 for electrically connecting the drive module 10 and the ejection module 20 include a flexible flat cable (FFC) or a flexible printed circuit (FPC). The drive module 10 and the ejection module 20 may be electrically coupled to each other with a board to board (BtoB) connector without using the cable 15, or may be electrically coupled to each other with both the cable 15 and the BtoB connector.

The drive module 10 includes a control circuit board 11, a drive circuit 50, and a control circuit 100. The control circuit board 11 is a printed circuit board having a single wiring layer or a plurality of wiring layers, and a glass epoxy board, a glass polyimide board, or the like may be used as the control circuit board 11. Elements configuring the drive module 10 including the drive circuit 50 and the control circuit 100 are mounted on the control circuit board 11. The control circuit board 11 on which the elements configuring the drive module 10 are mounted may be formed of a single printed circuit board or a plurality of printed circuit boards.

The control circuit 100 is a processor, and includes, for example, a processing circuit such as a CPU or an FPGA and a storage circuit such as a semiconductor memory. The image information signal IP output by the control unit 2 is input to the control circuit 100. The control circuit 100 generates signals for controlling operations of the drive module 10 and the ejection module 20 based on the image information signal IP input to the control circuit 100, and then outputs the signals.

Specifically, the control circuit 100 generates a clock signal SCK, a latch signal LAT, a change signal CH, an inspection timing signal TSIG, and print data signals SI1 to SIn based on the image information signal IP input to the control circuit 100, and then outputs these signals to the ejection module 20.

Further, the control circuit 100 generates a base drive signal dA and outputs the base drive signal dA to the drive circuit 50. The drive circuit 50 generates a drive voltage signal COM including a signal waveform defined by the base drive signal dA input to the drive circuit 50, and then outputs the drive voltage signal COM to the ejection module 20. Specifically, the control circuit 100 generates the base drive signal dA as a digital signal and then outputs the base drive signal dA to the drive circuit 50. The drive circuit 50 converts the base drive signal dA which is a digital signal input to the drive circuit 50 into an analog signal, and then performs class-D amplification on the converted analog signal to generate the drive voltage signal COM. The drive circuit 50 outputs the generated drive voltage signal COM to the ejection module 20. That is, the control circuit 100 outputs the base drive signal dA that defines a signal waveform of the drive voltage signal COM output by the drive circuit 50. The base drive signal dA may be an analog signal as along as the signal that can define the signal waveform of the drive voltage signal COM. The drive circuit 50 may generate the drive voltage signal COM by amplifying the signal waveform defined by the base drive signal dA, and may generate the drive voltage signal COM by performing class-A amplification, class-B amplification, or class-AB amplification instead of or in addition to the class-D amplification.

The drive circuit 50 generates a reference voltage signal VBS and then outputs the reference voltage signal VBS to the ejection module 20. The reference voltage signal VBS is a signal that is constant in voltage value, and that defines a reference potential for driving piezoelectric elements 60*a* and 60*b* to be described later. The voltage value of such a reference voltage signal VBS may be, for example, the ground potential, or may be 5.5 V, 6 V, or the like. In FIG. 2, it is assumed that the drive circuit 50 generates the reference voltage signal VBS, and outputs the reference voltage signal VBS to the ejection module 20, but the reference voltage signal VBS may be generated by a constant voltage output circuit or the like (not shown) that is provided separately from the drive circuit 50.

The control circuit 100 receives waveform information signals WFS11 to WFS1*m*, WFS21 to WFS2*m* . . . WFSn1 to WFSnm from the ejection modules 20, which will be described later. The control circuit 100 determines whether ejection states of ink from the ejection modules 20 are normal based on the input waveform information signals WFS11 to WFS1*m*, WFS21 to WFS2*m* . . . WFSn1 to WFSnm. Details of the waveform information signals WFS11 to WFS1*m*, WFS21 to WFS2*m* . . . WFSn1 to WFSnm input to the control circuit 100, and details of a method for determining whether the ejection states of the ink from the ejection modules 20 based on the waveform information signals WFS11 to WFS1*m*, WFS21 to WFS2*m* . . . WFSn1 to WFSnm are normal will be described later.

The ejection modules 20 include print heads 21-1 to 21-*n*, a head circuit board 23, and waveform information output circuits 300-11 to 300-1*m*, 300-21 to 300-2*m* . . . 300-*n*1 to 300-*nm*. Further, each of the print heads 21-1 to 21-*n* includes a head chip 22, a flexible board 24, and a drive signal selection circuit 200. Further, each of the head chips 22 provided respectively in the print heads 21-1 to 21-*n* includes ejectors 600-1 to 600-*m*, and further each of the ejectors 600-1 to 600-*m* includes piezoelectric elements 60*a* and 60*b*.

The clock signal SCK, the latch signal LAT, the change signal CH, the inspection timing signal TSIG, the print data signals SI1 to SIn, the drive voltage signal COM, and the reference voltage signal VBS output by the drive module 10 are input to the ejection module 20.

The head circuit board 23 propagates the clock signal SCK, the latch signal LAT, the change signal CH, the inspection timing signal TSIG, the print data signals SI1 to SIn, the drive voltage signal COM, and the reference voltage signal VBS, which are input to the head circuit board 23, to the corresponding print heads 21-1 to 21-*n*. Such a head circuit board 23 is a printed circuit board having a single wiring layer or a plurality of wiring layers, and the head circuit board 23 may be, for example, a glass epoxy board or a glass polyimide board.

Specifically, among the clock signal SCK, the latch signal LAT, the change signal CH, the inspection timing signal TSIG, the print data signals SI1 to SIn, the drive voltage signal COM, and reference voltage signal VBS, the head circuit board 23 propagates the clock signal SCK, the latch signal LAT, the change signal CH, the inspection timing signal TSIG, the print data signal SI1, the drive voltage signal COM, and the reference voltage signal VBS, which are input to the head circuit board 23, to the print head 21-1, and propagates the clock signal SCK, the latch signal LAT, the change signal CH, the inspection timing signal TSIG, the print data signal SIn, the drive voltage signal COM, and the reference voltage signal VBS to the print head 21-*n*.

Among the clock signal SCK, the latch signal LAT, the change signal CH, the inspection timing signal TSIG, the print data signals SI1, the drive voltage signal COM, and the reference voltage signal VBS which are input to the print head 21-1, the clock signal SCK, the latch signal LAT, the change signal CH, the inspection timing signal TSIG, the print data signal SI1, and the drive voltage signal COM are input to the drive signal selection circuit 200 of the print head 21-1. The drive signal selection circuit 200 of the print head 21-1 selects or deselects a signal waveform contained in the drive voltage signal COM based on the clock signal SCK, the latch signal LAT, the change signal CH, the inspection timing signal TSIG, and the print data signal SI1 that are input to the drive signal selection circuit 200 of the print head 21-1 to generate drive voltage signals Vin-1 to Vin-m.

The drive voltage signals Vin-1 to Vin-m output from the drive signal selection circuit 200 of the print head 21-1 are supplied to the corresponding ejectors 600-1 to 600-*m* of the head chip 22 of the print head 21-1. Specifically, among the drive voltage signals Vin-1 to Vin-m output from the drive signal selection circuit 200 of the print head 21-1, the drive voltage signal Vin-1 is supplied to one ends of the piezoelectric elements 60*a* and 60*b* provided in the ejector 600-1 of the head chip 22 of the print head 21-1, and the drive voltage signal Vin-m is supplied to one ends of the piezoelectric elements 60*a* and 60*b* provided in the ejector 600-*m* of the head chip 22 of the print head 21-1. In this case, the reference voltage signal VBS is commonly input to the other ends of the piezoelectric elements 60*a* and 60*b* provided in each of the ejectors 600-1 to 600-*m* of the head chip 22 of the print head 21-1. The piezoelectric elements 60*a* and 60*b* provided in each of the ejectors 600-1 to 600-*m* of the head chip 22 of the print head 21-1 are driven according to potential differences between voltage values of the corresponding drive voltage signals Vin-1 to Vin-m supplied to the one ends and a voltage value of the reference voltage signal VBS supplied to the other ends. Ink with an amount corresponding to the drive of the piezoelectric elements 60*a* and 60*b* is ejected from the ejectors 600-1 to 600-*m* of the print head 21-1.

Further, in the ejectors 600-1 to 600-*m* provided in the head chip 22 of the print head 21-1, residual vibration is generated after the piezoelectric elements 60*a* and 60*b* provided in each of the ejectors 600-1 to 600-*m* are driven. The piezoelectric elements 60*a* and 60*b* provided in each of the ejectors 600-1 to 600-*m* of the head chip 22 of the print head 21-1 are displaced due to the residual vibration generated in the corresponding ejectors 600-1 to 600-*m*. The piezoelectric elements 60*a* and 60*b* provided in each of the ejectors 600-1 to 600-*m* of the print head 21-1 output residual vibration signals Vout-1 to Vout-m corresponding to the displacement. The residual vibration signals Vout-1 to Vout-m are input to the drive signal selection circuit 200 of the print head 21-1. Then, the drive signal selection circuit 200 of the print head 21-1 generates residual vibration detection signals NVT-1 to NVT-m corresponding to the input residual vibration signals Vout-1 to Vout-m, and outputs the residual vibration detection signals NVT-1 to NVT-m from the print head 21-1.

Specifically, after the piezoelectric elements 60*a* and 60*b* provided in the ejector 600-1 of the head chip 22 of the print head 21-1 are driven, a signal corresponding to the residual vibration generated in the ejector 600-1 is input as the residual vibration signal Vout-1 to the drive signal selection circuit 200 of the print head 21-1, and after the piezoelectric elements 60*a* and 60*b* provided in the ejector 600-*m* of the head chip 22 of the print head 21-1 are driven, a signal corresponding to the residual vibration generated in the ejector 600-*m* is input as the residual vibration signal Vout-m to the drive signal selection circuit 200 of the print head 21-1. Then, the drive signal selection circuit 200 of the print head 21-1 generates the residual vibration detection signal NVT-1 corresponding to the input residual vibration signal Vout-1, and outputs the residual vibration detection signal NVT-1 from the print head 21-1, and generates the residual vibration detection signal NVT-m corresponding the input residual vibration signal Vout-m, and outputs the residual vibration detection signal NVT-m from the print head 21-1.

Such a drive signal selection circuit 200 provided in the print head 21-1 is configured as an integrated circuit device, and may be chip on film (COF)-mounted on the flexible board 24 provided in the print head 21-1.

Among the clock signal SCK, the latch signal LAT, the change signal CH, the inspection timing signal TSIG, the print data signal SIn, the drive voltage signal COM, and the reference voltage signal VBS which are input to the print head 21-*n*, the clock signal SCK, the latch signal LAT, the change signal CH, the inspection timing signal TSIG, the print data signal SIn, and the drive voltage signal COM are input to the drive signal selection circuit 200 of the print head 21-*n*. The drive signal selection circuit 200 of the print head 21-*n* selects or deselects a signal waveform contained in the drive voltage signal COM based on the clock signal SCK, the latch signal LAT, the change signal CH, the inspection timing signal TSIG, and the print data signal SIn that are input to the drive signal selection circuit 200 of the print head 21-*n* to generate drive voltage signals Vin-1 to Vin-m.

The drive voltage signals Vin-1 to Vin-m output from the drive signal selection circuit 200 of the print head 21-*n* are supplied to the corresponding ejectors 600-1 to 600-*m* provided in the head chip 22 of the print head 21-*n*. Specifically, among the drive voltage signals Vin-1 to Vin-m output from the drive signal selection circuit 200 of the print head 21-*n*, the drive voltage signal Vin-1 is supplied to one ends of the piezoelectric elements 60*a* and 60*b* provided in the ejector 600-1 of the head chip 22 of the print head 21-*n*, and the drive voltage signal Vin-m is supplied to one ends of the piezoelectric elements 60*a* and 60*b* provided in the ejector 600-*m* of the head chip 22 of the print head 21-*n*. In this case, the reference voltage signal VBS is commonly input to the other ends of the piezoelectric elements 60*a* and 60*b* provided in each of the ejectors 600-1 to 600-*m* of the head chip 22 of the print head 21-*n*. The piezoelectric elements 60*a* and 60*b* provided in each of the ejectors 600-1 to 600-*m* of the head chip 22 of the print head 21-*n* are driven according to potential differences between voltage values of the corresponding drive voltage signals Vin-1 to Vin-m supplied to the one ends and a voltage value of the reference voltage signal VBS supplied to the other ends. Ink with an amount corresponding to the drive of the piezoelectric elements 60*a* and 60*b* is ejected from the ejectors 600-1 to 600-*m* of the print head 21-*n*.

Further, in the ejectors 600-1 to 600-*m* provided in the head chip 22 of the print head 21-*n*, residual vibration is generated after the piezoelectric elements 60*a* and 60*b* provided in each of the ejectors 600-1 to 600-*m* are driven. The piezoelectric elements 60*a* and 60*b* provided in each of the ejectors 600-1 to 600-*m* of the head chip 22 of the print head 21-*n* are displaced due to the residual vibration generated in the corresponding ejectors 600-1 to 600-*m*. The piezoelectric elements 60*a* and 60*b* provided in each of the ejectors 600-1 to 600-*m* of the print head 21-*n* output residual vibration signals Vout-1 to Vout-m corresponding to the displacement. The residual vibration signals Vout-1 to Vout-m are input to the drive signal selection circuit 200 of the print head 21-*n*. Then, the drive signal selection circuit 200 of the print head 21-*n* generates residual vibration detection signals NVT-1 to NVT-m corresponding to the input residual vibration signals Vout-1 to Vout-m, and outputs the residual vibration detection signals NVT-1 to NVT-m from the print head 21-*n*.

Specifically, after the piezoelectric elements 60*a* and 60*b* provided in the ejector 600-1 of the head chip 22 of the print head 21-*n* are driven, a signal corresponding to the residual vibration generated in the ejector 600-1 is input as the residual vibration signal Vout-1 to the drive signal selection circuit 200 of the print head 21-*n*, and after the piezoelectric elements 60*a* and 60*b* provided in the ejector 600-*m* of the head chip 22 of the print head 21-*n* are driven, a signal corresponding to the residual vibration generated in the ejector 600-*m* is input as the residual vibration signal Vout-m to the drive signal selection circuit 200 of the print head 21-*n*. Then, the drive signal selection circuit 200 of the print head 21-*n* generates the residual vibration detection signal NVT-1 corresponding to the input residual vibration signal Vout-1, and outputs the residual vibration detection signal NVT-1 from the print head 21-*n*, and generates the residual vibration detection signal NVT-m corresponding the input residual vibration signal Vout-m, and outputs the residual vibration detection signal NVT-m from the print head 21-*n*.

Such a drive signal selection circuit 200 provided in the print head 21-*n* is configured as an integrated circuit device, and may be COF-mounted on the flexible board 24 provided in the print head 21-*n*.

The waveform information output circuits 300-11 to 300-1*m*, 300-21 to 300-2*m* . . . 300-*n*1 to 300-*nm* are mounted on the head circuit board 23.

The latch signal LAT and the residual vibration detection signals NVT-1 to NVT-m output from the print head 21-1 are input to the waveform information output circuits 300-11 to 300-1*m*. The waveform information output circuits 300-11 to 300-1*m* acquire waveform information about the input residual vibration detection signals NVT-1 to NVT-m for each period defined by the latch signal LAT, and generate waveform information signals WFS11 to WFS1*m* including the acquired waveform information. Then, the waveform information output circuits 300-11 to 300-1*m* output the generated waveform information signals WFS11 to WFS1*m* to the control circuit 100 provided in the drive module 10.

Specifically, the residual vibration detection signal NVT-1 output from the print head 21-1 is input to the waveform information output circuit 300-11. Then, the waveform information output circuit 300-11 acquires the waveform information about the input residual vibration detection signal NVT-1 output from the print head 21-1 for each period defined by the latch signal LAT, and outputs the waveform information signal WFS11 including the acquired waveform information. That is, the waveform information output circuit 300-11 acquires the waveform information about a signal corresponding to the residual vibration of the ejector 600-1 provided in the head chip 22 of the print head 21-1 for each period defined by the latch signal LAT, and outputs the waveform information signal WFS11 including the acquired waveform information to the control circuit 100.

The residual vibration detection signal NVT-m output from the print head 21-1 is input to the waveform information output circuit 300-1*m*. The waveform information output circuit 300-1*m* acquires the waveform information about the input residual vibration detection signal NVT-m output from the print head 21-1 for each period defined by the latch signal LAT, and outputs the waveform information signal WFS1*m* including the acquired waveform information. That is, the waveform information output circuit 300-1*m* acquires the waveform information about a signal corresponding to the residual vibration of the ejector 600-*m* provided in the head chip 22 of the print head 21-1 for each period defined by the latch signal LAT, and outputs the waveform information signal WFS1*m* including the acquired waveform information to the control circuit 100.

Similarly, the latch signal LAT and the residual vibration detection signals NVT-1 to NVT-m output from the print head 21-*n* are input to the waveform information output circuits 300-*n*1 to 300-*nm*. The waveform information output circuits 300-*n*1 to 300-*nm* acquire the waveform information about the input residual vibration detection signals NVT-1 to NVT-m for each period defined by the latch signal LAT, and generate waveform information signals WFSn1 to WFSnm including the acquired waveform information. Then, the waveform information output circuits 300-*n*1 to 300-*nm* output the generated waveform information signals WFSn1 to WFSnm to the control circuit 100 provided in the drive module 10.

Specifically, the waveform information output circuit 300-*n*1 acquires the waveform information about the residual vibration detection signal NVT-1 output from the print head 21-*n* for each period defined by the latch signal LAT, and outputs the waveform information signal WFS11 including the acquired waveform information, and the waveform information output circuit 300-*nm* acquires waveform information about the residual vibration detection signal NVT-m output from the print head 21-*n* for each period defined by the latch signal LAT, and outputs the waveform information signal WFS11 including the acquired waveform information. In other words, the waveform information output circuit 300-*n*1 acquires the waveform information about a signal corresponding to the residual vibration of the ejector 600-1 provided in the head chip 22 of the print head 21-*n* for each period defined by the latch signal LAT, and outputs the waveform information signal WFSn1 including the acquired waveform information to the control circuit 100, and the waveform information output circuit 300-*nm* acquires waveform information about a signal corresponding to the residual vibration of the ejector 600-*m* provided in the head chip 22 of the print head 21-*n* for each period defined by the latch signal LAT, and outputs the waveform information signal WFSnm including the acquired waveform information to the control circuit 100.

That is, the waveform information output circuits 300-11 to 300-1*m*, 300-21 to 300-2*m* . . . 300-*n*1 to 300-*nm* individually acquire the waveform information about signals corresponding to the residual vibration of the ejectors 600-1 to 600-*m* provided in the head chip 22 of the respective print heads 21-1 to 21-*n*, and generate the waveform information signals WFS11 to WFS1*m*, WFS21 to WFS2*m* . . . WFSn1 to WFSnm corresponding to the acquired waveform information. Then, the waveform information output circuits 300-11 to 300-1*m*, 300-21 to 300-2*m* . . . 300-*n*1 to 300-*nm* output the generated waveform information signals WFS11 to WFS1*m*, WFS21 to WFS2*m* . . . WFSn1 to WFSnm to the control circuit 100 provided in the drive module 10.

The control circuit 100 individually determines whether an ejection state of ink from each of the ejectors 600-1 to 600-*m* provided in the head chip 22 of each of the print heads 21-1 to 21-*n* is normal based on the input waveform information signals WFS11 to WFS1*m*, WFS21 to WFS2*m* . . . WFSn1 to WFSnm.

Here, the waveform information output circuits 300-11 to 300-1*m* may be configured as one integrated circuit device, or may be configured as discrete components. Further, the waveform information output circuits 300-11 to 300-1*m* may be mounted on an integrated circuit device configuring the drive signal selection circuit 200 provided in the print head 21-1 together with the drive signal selection circuit 200. In addition, when the waveform information output circuits 300-11 to 300-1*m* are configured as an integrated circuit device, the integrated circuit device may be COF-mounted on the flexible board 24 provided in the print head 21-1.

Similarly, the waveform information output circuits **300-*n*1 to 300-*nm* may be configured as one integrated circuit device, or may be configured as discrete components. Further, the waveform information output circuits 300-*n*1 to 300-*nm* may be mounted on an integrated circuit device configuring the drive signal selection circuit 200 provided in the print head 21-*n* together with the drive signal selection circuit 200. In addition, when the waveform information output circuits 300-*n*1 to 300-*nm* are configured as an integrated circuit device, the integrated circuit device may be COF-mounted on the flexible board 24 provided in the print head 21-*n***.

Here, the print heads 21-1 to **21-*n* are substantially the same in configuration, and may be simply referred to as a print head 21 when there is no need to distinguish the print heads 21-1 to 21-*n* from one another. The description will be presented assuming that the clock signal SCK, the latch signal LAT, the change signal CH, the inspection timing signal TSIG, the print data signals SI serving as the print data signals SI1 to SIn, the drive voltage signal COM, and the reference voltage signal VBS are input to the print head 21, and the print head 21 outputs the residual vibration detection signals NVT-1 to NVT-m. The description will be presented assuming that the residual vibration detection signals NVT-1 to NVT-m output from the print head 21 are input to the waveform information output circuits 300-1 to 300-*m* which are waveform information output circuits 300-11 to 300-1*m*, 300-21 to 300-2*m* . . . 300-*n*1 to 300-*nm*. In this case, the description will be presented assuming that the residual vibration detection signal NVT-1 output from the print head 21 is input to the waveform information output circuit 300-1, the waveform information output circuit 300-1 outputs the waveform information signal WFS1 corresponding to the residual vibration detection signal NVT-1, the residual vibration detection signal NVT-m output from the print head 21 is input to the waveform information output circuit 300-*m*, and the waveform information output circuit 300-*m*** outputs the waveform information signal WFSm corresponding to the residual vibration detection signal NVT-m.

The waveform information output circuits 300-1 to **300-*m* have the same configuration, and may be simply referred to as a waveform information output circuit 300 when it is not necessary to distinguish the waveform information output circuits 300-1 to 300-*m* from one another. In this case, the description will be presented assuming that a residual vibration detection signal NVT which is the residual vibration detection signals NVT-1 to NVT-m output from the print head 21 is input to the waveform information output circuit 300, and the waveform information output circuit 300 outputs a waveform information signal WFS which is the waveform information signals WFS1** to WFSm.

The ejectors 600-1 to **600-*m* provided in the print head 21 have the same configuration, and may be simply referred to as an ejector 600 when there is no need to distinguish the ejectors 600-1 to 600-*m* from one another. That is, the description will be presented assuming that the print head 21 includes a plurality of the ejectors 600, that is, m ejectors 600. The description will be presented assuming that a drive voltage signal Vin which is the drive voltage signals Vin-1 to Vin-m is supplied to the ejector 600, and the ejector 600 outputs a residual vibration signal Vout which is the residual vibration signals Vout-1** to Vout-m.

2. STRUCTURE OF PRINT HEAD

Figure 3:
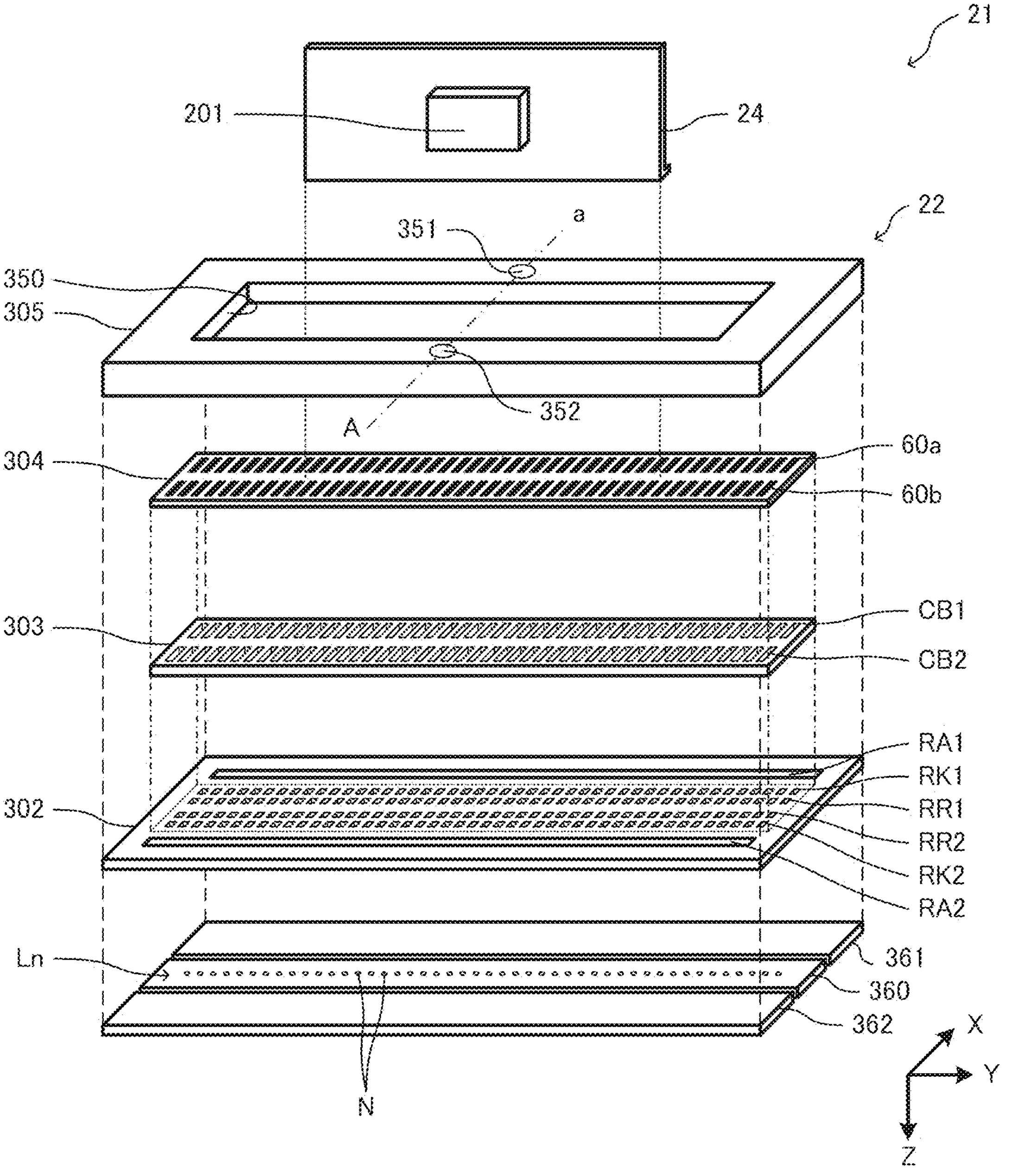
FIG. 3 is an exploded perspective view showing a print head.
Figure 4:
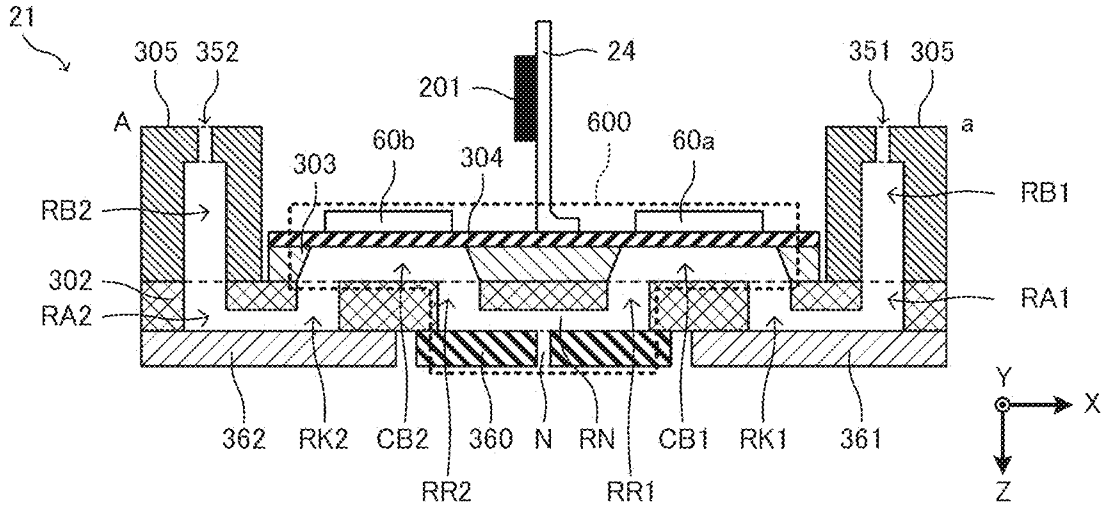
FIG. 4 is a cross-sectional view taken along a line A-a in FIG. 3.

Next, a structure of the print head 21 will be described. FIG. 3 is an exploded perspective view showing the print head 21, and FIG. 4 is a cross-sectional view taken along a line A-a in FIG. 3. Here, in the following description, the description will be presented using an X axis, a Y axis, and a Z axis orthogonal to one another. Further, in the following description, for an arrow along the X axis in the drawing, an origin side may be referred to as a −X side and a tip side may be referred to as a +X side; for an arrow along the Y axis in the drawing, an origin side may be referred to as a−Y side and a tip side may be referred to as a +Y side; and for an arrow along the Z axis in the drawing, an origin side may be referred to as a −Z side and a tip side may be referred to as a +Z side.

As shown in FIGS. 3 and 4, the print head 21 includes the head chip 22 and the flexible board 24. Further, the head chip 22 includes a nozzle substrate 360, compliance sheets 361 and 362, a communication plate 302, a pressure chamber substrate 303, a vibration plate 304, and a retention chamber formation substrate 305.

The nozzle substrate 360 is a plate-shaped member that is elongated along the Y axis and extends in substantially parallel to and along an XY plane formed of the X axis and the Y axis. The nozzle substrate 360 is provided with m nozzles N. The nozzles N are through holes provided in the nozzle substrate 360. The m nozzles N are arranged side by side along the Y axis in the nozzle substrate 360, so that a nozzle column Ln is provided in the nozzle substrate 360. Here, the expression "substantially parallel" is not limited to a case where two things are completely parallel to each other, and includes a case where the two things are assumed to be parallel to each other when taking errors or the like into consideration.

The communication plate 302 is located at the −Z side of the nozzle substrate 360. The communication plate 302 is a plate-shaped member that is elongated along the Y axis and extends in substantially parallel to the XY plane. The communication plate 302 is provided with a supply flow path RA1, a discharge flow path RA2, m coupling flow paths RK1, m coupling flow paths RK2, m communication flow paths RR1, m communication flow paths RR2, and m nozzle flow paths RN, which are a part of flow paths through which the ink flows.

The supply flow path RA1 is located at the +X side in the communication plate 302 and extends along the Y direction. The discharge flow path RA2 is located at the −X side in the communication plate 302 and extends along the Y direction. In this case, the supply flow path RA1 and the discharge flow path RA2 are formed in a manner of being substantially line symmetrical to each other with the Z axis along which the nozzle N passes through as an axis of symmetry. The m coupling flow paths RK1 are located at the −X side of the supply flow path RA1 and are arranged side by side along the Y direction. The m communication flow paths RR1 are located at the −X side of the m coupling flow paths RK1 that are arranged side by side along the Y direction, and are arranged side by side along the Y direction. The m coupling flow paths RK2 are located at the +X side of the discharge flow path RA2, and at the −X side of the m communication flow paths RR1 that are arranged side by side along the Y direction, and are arranged side by side along the Y direction. The m communication flow paths RR2 are located at the +X side of the m coupling flow paths RK2 that are arranged side by side along the Y direction, and at the −X side of the m communication flow paths RR1 that are arranged side by side along the Y direction, and are arranged side by side along the Y direction. In this case, the coupling flow path RK1 and the coupling flow path RK2 are formed in a manner of being substantially line symmetrical to each other with the Z axis along which the nozzle N passes through as an axis of symmetry, and the communication flow path RR1 and the communication flow path RR2 are formed in a manner of being substantially line symmetrical to each other with the Z axis along which the nozzle N passes through as an axis of symmetry. The nozzle flow path RN enables the communication flow path RR1 and the communication flow path RR2 corresponding to the common nozzle N to communicate with each other. Further, the nozzle substrate 360 is fixed to the communication plate 302 so that the nozzle N is located at a substantially central position in the X direction of the nozzle flow path RN when the communication plate 302 is viewed from the Z direction.

The pressure chamber substrate 303 is located at the −Z side of the communication plate 302 and is fixed to the communication plate 302. The pressure chamber substrate 303 is a plate-shaped member that is elongated in the Y axis direction and extends in substantially parallel to the XY plane. The pressure chamber substrate 303 is provided with m pressure chambers CB1 and m pressure chambers CB2, which are a part of flow paths through which the ink flows. In this case, the pressure chamber CB1 and the pressure chamber CB2 are formed in a manner of being substantially line symmetrical to each other with the Z axis along which the nozzle N passes through as an axis of symmetry.

The m pressure chambers CB1 correspond the m nozzles N in a one-to-one manner, and are arranged side by side along the Y axis. Further, each of the m pressure chambers CB1 communicates with the coupling flow path RK1 and the communication flow path RR1 corresponding to the common nozzle N. Specifically, in the pressure chamber CB1, an end portion at the +X side communicates with the coupling flow path RK1, and an end portion at the −X side communicates with the communication flow path RR1 when the pressure chamber CB1 is viewed along the Z axis. That is, the pressure chamber CB1 enables the coupling flow path RK1 and the communication flow path RR1 corresponding to the common nozzle N to communicate with each other.

Similarly, the m pressure chambers CB2 correspond to the m nozzles N in a one-to-one manner, and are located at the −X side of the m pressure chambers CB1 that are arranged side by side along the Y axis, and are arranged side by side along the Y axis. Further, each of the m pressure chambers CB2 communicates with the coupling flow path RK2 and the communication flow path RR2 corresponding to the common nozzle N. Specifically, in the pressure chamber CB2, an end portion at the −X side communicates with the coupling flow path RK2, and an end portion at the +X side communicates with the communication flow path RR2 when the pressure chamber CB2 is viewed along the Z axis. That is, the pressure chamber CB2 enables the coupling flow path RK2 and the communication flow path RR2 corresponding to the common nozzle N to communicate with each other.

The vibration plate 304 is located at the −Z side of the pressure chamber substrate 303 and is fixed to the pressure chamber substrate 303 so as to close the pressure chambers CB1 and CB2. The vibration plate 304 is a plate-shaped member that is elongated in the Y direction and extends substantially parallel to the XY plane, and is a member that can elastically vibrate. Further, the m piezoelectric elements 60*a* and the m piezoelectric elements 60*b* are arranged side by side at the −Z side of the vibration plate 304. The m piezoelectric elements 60*a* are arranged side by side along the Y axis at the −Z side of the vibration plate 304. Further, the m piezoelectric elements 60*b* are arranged side by side along the Y axis at the −Z side of the vibration plate 304 and at the −X side of the m piezoelectric elements 60*a* that are arranged side by side along the Y axis. That is, a column of the m piezoelectric elements 60*a* and a column of the m piezoelectric elements 60*b* are arranged side by side at the −Z side of the vibration plate 304.

The retention chamber formation substrate 305 is located at the −Z side of the communication plate 302. The retention chamber formation substrate 305 is a member elongated in the Y direction and includes an opening 350. Further, the retention chamber formation substrate 305 is fixed to the communication plate 302 so that the pressure chamber substrate 303, the vibration plate 304, and a wiring board 308 are located inside the opening 350. Further, the retention chamber formation substrate 305 includes a supply flow path RB1, a discharge flow path RB2, a supply port 351, and a discharge port 352. The supply flow path RB1 communicates with the supply flow path RA1. The discharge flow path RB2 communicates with the discharge flow path RA2. The supply port 351 communicates with the supply flow path RB1. The discharge port 352 communicates with the discharge flow path RB2. Further, due to an operation of the circulation unit 6, the ink retained in the liquid container 3 is supplied to the supply port 351. Accordingly, the ink is supplied to the head chip 22. Further, the ink supplied to the head chip 22 flows through the inside of the head chip 22 and is collected through the discharge port 352 by the operation of the circulation unit 6. That is, the ink supplied to the head chip 22 is returned due to the operation of the circulation unit 6.

On a −Z side surface of the vibration plate 304, the flexible board 24 is electrically coupled to the vibration plate 304 at the −X side of the column of the m piezoelectric elements 60*a* and at the +X side of the column of the m piezoelectric elements 60*b*. That is, the flexible board 24 is electrically coupled to the vibration plate 304 between the column of the m piezoelectric elements 60*a* and the column of the m piezoelectric elements 60*b* provided that are provided on the vibration plate 304. In this case, it is preferable that the flexible board 24 is electrically coupled to the vibration plate 304 so that a distance between the flexible board 24 and the column of the m piezoelectric elements 60*a* and a distance between the flexible board 24 and the column of the m piezoelectric elements 60*b* are substantially equal.

An integrated circuit 201 is COF-mounted on the flexible board 24. The drive signal selection circuit 200 described above is mounted in the integrated circuit 201. That is, the integrated circuit 201 outputs the corresponding drive voltage signal Vin to the piezoelectric elements 60*a* and 60*b* provided in each of the m ejectors 600.

That is, the flexible board 24 propagates the clock signal SCK, the latch signal LAT, the change signal CH, the inspection timing signal TSIG, the print data signal SI, the drive voltage signal COM, and the reference voltage signal VBS that are input to the print head 21. Among the clock signal SCK, the latch signal LAT, the change signal CH, the inspection timing signal TSIG, the print data signal SI, the drive voltage signal COM, and the reference voltage signal VBS that are propagated by the flexible board 24, the clock signal SCK, the latch signal LAT, the change signal CH, the inspection timing signal TSIG, the print data signal SI, and the drive voltage signal COM are input to the integrated circuit 201. The integrated circuit 201 selects or deselects a signal waveform of the drive voltage signal COM based on the clock signal SCK, the latch signal LAT, the change signal CH, the inspection timing signal TSIG, and the print data signal SI that are input to the integrated circuit 201 to generate and output the drive voltage signal Vin corresponding to each of the m ejectors 600.

The drive voltage signal Vin output from the integrated circuit 201 propagates through the flexible board 24 and is supplied to the piezoelectric element 60*a* provided in the corresponding ejector 600. Accordingly, each of the piezoelectric elements 60*a* and 60*b* provided in the corresponding ejector 600 is driven to be displaced along the Z axis. The vibration plate 304 is displaced along the Z axis by the drive of the piezoelectric elements 60*a* and 60*b*, and volumes of the pressure chambers CB1 and CB2 are changed due to the displacement of the vibration plate 304. Then, internal pressure of the pressure chambers CB1 and CB2 changes according to volume changes of the pressure chambers CB1 and CB2.

Here, the drive voltage signal Vin propagates through a wiring pattern formed on the flexible board 24, branches in the vibration plate 304, and then is supplied to each of the piezoelectric elements 60*a* and 60*b*. Accordingly, there is no need to individually provide, on the flexible board 24, a wiring pattern for propagating the drive voltage signal Vin to the piezoelectric element 60*a* and a wiring pattern for propagating the drive voltage signal Vin to the piezoelectric element 60*b*, and as a result, the flexible board 24 can be reduced in size.

In the print head 21 configured as above, a configuration including the piezoelectric elements 60*a* and 60*b*, the pressure chambers CB1 and CB2, the communication flow paths RR1 and RR2, and the nozzles N that are provided in the head chip 22 corresponds to the ejector 600 described above.

That is, the print head 21 according to the embodiment includes the pressure chamber CB1 whose volume changes according to the drive voltage signal Vin based on the drive voltage signal COM, the pressure chamber CB2 whose volume changes according to the drive voltage signal Vin based on the drive voltage signal COM, the nozzle N that communicates with the pressure chamber CB1 and the pressure chamber CB2 and ejects ink, the piezoelectric element 60*a* that is driven according to the drive voltage signal Vin based on the drive voltage signal COM and changes the volume of the pressure chamber CB1, and the piezoelectric element 60*b* that is driven according to the drive voltage signal Vin based on the drive voltage signal COM and changes the volume of the pressure chamber CB2.

In the print head 21, the ink that flows out from the pressure chamber CB1 according to a decrement in the volume of the pressure chamber CB1 and the ink that flows out from the pressure chamber CB2 according to a decrement in the volume of the pressure chamber CB2 merge at the −Z side of the nozzle N. Then, the ink merged at the −Z side of the nozzle N is ejected from the nozzle N. Accordingly, in the print head 21 according to the embodiment, it is possible to enhance drive capability as compared with a configuration in which one piezoelectric element ejects ink filled in one pressure chamber. As a result, the print head 21 according to the embodiment can increase an ejection amount of the ink, and even when ink having high viscosity is used, it is possible to achieve stable ejection characteristics.

Here, in the following description, the description will be presented assuming that when a voltage value of the drive voltage signal Vin input to the print head 21 decreases, center portions of the corresponding piezoelectric elements 60*a* and 60*b* are displaced along the Z axis toward the −Z side, and when the voltage value of the drive voltage signal Vin input to the print head 21 increases, the center portions of the corresponding piezoelectric elements 60*a* and 60*b* are displaced along the Z axis toward the +Z side. A relationship between the voltage value of the drive voltage signal Vin and the displacement of the piezoelectric elements 60*a* and 60*b* is not limited to the one described above, and when the voltage value of the drive voltage signal Vin input to the print head 21 decreases, the center portions of the corresponding piezoelectric elements 60*a* and 60*b* may be displaced along the Z axis toward the +Z side, and when the voltage value of the drive voltage signal Vin input to the print head 21 increases, the center portions of the corresponding piezoelectric elements 60*a* and 60*b* may be displaced along the Z axis toward the −Z side.

3. CONFIGURATION AND OPERATION OF DRIVE SIGNAL SELECTION CIRCUIT

3.1 Signal Waveform of Drive Voltage Signal COM

Figure 5:
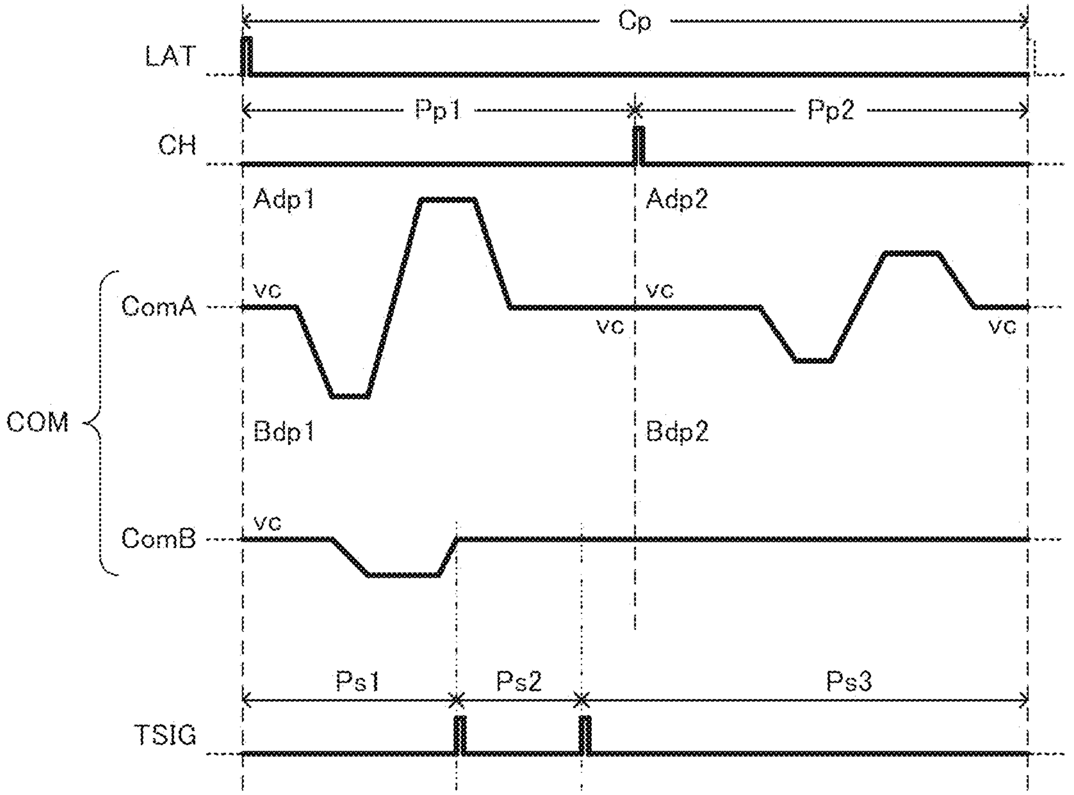
FIG. 5 is a diagram showing an example of signal waveforms of a drive voltage signal COM, a latch signal LAT, a change signal CH, and an inspection timing signal TSIG.

Next, the configuration and the operation of the drive signal selection circuit 200 that outputs the drive voltage signal Vin corresponding to each of the m ejectors 600 by selecting or deselecting a signal waveform contained in the drive voltage signal COM will be described. Before describing the details of the drive signal selection circuit 200, first, an example of signal waveforms of the drive voltage signal COM, the latch signal LAT, the change signal CH, and the inspection timing signal TSIG that are input to the drive signal selection circuit 200 will be described. FIG. 5 is a diagram showing an example of the signal waveforms of the drive voltage signal COM, the latch signal LAT, the change signal CH, and the inspection timing signal TSIG.

The control circuit 100 outputs a pulse signal whose logic level is at a high level for a certain period as the latch signal LAT at a timing corresponding to a conveyance position of the medium P. Here, in the following description, the pulse signal output as the latch signal LAT by the control circuit 100 is referred to as a latch pulse. Desired dots are formed on the medium P during a period in which the logic level of the latch signal LAT is at a high level for a certain period and the control circuit 100 outputs the latch pulse as the latch signal LAT. In the following description, the period in which the logic level of the latch signal LAT is at a high level and the control circuit 100 outputs the latch pulse as the latch signal LAT is referred to as a dot formation period Cp. When the liquid ejection apparatus 1 is a serial type inkjet printer, the control circuit 100 may output the latch pulse as the latch signal LAT at a timing corresponding to a scanning position of a print head that ejects ink in addition to a conveyance position of the medium P.

The drive voltage signal COM includes a drive voltage signal ComA and a drive voltage signal ComB. The drive voltage signal ComA includes a drive waveform Adp1 and a drive waveform Adp2 in the dot formation period Cp. The drive waveform Adp1 is a signal waveform in which a voltage value starts at a voltage vc, the voltage value changes so as to drive the piezoelectric elements 60*a* and 60*b*, and then the voltage value ends at the voltage vc. When the drive waveform Adp1 is supplied to the piezoelectric elements 60*a* and 60*b*, a predetermined amount of ink is ejected from the nozzle N of the corresponding ejector 600. The drive waveform Adp2 is a signal waveform in which a voltage value starts at the voltage vc, the voltage value changes so as to drive the piezoelectric elements 60*a* and 60*b*, and then the voltage value ends at the voltage vc. When the drive waveform Adp2 is supplied to the piezoelectric elements 60*a* and 60*b*, an amount of ink smaller than the predetermined amount is ejected from the nozzle N of the corresponding ejector 600.

That is, the drive voltage signal ComA includes a signal waveform for ejecting ink from the nozzle N provided in the ejector 600. Here, in the following description, the predetermined amount of ink ejected from the corresponding nozzle N when the drive waveform Adp1 is supplied to the piezoelectric elements 60*a* and 60*b* may be referred to as a medium amount, and the amount of ink smaller than the predetermined amount ejected from the corresponding nozzle N when the drive waveform Adp2 is supplied to the piezoelectric elements 60*a* and 60*b* may be referred to as a small amount.

The drive voltage signal ComB includes a drive waveform Bdp1 and a drive waveform Bdp2 in the dot formation period Cp. The drive waveform Bdp1 is a signal waveform in which a voltage value starts at the voltage vc, the voltage value changes so as to drive the piezoelectric elements 60*a* and 60*b* to such an extent that no ink is ejected from the corresponding nozzles N, and then the voltage value ends at the voltage vc. When the drive waveform Bdp1 is supplied to one ends of the piezoelectric elements 60*a* and 60*b*, the ink in the vicinity of the nozzle N is caused to vibrate to such an extent that no ink is ejected from the nozzle N provided in the corresponding ejector 600. Accordingly, an increase in the viscosity of the ink in the vicinity of an opening of the nozzle N of the ejector 600 is reduced. The drive waveform Bdp2 is a signal waveform in which a voltage value is constant at the voltage vc. When the drive waveform Bdp2 is supplied to one ends of the piezoelectric elements 60*a* and 60*b*, the piezoelectric elements 60*a* and 60*b* are not driven, and accordingly no ink is ejected from the corresponding ejector 600.

That is, the drive voltage signal ComB includes a signal waveform for preventing an increase in the viscosity of the ink by vibrating the ink in the vicinity of the nozzle N without ejecting the ink from the nozzle N provided in the ejector 600. Here, in the following description, an operation of preventing an increase in the viscosity of the ink by vibrating the ink in the vicinity of an opening portion of the nozzle N of the ejector 600 may be referred to as micro-vibration.

The control circuit 100 outputs a pulse signal whose logic level is at a high level for a certain period as the change signal CH at a timing when the signal waveform contained in the drive voltage signal ComA is switched from the drive waveform Adp1 to the drive waveform Adp2 and at a timing when the signal waveform contained in the drive voltage signal ComB is switched from the drive waveform Bdp1 to the drive waveform Bdp2. Here, in the following description, the pulse signal output as the change signal CH by the control circuit 100 is referred to as a change pulse.

Specifically, the control circuit 100 outputs the change pulse as the change signal CH at a timing between a period in which the voltage value of the drive waveform Adp1 changes to drive the piezoelectric elements 60*a* and 60*b* and a period in which the voltage value of the drive waveform Adp2 changes to drive the piezoelectric elements 60*a* and 60*b*, and at a timing after a period in which the voltage value of the drive waveform Adp2 changes to drive the piezoelectric elements 60*a* and 60*b* elapses. Here, in the following description, in the dot formation period Cp, a period from the output of the latch pulse as the latch signal LAT to the output of the change pulse as the change signal CH is referred to as a drive period Pp1, and a period from the output of the change pulse as the change signal CH to the output of the latch pulse as the latch signal LAT is referred to as a drive period Pp2. That is, the change signal CH divides the dot formation period Cp into the drive period Pp1 including the drive waveform Adp1 contained in the drive voltage signal ComA and the drive waveform Bdp1 contained in the drive voltage signal ComB, and the drive period Pp2 including the drive waveform Adp2 contained in the drive voltage signal ComA and the drive waveform Bdp2 contained in the drive voltage signal ComB.

Here, although an example is described in the embodiment in which the control circuit 100 outputs one change signal CH corresponding to both the drive voltage signal ComA and the drive voltage signal ComB, the control circuit 100 may output a change signal CH corresponding to the drive voltage signal ComA and a change signal CH corresponding to the drive voltage signal ComB separately. The control circuit 100 may output two or more change pulses as the change signal CH in the dot formation period Cp according to the number of signal waveforms contained in the drive voltage signals ComA and ComB.

The control circuit 100 outputs a pulse signal whose logic level is at a high level for a certain period as the inspection timing signal TSIG that defines an inspection timing at which inspection is performed to check whether an ejection state of ink from the ejection module 20 including the ejector 600 is normal based on the residual vibration generated in the ejector 600. Here, in the following description, the pulse signal output as the inspection timing signal TSIG by the control circuit 100 is referred to as an inspection pulse.

Specifically, after the latch pulse is input as the latch signal LAT, the control circuit 100 outputs the inspection pulse as the inspection timing signal TSIG at a certain timing after the voltage value of the drive voltage signal ComB is changed. In addition, the control circuit 100 outputs the inspection pulse as the inspection timing signal TSIG at a certain timing after the voltage value of the drive voltage signal ComB is changed, and then outputs the inspection pulse again as the inspection timing signal TSIG after a certain period elapses. Here, in the following description, in the dot formation period Cp, a period from the output of the latch pulse as the latch signal LAT to the output of the inspection pulse as the inspection timing signal TSIG is referred to as an inspection period Ps1, a period from the output of the inspection pulse as the inspection timing signal TSIG that defines the end of the inspection period Ps1 to the output of the subsequent inspection pulse as the inspection timing signal TSIG is referred to as an inspection period Ps2, and a period from the output of the inspection pulse as the inspection timing signal TSIG that defines the end of the inspection period Ps2 to the output of the subsequent latch pulse as the latch signal LAT is referred to as an inspection period Ps3. That is, the inspection timing signal TSIG divides the dot formation period Cp into the inspection periods Ps1, Ps2, and Ps3. Then, the control circuit 100 performs inspection to check whether the ejection state of the ink from the ejection module 20 including the ejector 600 is normal based on the residual vibration generated in the ejector 600 in the inspection period Ps2.

That is, the drive circuit 50 outputs the drive voltage signal COM including the drive voltage signal ComA including the drive waveforms Adp1 and Adp2 and the drive voltage signal ComB including the drive waveforms Bdp1 and Bdp2 to the drive signal selection circuit 200, and the drive signal selection circuit 200 generates the drive voltage signal Vin by selecting or deselecting the drive waveforms Adp1 and Adp2 and the drive waveforms Bdp1 and Bdp2 in each of the drive periods Pp1 and Pp2, and supplies the drive voltage signal Vin to one ends of the piezoelectric elements 60*a* and 60*b* provided in the corresponding ejector 600.

In addition, the drive signal selection circuit 200 acquires the residual vibration signal Vout corresponding to the residual vibration generated in the ejector 600, and outputs the residual vibration signal Vout as the residual vibration detection signal NVT in the inspection period Ps2. Then, the waveform information output circuit 300 acquires waveform information about the residual vibration detection signal NVT and outputs a waveform information signal WFS including the acquired waveform information to the control circuit 100. Then, based on the input waveform information signal WFS, the control circuit 100 inspects whether the ejection state of the ink from the corresponding ejector 600 and from the ejection module 20 including the ejector 600 is normal.

The signal waveforms of the drive voltage signal COM shown in FIG. 5 are examples only, and the drive circuit 50 may output the drive voltage signal COM including signal waveforms of various shapes according to a type of the ink to be ejected, a type of the medium P on which the ink is landed, and the like. Further, the drive circuit 50 may generate the drive voltage signal COM including signal waveforms corresponding to the print heads 21-1 to 21-*n* and output the drive voltage signal COM to the corresponding print heads 21-1 to 21-*n*. A timing at which the control circuit 100 outputs the change pulse as the change signal CH and a timing at which the control circuit 100 outputs the inspection pulse as the inspection timing signal TSIG are not limited to the examples shown in FIG. 5.

3.2 Configuration of Drive Signal Selection Circuit

Figure 6:
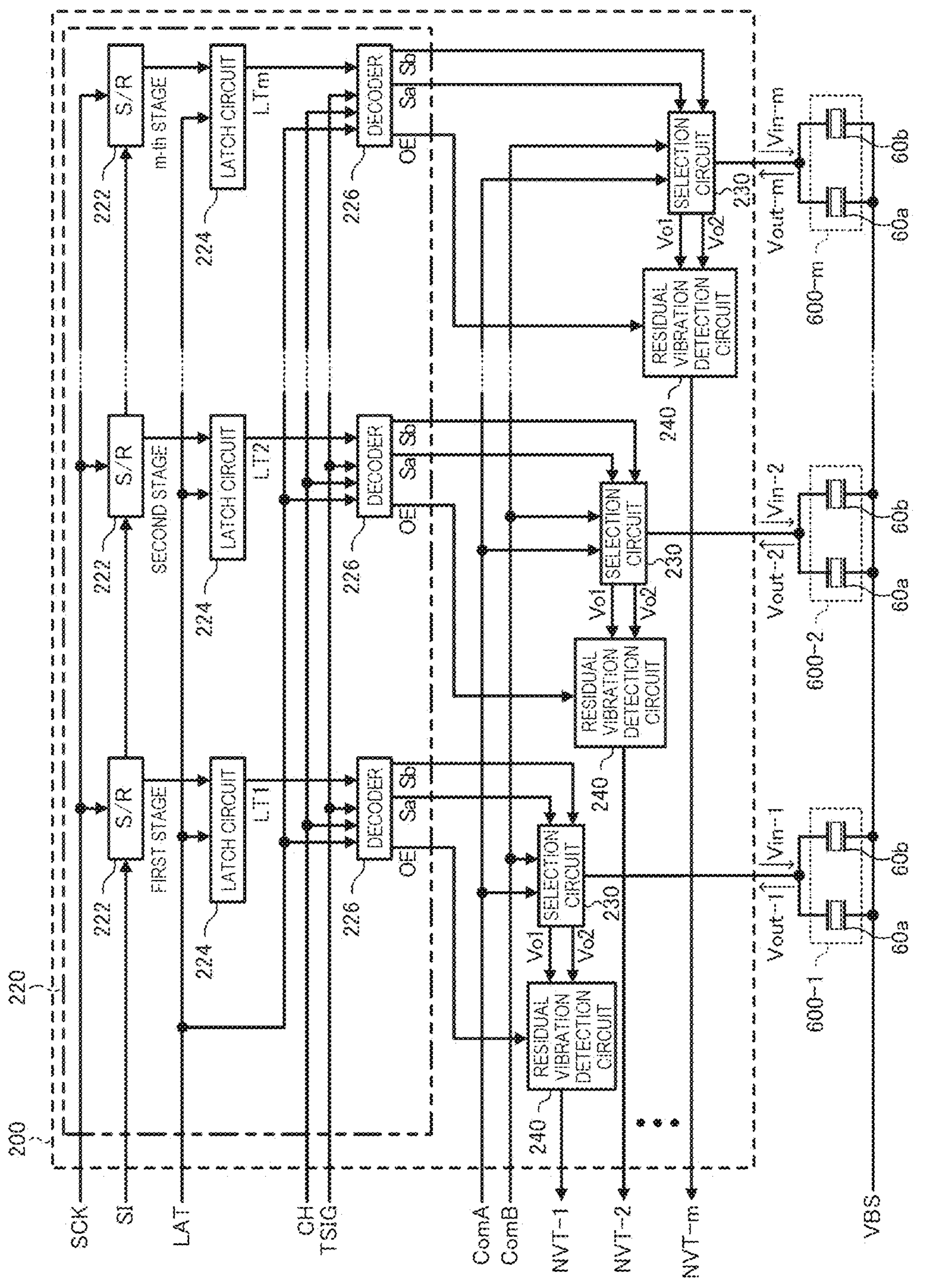
FIG. 6 is a diagram showing an example of a functional configuration of a drive signal selection circuit.

A specific example of a configuration of the drive signal selection circuit 200 will be described. FIG. 6 is a diagram showing an example of a functional configuration of the drive signal selection circuit 200. In FIG. 6, the m ejectors 600 driven by the drive voltage signal Vin output from the drive signal selection circuit 200 are shown together as the ejectors 600-1 to 600-*m*. As shown in FIG. 6, the drive signal selection circuit 200 includes a selection control circuit 220, m selection circuits 230, and m residual vibration detection circuits 240.

The clock signal SCK, the print data signal SI, the latch signal LAT, the change signal CH, and the inspection timing signal TSIG are input to the selection control circuit 220. Based on the clock signal SCK, the print data signal SI, the latch signal LAT, the change signal CH, and the inspection timing signal TSIG that are input to the selection control circuit 220, the selection control circuit 220 generates selection signals Sa and Sb that are at predetermined logic levels in each of the drive periods Pp1 and Pp2, and outputs the selection signals Sa and Sb to the corresponding selection circuit 230, and generates an inspection enable signal OE that is at a predetermined logic level in each of the inspection periods Ps1, Ps2, and Ps3, and outputs the inspection enable signal OE to the corresponding residual vibration detection circuit 240.

The selection control circuit 220 includes a set of a shift register 222, a latch circuit 224, and a decoder 226 provided corresponding to each of the ejectors 600-1 to 600-*m* provided in the print head 21. That is, the selection control circuit 220 includes at least m sets of the shift register 222, the latch circuit 224, and the decoder 226.

The print data signal SI serially includes, corresponding to each of the m ejectors 600, 3-bit print data SId [SIH, SIM, SIL] for selecting whether to form any one dot of a large dot LD, a medium dot MD, a small dot SD, and a non-recording ND on the medium P, or whether to execute a state inspection CD for inspecting the ejection state of the ink from the ejector 600. That is, the print data signal SI is a serial signal of 3$m$ bits or more.

The print data signal SI is input to the selection control circuit 220 in synchronization with the clock signal SCK. The m shift registers 222 provided in the selection control circuit 220 hold the 3-bit print data SId [SIH, SIM, SIL] contained in the input print data signal SI so as to correspond to the ejectors 600-1 to 600-*m*.

Specifically, the m shift registers 222 are serially coupled so as to correspond respectively to the m ejectors 600-1 to 600-*m*. The print data signal SI serially input to the selection control circuit 220 is sequentially transferred to subsequent stages of the m shift registers 222 serially coupled in synchronization with the clock signal SCK. Then, when the supply of the clock signal SCK to the selection control circuit 220 is stopped, the 3-bit print data SId [SIH, SIM, SIL] corresponding to the m ejectors 600-1 to 600-*m* is held in the m shift registers 222. Note that in the following description, in order to distinguish the m shift registers 222 serially coupled to one another, the m shift registers 222 may be referred to as a first stage, a second stage . . . and an m-th stage in this order from upstream to downstream in a direction in which the print data signal SI is supplied.

Each of the m latch circuits 224 latches the 3-bit print data SId [SIH, SIM, SIL] held in the corresponding shift register 222 simultaneously when a latch pulse is input as the latch signal LAT.

The print data SId [SIH, SIM, SIL] latched by the m latch circuits 224 is input to the corresponding decoders 226. Each of the m decoders 226 decodes the input print data SId [SIH, SIM, SIL], generates the selection signals Sa and Sb at logic levels corresponding to the large dot LD, the medium dot MD, the small dot SD, and the non-recording ND, outputs the selection signals Sa and Sb to the corresponding selection circuit 230, generates the inspection enable signal OE at a logic level corresponding to the state inspection CD, and outputs the inspection enable signal OE to the corresponding residual vibration detection circuit 240.

Figures 7, 8:
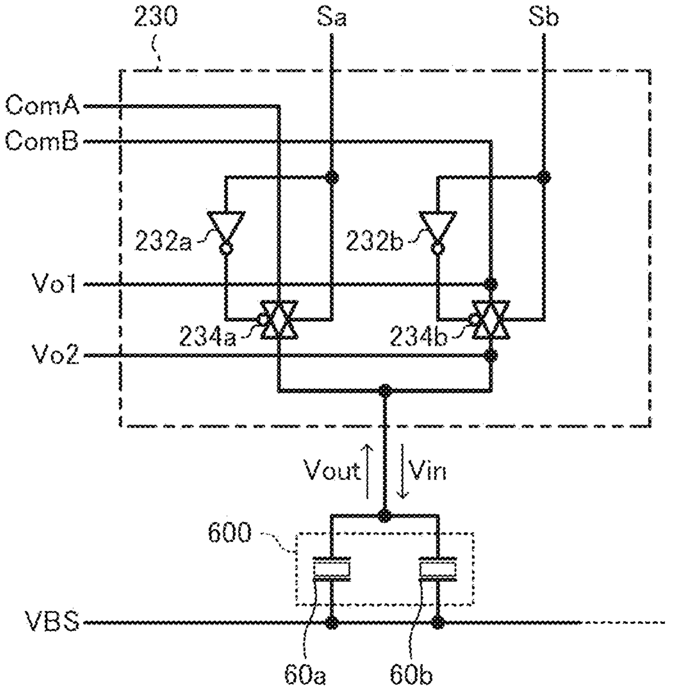
FIG. 7 is a diagram showing an example of decoding contents in a decoder.
FIG. 8 is a diagram showing a configuration of a selection circuit corresponding to one ejector.

FIG. 7 is a diagram showing an example of decoding contents in the decoder 226. As shown in FIG. 7, when the print data SId [SIH, SIM, SIL]=[1, 1, 0] corresponding to the large dot LD is input, the decoder 226 sets the logic level of the selection signal Sa to an H level in each of the drive periods Pp1 and Pp2, sets the logic level of the selection signal Sb to an L level in each of the drive periods Pp1 and Pp2, and sets the logic level of the inspection enable signal OE to an L level in each of the inspection periods Ps1, Ps2, and Ps3.

Further, when the print data SId [SIH, SIM, SIL]=[1, 0, 0] corresponding to the medium dot MD is input, the decoder 226 sets the logic level of the selection signal Sa to an H level in the drive period Pp1 and an L level in the drive period Pp2, sets the logic level of the selection signal Sb to an L level in each of the drive periods Pp1 and Pp2, and sets the logic level of the inspection enable signal OE to an L level in each of the inspection periods Ps1, Ps2, and Ps3.

Further, when the print data SId [SIH, SIM, SIL]=[0, 1, 0] corresponding to the small dot SD is input, the decoder 226 sets the logic level of the selection signal Sa to an L level in the drive period Pp1 and an H level in the drive period Pp2, sets the logic level of the selection signal Sb to an L level in each of the drive periods Pp1 and Pp2, and sets the logic level of the inspection enable signal OE to an L level in each of the inspection periods Ps1, Ps2, and Ps3.

Further, when the print data SId [SIH, SIM, SIL]=[0, 0, 0] corresponding to the non-recording ND is input, the decoder 226 sets the logic level of the selection signal Sa to an L level in each of the drive periods Pp1 and Pp2, sets the logic level of the selection signal Sb to an H level in each of the drive periods Pp1 and Pp2, and sets the logic level of the inspection enable signal OE to an L level in each of the inspection periods Ps1, Ps2, and Ps3.

Further, when the print data SId [SIH, SIM, SIL]=[1, 1, 1] corresponding to the state inspection CD is input, the decoder 226 sets the logic level of the selection signal Sa to an L level in each of the drive periods Pp1 and Pp2, sets the logic level of the selection signal Sb to an H level in each of the drive periods Pp1 and Pp2, and sets the logic level of the inspection enable signal OE to an L level in the inspection period Ps1, an H level in the inspection period Ps2, and an L level in the inspection period Ps3.

As described above, based on the logic level of the print data SId [SIH, SIM, SIL], the selection control circuit 220 generates the selection signals Sa and Sb and the inspection enable signal OE of logic levels corresponding to the m ejectors 600. The selection control circuit 220 outputs the generated selection signals Sa and Sb of the logic levels to the corresponding selection circuit 230, and outputs the generated inspection enable signal OE of the logic levels to the corresponding residual vibration detection circuit 240.

The selection circuit 230 is provided corresponding to each of the m ejectors 600-1 to 600-*m*. That is, the drive signal selection circuit 200 includes the m selection circuits 230. The drive voltage signals ComA and ComB serving as the drive voltage signal COM are input to each of the m selection circuits 230. Then, each of the m selection circuits 230 generates the drive voltage signal Vin corresponding to the drive voltage signal COM according to the logic levels of the input selection signals Sa and Sb, and outputs the drive voltage signal Vin to the corresponding ejector 600. FIG. 8 is a diagram showing a configuration of the selection circuit 230 corresponding to one ejector 600 among the ejectors 600-1 to 600-*m*. As shown in FIG. 8, the selection circuit 230 includes logic inversion circuits 232*a* and 232*b* and transfer gates 234*a* and 234*b*.

The selection signal Sa is supplied to a positive control terminal of the transfer gate 234*a*, and is inverted in the logic level by the logic inversion circuit 232*a*, and then is supplied to a negative control terminal of the transfer gate 234*a*. The transfer gate 234*a* is conductive between one end and the other end when the logic level of the selection signal Sa is a high level, and is non-conductive between the one end and the other end when the logic level of the selection signal Sa is a low level. The drive voltage signal ComA is supplied to the one end of the transfer gate 234*a*. Accordingly, the transfer gate 234*a* selects or deselects a signal waveform of the drive voltage signal ComA input to the one end based on the logic level of the selection signal Sa, and outputs the signal waveform from the other end.

The selection signal Sb is supplied to a positive control terminal of the transfer gate 234*b*, and is inverted in the logic level by the logic inversion circuit 232*b*, and then is supplied to a negative control terminal of the transfer gate 234*b*. The transfer gate 234*b* is conductive between one end and the other end when the logic level of the selection signal Sb is a high level, and is non-conductive between the one end and the other end when the logic level of the selection signal Sb is a low level. The drive voltage signal ComB is supplied to the one end of the transfer gate 234*b*. Accordingly, the transfer gate 234*b* selects or deselects a signal waveform of the drive voltage signal ComB input to the one end based on the logic level of the selection signal Sb, and outputs the signal waveform from the other end.

In the selection circuit 230, the other end of the transfer gate 234*a* and the other end of the transfer gate 234*b* are coupled to each other. The other ends of the mutually coupled transfer gates 234*a* and 234*b* are electrically coupled to the piezoelectric elements 60*a* and 60*b* provided in the corresponding ejector 600. Accordingly, the selection circuit 230 supplies, as the drive voltage signal Vin, a signal obtained by the transfer gate 234*a* selecting or deselecting the signal waveform of the drive voltage signal ComA and a signal obtained by the transfer gate 234*b* selecting or deselecting the signal waveform of the drive voltage signal ComB to the piezoelectric elements 60*a* and 60*b* provided in the corresponding ejector 600.

After the drive voltage signal Vin is supplied to the piezoelectric elements 60*a* and 60*b* provided in the corresponding ejector 600 to drive the piezoelectric elements 60*a* and 60*b*, the residual vibration signal Vout generated by driving the piezoelectric elements 60*a* and 60*b* according to the residual vibration generated in the ejector 600 is input to the selection circuit 230. That is, the residual vibration signal Vout corresponding to the residual vibration generated in the piezoelectric elements 60*a* and 60*b* is supplied to the other ends of the transfer gates 234*a* and 234*b*.

The selection circuit 230 outputs, as a residual vibration reference signal Vo1, a voltage value of the drive voltage signal ComB supplied to the one end of the transfer gate 234*b*, which is a voltage value of the one end of the transfer gate 234*b*, to the corresponding residual vibration detection circuit 240, and outputs, as a residual vibration detection signal Vo2, a voltage value of the residual vibration signal Vout supplied to the other end of the transfer gate 234*b*, which is a voltage value of the other end of the transfer gate 234*b*, to the corresponding residual vibration detection circuit 240.

Here, in the following description, conduction between the one end and the other end of the transfer gates 234*a* and 234*b* may be referred to as "on", and non-conduction between the one end and the other end of the transfer gates 234*a* and 234*b* may be referred to as "off".

In the transfer gates 234*a* and 234*b*, one or more N-channel metal oxide semiconductor (MOS) transistors and one or more P-channel MOS transistors are complementarily coupled to each other. That is, the transfer gates 234*a* and 234*b* include transistor elements. At least one of the transistor elements provided in the transfer gates 234*a* and 234*b* is driven in a linear region during a period in which the transfer gates 234*a* and 234*b* are turned on.

The residual vibration detection circuit 240 is provided corresponding to each of the m selection circuits 230 provided corresponding to the respective ejectors 600-1 to 600-*m*. That is, the drive signal selection circuit 200 includes m residual vibration detection circuits 240. The residual vibration reference signal Vo1 and the residual vibration detection signal Vo2 output from the corresponding selection circuit 230 are input to each of the m residual vibration detection circuits 240. Each of the m residual vibration detection circuits 240 generates the residual vibration detection signal NVT corresponding to the residual vibration generated in the corresponding ejector 600 according to signal waveforms of the input residual vibration reference signal Vo1 and residual vibration detection signal Vo2, and outputs the generated residual vibration detection signal NVT.

Figure 9:
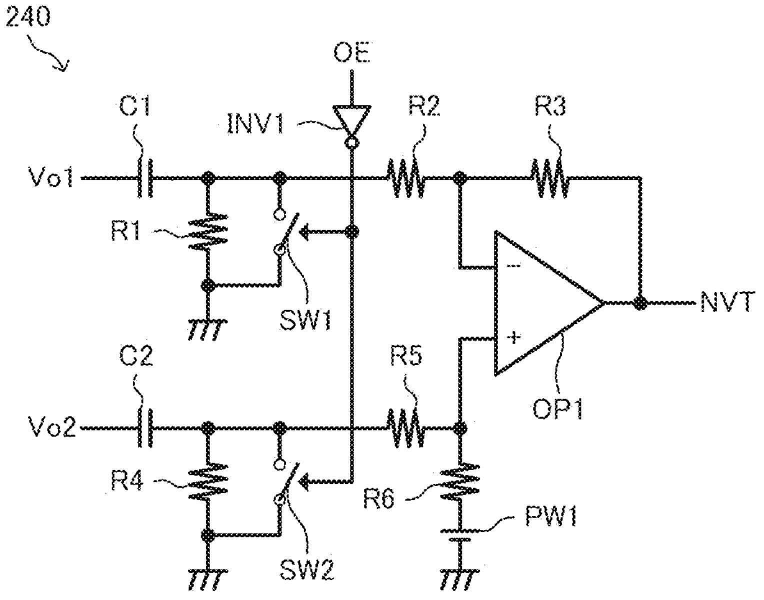
FIG. 9 shows an example of a configuration of a residual vibration detection circuit.

FIG. 9 shows an example of a configuration of the residual vibration detection circuit 240. The residual vibration detection circuit 240 includes capacitors C1 and C2, resistors R1, R2, R3, R4, R5, and R6, switches SW1 and SW2, and an amplifier circuit OP1.

The residual vibration reference signal Vo1 is input to one end of the capacitor C1. The other end of the capacitor C1 is electrically coupled to one end of the resistor R1. A ground potential is supplied to the other end of the resistor R1. That is, the capacitor C1 and the resistor R1 configure a high-pass filter circuit. The other end of the capacitor C1 and the one end of the resistor R1, which are an output of the high-pass filter circuit configured with the capacitor C1 and the resistor R1, are electrically coupled to one end of the resistor R2. The other end of the resistor R2 is electrically coupled to one end of the resistor R3, and is electrically coupled to a negative-side input terminal of the amplifier circuit OP1. The other end of the resistor R3 is electrically coupled to an output terminal of the amplifier circuit OP1.

The residual vibration detection signal Vo2 is input to one end of the capacitor C2. The other end of the capacitor C2 is electrically coupled to one end of the resistor R4. A ground potential is supplied to the other end of the resistor R4. That is, the capacitor C2 and the resistor R4 configure a high-pass filter circuit. The other end of the capacitor C2 and the one end of the resistor R4, which are an output of the high-pass filter circuit configured with the capacitor C2 and the resistor R4, are electrically coupled to one end of the resistor R5. The other end of the resistor R5 is electrically coupled to one end of the resistor R6, and is electrically coupled to a positive-side input terminal of the amplifier circuit OP1. The other end of the resistor R6 is electrically coupled to a positive terminal of a power supply circuit PW1, and a ground potential is supplied to a negative terminal of the power supply circuit PW1.

In the residual vibration detection circuit 240 configured as described above, a signal obtained by reducing a DC component contained in the residual vibration reference signal Vo1 by the high-pass filter circuit including the capacitor C1 and the resistor R1 is input to the negative-side input terminal of the amplifier circuit OP1, and a signal obtained by superimposing a bias voltage signal VB output from the power supply circuit PW1 on a signal obtained by reducing a DC component contained in the residual vibration detection signal Vo2 by the high-pass filter circuit including the capacitor C2 and the resistor R4 is input to the positive-side input terminal of the amplifier circuit OP1. Accordingly, the amplifier circuit OP1 outputs, as the residual vibration detection signal NVT, a signal obtained by adding a voltage vb, which is a voltage value of the bias voltage signal VB, to a signal obtained by amplifying a difference between the signal input to the negative-side input terminal and the signal input to the positive-side input terminal by an amplification factor defined by a resistance value of the resistor R3 and a resistance value of the resistor R2.

Charges generated accompanying with the displacement of the piezoelectric elements 60*a* and 60*b* that is caused by the residual vibration, which are the residual vibration signal Vout generated due to the displacement of the piezoelectric elements 60*a* and 60*b* that is caused by the residual vibration generated in the ejector 600, propagate, via the transfer gate 234*b*, through wiring to which the drive voltage signal ComB is applied. At this time, a current signal generated due to movement of the charges caused by the residual vibration is converted into a voltage signal by on-resistance of the transfer gate 234*b*. That is, a potential difference corresponding to the residual vibration signal Vout output from the corresponding ejector 600, which is a potential difference corresponding to the residual vibration generated in the corresponding ejector 600, is generated between one end and the other end of the transfer gate 234*b*.

The selection circuit 230 outputs a voltage value of the one end of the transfer gate 234*b* as the residual vibration reference signal Vo1 and outputs a voltage value of the other end of the transfer gate 234*b* as the residual vibration detection signal Vo2, and the residual vibration detection circuit 240 differentially amplifies the residual vibration reference signal Vo1 and the residual vibration detection signal Vo2 to generate the residual vibration detection signal NVT which is a signal obtained by amplifying the potential difference based on the residual vibration generated at both ends of the transfer gate 234*b*, that is, amplifying the residual vibration signal Vout output from the corresponding ejector 600, and outputs the residual vibration detection signal NVT to the control circuit 100.

One end of the switch SW1 is electrically coupled to the other end of the capacitor C1 and one end of the resistor R1, a ground potential is supplied to the other end of the switch SW1, and a signal obtained by inverting a logic level of the inspection enable signal OE by a logic inversion circuit INV1 is input to a control terminal. The one end and the other end of the switch SW1 are non-conductive when a low level signal is input to the control terminal, and are conductive when a high level signal is input to the control terminal. That is, when the inspection enable signal OE of a high level is input to the residual vibration detection circuit 240, the one end and the other end of the switch SW1 are non-conductive, and when the inspection enable signal OE of a low level is input to the residual vibration detection circuit 240, the one end and the other end of the switch SW1 are conductive.

One end of the switch SW2 is electrically coupled to the other end of the capacitor C2 and one end of the resistor R4, a ground potential is supplied to the other end of the switch SW2, and a signal obtained by inverting a logic level of the inspection enable signal OE by the logic inversion circuit INV1 is input to a control terminal. The one end and the other end of the switch SW2 are non-conductive when a low level signal is input to the control terminal, and are conductive when a high level signal is input to the control terminal. That is, when the inspection enable signal OE of a high level is input to the residual vibration detection circuit 240, the one end and the other end of the switch SW2 are non-conductive, and when the inspection enable signal OE of a low level is input to the residual vibration detection circuit 240, the one end and the other end of the switch SW2 are conductive.

Each of the switches SW1 and SW2 includes an N-channel MOS transistor.

When the inspection enable signal OE of a low level is input to the residual vibration detection circuit 240 configured as described above, the one end and the other end of the switch SW1 are conductive, so that the residual vibration reference signal Vo1 is not supplied to the negative-side input terminal of the amplifier circuit OP1, and the one end and the other end of the switch SW2 are conductive, so that the residual vibration detection signal Vo2 is not supplied to the positive-side input terminal of the amplifier circuit OP1. Accordingly, the residual vibration detection circuit 240 does not generate the residual vibration detection signal NVT obtained by amplifying the residual vibration signal Vout output from the corresponding ejector 600.

On the other hand, when the inspection enable signal OE of a high level is input to the residual vibration detection circuit 240, the one end and the other end of the switch SW1 are non-conductive, so that the residual vibration reference signal Vo1 is supplied to the negative-side input terminal of the amplifier circuit OP1, and the one end and the other end of the switch SW2 are non-conductive, so that the residual vibration detection signal Vo2 is supplied to the positive-side input terminal of the amplifier circuit OP1. Accordingly, the residual vibration detection circuit 240 generates the residual vibration detection signal NVT obtained by amplifying the residual vibration signal Vout output from the corresponding ejector 600, and outputs the residual vibration detection signal NVT to the control circuit 100.

That is, the residual vibration detection circuit 240 acquires the residual vibration signal Vout output from the corresponding ejector 600 in a period in which the inspection enable signal OE of a high level is input, and outputs the residual vibration detection signal NVT corresponding to the acquired residual vibration signal Vout to the control circuit 100. In other words, the residual vibration detection circuit 240 reduces a DC component by the high-pass filter circuit and amplifies the residual vibration signal Vout to generate and output the residual vibration detection signal NVT obtained by shaping a signal waveform of the residual vibration signal Vout.

Here, in the following description, conduction between the one end and the other end of each of the switches SW1 and SW2 may be referred to as "on", and non-conduction between the one end and the other end of each of the switches SW1 and SW2 may be referred to as "off".

Figure 10:
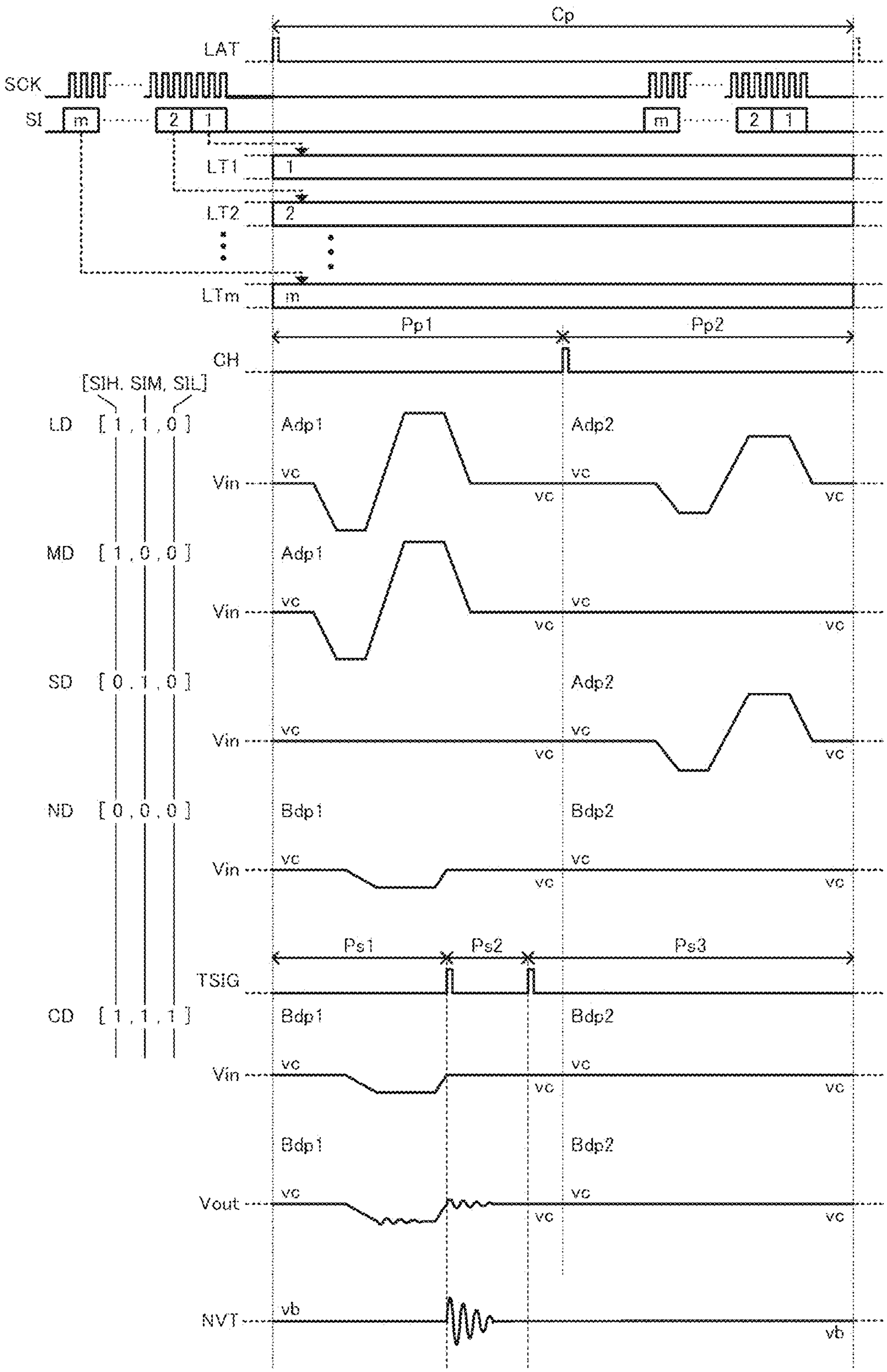
FIG. 10 is a diagram showing an example of an operation of a drive signal selection circuit.

Details of an operation of the drive signal selection circuit 200 configured as described above will be described. FIG. 10 is a diagram showing an example of an operation of the drive signal selection circuit 200. The print data signal SI is serially supplied to the drive signal selection circuit 200 in synchronization with the clock signal SCK. The print data signal SI input to the drive signal selection circuit 200 is sequentially transferred to the shift registers 222 of subsequent stages in synchronization with the clock signal SCK. Then, when the supply of the clock signal SCK to the drive signal selection circuit 200 is stopped, the 3-bit print data SId [SIH, SIM, SIL] corresponding to the m ejectors 600 is held in the m shift registers 222.

Thereafter, when the latch signal LAT rises, the latch circuits 224 simultaneously latches the print data SId [SIH, SIM, SIL] held in the shift registers 222. Here, LT1, LT2 . . . LTm shown in FIG. 10 represent the print data SId [SIH, SIM, SIL] which is held by the shift registers 222 in the first stage, the second stage . . . and the m-th stage and are latched by the corresponding latch circuits 224.

The decoder 226 decodes the print data SId [SIH, SIM, SIL] thus latched according to the contents shown in FIG. 7. Then, the decoder 226 outputs the selection signals Sa and Sb of the logic levels shown in FIG. 7 and the inspection enable signal OE in the dot formation period Cp.

Specifically, in the case of the print data SId [SIH, SIM, SIL]=[1, 1, 0], the decoder 226 sets the logic level of the selection signal Sa to an H level in each of the drive periods Pp1 and Pp2, sets the logic level of the selection signal Sb to an L level in each of the drive periods Pp1 and Pp2, and sets the logic level of the inspection enable signal OE to an L level in each of the inspection periods Ps1, Ps2, and Ps3.

The selection signals Sa and Sb output from the decoder 226 are input to the selection circuit 230. Accordingly, the selection circuit 230 selects the drive waveform Adp1 of the drive voltage signal ComA in the drive period Pp1, and selects the drive waveform Adp2 of the drive voltage signal ComA in the drive period Pp2. As a result, the drive signal selection circuit 200 outputs the drive voltage signal Vin corresponding to the large dot LD shown in FIG. 10 in the dot formation period Cp. When the drive voltage signal Vin corresponding to the large dot LD is supplied to the ejector 600, the medium amount of ink is ejected in the drive period Pp1, and the small amount of ink is ejected in the drive period Pp2 from the ejector 600. Then, in the dot formation period Cp, the medium amount of ink and the small amount of ink ejected from the ejector 600 land on the medium P and are combined. Accordingly, the large dot LD is formed on the medium P in the dot formation period Cp.

The inspection enable signal OE output from the decoder 226 is input to the residual vibration detection circuit 240. Accordingly, the switches SW1 and SW2 provided in the residual vibration detection circuit 240 are controlled to be on in the inspection periods Ps1, Ps2, and Ps3. Accordingly, the residual vibration detection circuit 240 outputs a signal having a constant voltage value of the voltage vb regardless of the input residual vibration reference signal Vo1 and residual vibration detection signal Vo2. That is, in the case of the print data SId [SIH, SIM, SIL]=[1, 1, 0], the residual vibration detection circuit 240 does not acquire the residual vibration signal Vout corresponding to the residual vibration generated in the corresponding ejector 600, and does not output the residual vibration detection signal NVT corresponding to the residual vibration signal Vout.

In the case of the print data SId [SIH, SIM, SIL]=[1, 0, 0], the decoder 226 sets the logic level of the selection signal Sa to an H level in the drive period Pp1 and an L level in the drive period Pp2, sets the logic level of the selection signal Sb to an L level in each of the drive periods Pp1 and Pp2, and sets the logic level of the inspection enable signal OE to an L level in each of the inspection periods Ps1, Ps2, and Ps3.

The selection signals Sa and Sb output from the decoder 226 are input to the selection circuit 230. Accordingly, the selection circuit 230 selects the drive waveform Adp1 of the drive voltage signal ComA in the drive period Pp1, and does not select any signal waveform in the drive period Pp2. As a result, the drive signal selection circuit 200 outputs the drive voltage signal Vin corresponding to the medium dot MD shown in FIG. 10 in the dot formation period Cp. When the drive voltage signal Vin corresponding to the medium dot MD is supplied to the ejector 600, the medium amount of ink is ejected from the ejector 600 in the drive period Pp1, and no ink is ejected in the drive period Pp2. That is, in the dot formation period Cp, the medium amount of ink ejected from the ejector 600 lands on the medium P. Accordingly, the medium dot MD is formed on the medium P in the dot formation period Cp.

The inspection enable signal OE output from the decoder 226 is input to the residual vibration detection circuit 240. Accordingly, the switches SW1 and SW2 provided in the residual vibration detection circuit 240 are controlled to be on in the inspection periods Ps1, Ps2, and Ps3. Accordingly, the residual vibration detection circuit 240 outputs a signal having a constant voltage value of the voltage vb regardless of the input residual vibration reference signal Vo1 and residual vibration detection signal Vo2. That is, in the case of the print data SId [SIH, SIM, SIL]=[1, 0, 0], the residual vibration detection circuit 240 does not acquire the residual vibration signal Vout corresponding to the residual vibration generated in the corresponding ejector 600, and does not output the residual vibration detection signal NVT corresponding to the residual vibration signal Vout.

In the case of the print data SId [SIH, SIM, SIL]=[0, 1, 0], the decoder 226 sets the logic level of the selection signal Sa to an L level in the drive period Pp1 and an H level in the drive period Pp2, sets the logic level of the selection signal Sb to an L level in each of the drive periods Pp1 and Pp2, and sets the logic level of the inspection enable signal OE to an L level in each of the inspection periods Ps1, Ps2, and Ps3.

The selection signals Sa and Sb output from the decoder 226 are input to the selection circuit 230. Accordingly, the selection circuit 230 does not select any signal waveform in the drive period Pp1, and selects the drive waveform Adp2 of the drive voltage signal ComA in the drive period Pp2. As a result, the drive signal selection circuit 200 outputs the drive voltage signal Vin corresponding to the small dot SD shown in FIG. 10 in the dot formation period Cp. When the drive voltage signal Vin corresponding to the small dot SD is supplied to the ejector 600, no ink is ejected in the drive period Pp1, and the small amount of ink is ejected from the ejector 600 in the drive period Pp2. That is, in the dot formation period Cp, the small amount of ink ejected from the ejector 600 lands on the medium P. Accordingly, the small dot SD is formed on the medium P in the dot formation period Cp.

The inspection enable signal OE output from the decoder 226 is input to the residual vibration detection circuit 240. Accordingly, the switches SW1 and SW2 provided in the residual vibration detection circuit 240 are controlled to be on in the inspection periods Ps1, Ps2, and Ps3. Accordingly, the residual vibration detection circuit 240 outputs a signal having a constant voltage value of the voltage vb regardless of the input residual vibration reference signal Vo1 and residual vibration detection signal Vo2. That is, in the case of the print data SId [SIH, SIM, SIL]=[0, 1, 0], the residual vibration detection circuit 240 does not acquire the residual vibration signal Vout corresponding to the residual vibration generated in the corresponding ejector 600, and does not output the residual vibration detection signal NVT corresponding to the residual vibration signal Vout.

In the case of the print data SId [SIH, SIM, SIL]=[0, 0, 0], the decoder 226 sets the logic level of the selection signal Sa to an L level in each of the drive periods Pp1 and Pp2, sets the logic level of the selection signal Sb to an H level in each of the drive periods Pp1 and Pp2, and sets the logic level of the inspection enable signal OE to an L level in each of the inspection periods Ps1, Ps2, and Ps3.

The selection signals Sa and Sb output from the decoder 226 are input to the selection circuit 230. Accordingly, the selection circuit 230 selects the drive waveform Bdp1 of the drive voltage signal ComB in the drive period Pp1, and selects the drive waveform Bdp2 of the drive voltage signal ComB in the drive period Pp2. As a result, the drive signal selection circuit 200 outputs the drive voltage signal Vin corresponding to the non-recording ND shown in FIG. 10 in the dot formation period Cp. When the drive voltage signal Vin corresponding to the non-recording ND is supplied to the ejector 600, no ink is ejected from the ejector 600 and no dot is formed on the medium P in the dot formation period Cp. In this case, micro-vibration is performed in the corresponding ejector 600.

The inspection enable signal OE output from the decoder 226 is input to the residual vibration detection circuit 240. Accordingly, the switches SW1 and SW2 provided in the residual vibration detection circuit 240 are controlled to be on in the inspection periods Ps1, Ps2, and Ps3. Accordingly, the residual vibration detection circuit 240 outputs a signal having a constant voltage value of the voltage vb regardless of the input residual vibration reference signal Vo1 and residual vibration detection signal Vo2. That is, in the case of the print data SId [SIH, SIM, SIL]=[0, 0, 0], the residual vibration detection circuit 240 does not acquire the residual vibration signal Vout corresponding to the residual vibration generated in the corresponding ejector 600, and does not output the residual vibration detection signal NVT corresponding to the residual vibration signal Vout.

In the case of the print data SId [SIH, SIM, SIL]=[1, 1, 1], the decoder 226 sets the logic level of the selection signal Sa to an L level in each of the drive periods Pp1 and Pp2, sets the logic level of the selection signal Sb to an H level in each of the drive periods Pp1 and Pp2, and sets the logic level of the inspection enable signal OE to an L level in the inspection period Ps1, an H level in the inspection period Ps2, and an L level in the inspection period Ps3.

The selection signals Sa and Sb output from the decoder 226 are input to the selection circuit 230. Accordingly, the selection circuit 230 selects the drive waveform Bdp1 of the drive voltage signal ComB in the drive period Pp1, and selects the drive waveform Bdp2 of the drive voltage signal ComB in the drive period Pp2. As a result, the drive signal selection circuit 200 outputs the drive voltage signal Vin corresponding to the state inspection CD shown in FIG. 10 in the dot formation period Cp. When the drive voltage signal Vin corresponding to the state inspection CD is supplied to the ejector 600, no ink is ejected from the ejector 600 and no dot is formed on the medium P in the dot formation period Cp. In this case, micro-vibration is performed in the corresponding ejector 600.

The inspection enable signal OE output from the decoder 226 is input to the residual vibration detection circuit 240. Accordingly, the switches SW1 and SW2 of the residual vibration detection circuit 240 are controlled to be on in the inspection period Ps1, off in the inspection period Ps2, and on in the inspection period Ps3. Accordingly, the residual vibration detection circuit 240 outputs a signal having a constant voltage value at the voltage vb regardless of the input residual vibration reference signal Vo1 and residual vibration detection signal Vo2 in the inspection period Ps1, outputs the residual vibration detection signal NVT obtained by adding the voltage vb to a signal obtained by differentially amplifying the input residual vibration reference signal Vo1 and residual vibration detection signal Vo2 in the inspection period Ps2, and outputs a signal having a constant voltage value at the voltage vb regardless of the input residual vibration reference signal Vo1 and residual vibration detection signal Vo2 in the inspection period Ps3. In other words, the residual vibration detection circuit 240 outputs the residual vibration detection signal NVT corresponding to the residual vibration reference signal Vo1 and the residual vibration detection signal Vo2, which is the residual vibration detection signal NVT corresponding to the residual vibration signal Vout corresponding to the residual vibration generated in the corresponding ejector 600, at a timing when a voltage value of the drive voltage signal ComB changes and then becomes constant in the inspection period Ps2. That is, in the case of the print data SId [SIH, SIM, SIL]=[1, 1, 1], the residual vibration detection circuit 240 acquires the residual vibration signal Vout corresponding to the residual vibration generated in the corresponding ejector 600, and outputs the residual vibration detection signal NVT corresponding to the residual vibration signal Vout.

As described above, based on the clock signal SCK, the print data signal SI, the latch signal LAT, and the change signal CH, the drive signal selection circuit 200 generates the drive voltage signal Vin by selecting or deselecting the drive waveforms Adp1 and Adp2 contained in the drive voltage signal ComA and the drive waveforms Bdp1 and Bdp2 contained in the drive voltage signal ComB in the drive voltage signal COM output from the drive circuit 50, supplies the generated drive voltage signal Vin to the corresponding ejector 600, and based on the clock signal SCK, the print data signal SI, the latch signal LAT, and the inspection timing signal TSIG, the drive signal selection circuit 200 acquires the residual vibration signal Vout corresponding to the residual vibration generated in the ejector 600 after the drive voltage signal Vin is supplied to the ejector 600, and outputs the residual vibration signal Vout to the control circuit 100 as the residual vibration detection signal NVT.

That is, the ejector 600 provided in the print head 21 according to the embodiment includes the piezoelectric element 60*a* that outputs a signal corresponding to the residual vibration generated due to a volume change of the pressure chamber CB1, and the piezoelectric element 60*b* that outputs a signal corresponding to the residual vibration generated due to a volume change of the pressure chamber CB2. The drive signal selection circuit 200 provided in the print head 21 includes the transfer gate 234*b* that has one end to which the drive voltage signal ComB is input and the other end electrically coupled to the piezoelectric elements 60*a* and 60*b*, and that switches whether to supply the drive voltage signal ComB to the piezoelectric elements 60*a* and 60*b*, and the residual vibration detection circuit 240 that outputs the residual vibration detection signal NVT corresponding to the residual vibration signal Vout obtained by combining a signal corresponding to the residual vibration generated due to the volume change of the pressure chamber CB1, which is output from the piezoelectric element 60*a* and a signal corresponding to the residual vibration generated due to the volume change of the pressure chamber CB2, which is output from the piezoelectric element 60*b*. In the drive signal selection circuit 200 provided in the print head 21, one end of the residual vibration detection circuit 240 is electrically coupled to one end of the transfer gate 234*b*, and the other end is electrically coupled to the other end of the transfer gate 234*b*.

In the print head 21 configured as described above, the two ends of the transfer gate 234*b* have a potential difference corresponding to a resistance value of the on-resistance of the transfer gate 234*b* and the residual vibration signal Vout corresponding to the charges output by the piezoelectric elements 60*a* and 60*b* corresponding to the residual vibration generated in the ejector 600. In the residual vibration detection circuit 240 according to the embodiment, the one end is electrically coupled to the one end of the transfer gate 234*b*, and the other end is electrically coupled to the other end of the transfer gate 234*b*, so that the potential difference between the two ends of the transfer gate 234*b* can be acquired. That is, the residual vibration detection circuit 240 according to the embodiment can acquire the residual vibration signal Vout corresponding to the residual vibration generated in the ejector 600 in a state where the transfer gate 234*b* that switches whether to supply the drive voltage signal ComB to the ejector 600 is continuously turned on. In other words, in the inspection period Ps1 in which the drive voltage signal Vin corresponding to the drive voltage signal ComB is supplied to the piezoelectric elements 60*a* and 60*b* and the inspection period Ps2 in which the piezoelectric elements 60*a* and 60*b* output the residual vibration signal Vout corresponding to the residual vibration generated in the ejector 600, the one end and the other end of the transfer gate 234*b* are controlled to be conductive.

Therefore, the print head 21 according to the embodiment does not need to control a conduction state of the transfer gates 234*a* and 234*b* to a specific state for acquiring the residual vibration signal Vout generated in the ejector 600. That is, in the print head 21 according to the embodiment, it is possible to acquire the residual vibration signal Vout generated in the ejector 600 without controlling the conduction state of the transfer gates 234*a* and 234*b* to a specific state for acquiring the residual vibration signal Vout corresponding to the residual vibration generated in the ejector 600. In other words, in the print head 21 according to the embodiment, it is possible to acquire the residual vibration signal Vout generated in the ejector 600 while maintaining a state in which the conduction state of the transfer gates 234*a* and 234*b* is controlled to any one of the large dot LD, the medium dot MD, the small dot SD, and the non-recording ND in which micro-vibration is performed. Accordingly, it is possible to further increase a detection speed of the residual vibration generated in the ejector 600 after the piezoelectric elements 60*a* and 60*b* are driven.

Here, in the print head 21 according to the embodiment, the residual vibration detection circuit 240 has one end electrically coupled to one end of the transfer gate 234*b* and the other end electrically coupled to the other end of the transfer gate 234*b*, and the residual vibration detection circuit 240 acquires the residual vibration signal Vout corresponding to the residual vibration generated in the ejector 600 when the drive waveform Bdp1 for performing micro-vibration is supplied to the corresponding ejector 600 as the drive voltage signal Vin, but the present disclosure is not limited thereto.

For example, the residual vibration detection circuit 240 may have one end electrically coupled to one end of the transfer gate 234*a* and the other end electrically coupled to the other end of the transfer gate 234*a*, and the control circuit 100 may output an inspection pulse as the inspection timing signal TSIG that defines the start of the inspection period Ps2 at a certain timing after the voltage value of the drive voltage signal ComA changes, thereby acquiring the residual vibration signal Vout corresponding to the residual vibration generated in the ejector 600 when the drive waveform Adp1 for ejecting the medium amount of ink or the drive waveform Adp2 for ejecting the small amount of ink is supplied to the corresponding ejector 600 as the drive voltage signal Vin.

Alternatively, as shown in the embodiment, the residual vibration detection circuit 240 may acquire the residual vibration signal Vout corresponding to the residual vibration generated in the ejector 600 when the drive waveform Bdp1 for performing micro-vibration is supplied to the corresponding ejector 600 as the drive voltage signal Vin, and the control circuit 100 may determine an ejection state of the ink from the corresponding ejector 600 based on the residual vibration signal Vout acquired by the residual vibration detection circuit 240. That is, when the residual vibration detection circuit 240 acquires the residual vibration signal Vout, the drive voltage signal Vin supplied to the corresponding ejector 600 may have a micro-vibration waveform for performing micro-vibration for causing the vicinity of the nozzle N to vibrate to such an extent that no ink is ejected from the nozzle N.

As will be described in detail later, the residual vibration generated in the ejector 600 changes depending on a state of the ink retained in the pressure chambers CB1 and CB2 configuring the print head 21 and a state of the ink flowing through the communication flow paths RR1 and RR2 and the nozzle flow path RN. By acquiring the residual vibration signal Vout corresponding to the residual vibration generated in the ejector 600 when the micro-vibration waveform for performing micro-vibration to such an extent that no ink is ejected from the corresponding nozzle N is supplied, it is possible to reduce a risk that the residual vibration generated in the ejector 600 is affected by a state change of the ink retained in the pressure chambers CB1 and CB2 and a state change of the ink flowing through the communication flow paths RR1 and RR2 and the nozzle flow path RN, which occur accompanying with the ejection of the ink from the nozzle N. Accordingly, acquisition accuracy of the residual vibration signal Vout corresponding to the residual vibration obtained by the residual vibration detection circuit 240, that is, determination accuracy of an ejection state of the ink from the ejector 600 based on the residual vibration signal Vout obtained by the residual vibration detection circuit 240 is improved.

In the print head 21 according to the embodiment, the volume of the pressure chamber CB1 is changed by driving the piezoelectric element 60*a*, the volume of the pressure chamber CB2 is changed by driving the piezoelectric element 60*b*, the piezoelectric element 60*a* outputs a signal corresponding to the residual vibration generated due to the volume change of the pressure chamber CB1, and the piezoelectric element 60*b* outputs a signal corresponding to the residual vibration generated due to the volume change of the pressure chamber CB2. Alternatively, a piezoelectric element that changes the volume of pressure chamber CB1 may be a piezoelectric element different from a piezoelectric element that outputs a signal corresponding to the residual vibration generated due to the volume change of pressure chamber CB1, and a piezoelectric element that changes the volume of pressure chamber CB2 may be a piezoelectric element different from a piezoelectric element that outputs a signal corresponding to the residual vibration generated due to the volume change of pressure chamber CB2.

Alternatively, as shown in the print head 21 according to the embodiment, the piezoelectric element that changes the volume of the pressure chamber CB1 and the piezoelectric element that outputs a signal corresponding to the residual vibration generated due to the volume change of the pressure chamber CB1 may be the same piezoelectric element, and the piezoelectric element that changes the volume of the pressure chamber CB2 and the piezoelectric element that outputs a signal corresponding to the residual vibration generated due to the volume change of the pressure chamber CB2 may be the same piezoelectric element. Accordingly, the number of the piezoelectric elements provided in the print head 21 can be reduced, and the print head 21 can be reduced in size.

That is, the print head 21 may include the piezoelectric element 60*a* that outputs a signal corresponding to the residual vibration generated according to the volume change of the pressure chamber CB1 and the piezoelectric element 60*b* that outputs a signal corresponding to the residual vibration generated according to the volume change of the pressure chamber CB2, the piezoelectric elements 60*a* and 60*b* may be displaced according to the drive waveform Bdp1 of the drive voltage signal ComB, the volume of the pressure chamber CB1 may be changed according to the displacement of the piezoelectric element 60*a*, and the volume of the pressure chamber CB2 may be changed according to the displacement of the piezoelectric element 60*b*.

4. CONFIGURATION AND OPERATION OF RESIDUAL VIBRATION OUTPUT CIRCUIT

Figure 11:
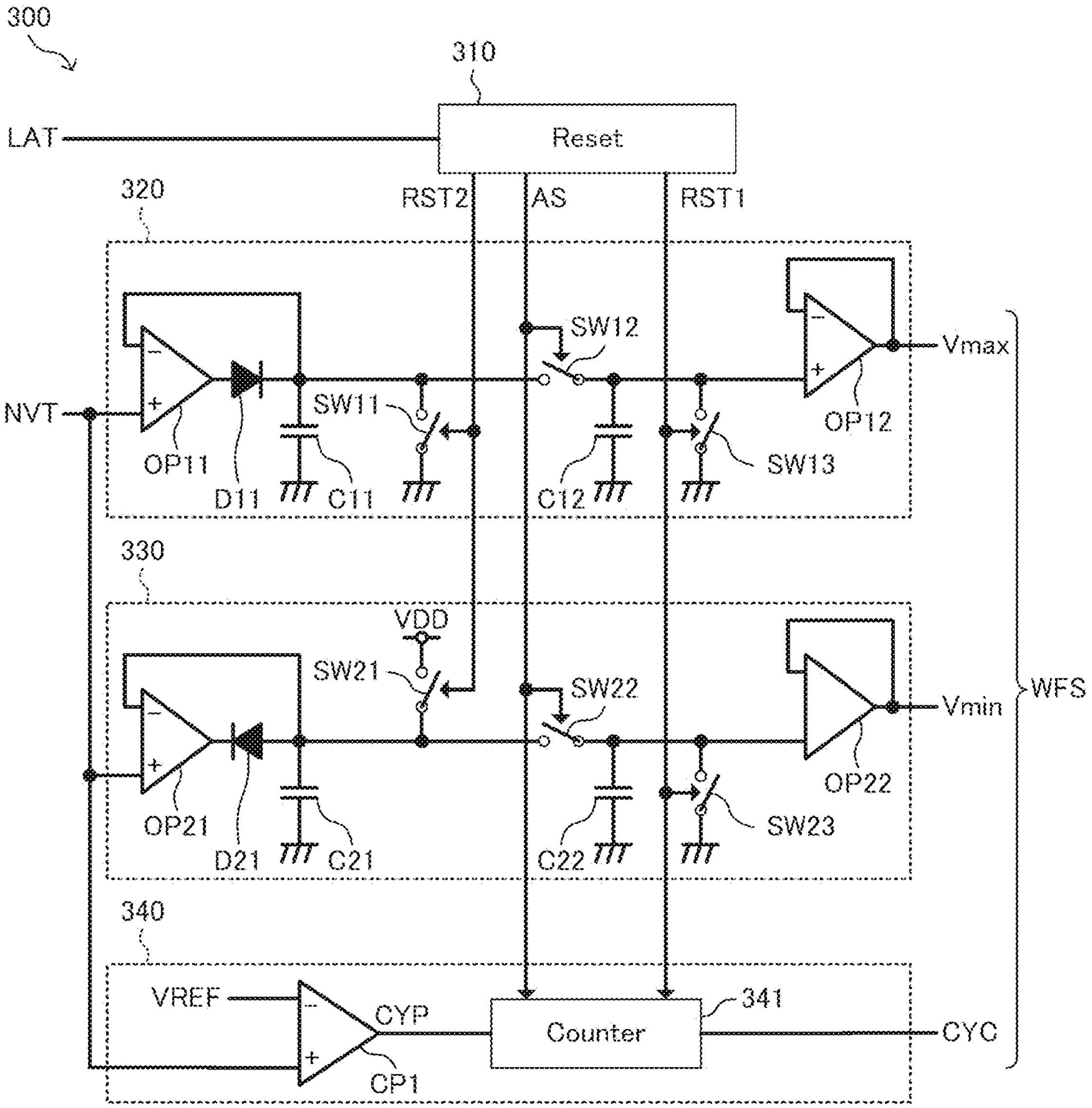
FIG. 11 shows an example of a configuration of a waveform information output circuit.

Next, a configuration and an operation of the waveform information output circuit 300 that acquires waveform information about the residual vibration detection signal NVT input from the residual vibration detection circuit 240 and that outputs the waveform information signal WFS including the acquired waveform information will be described. FIG. 11 shows an example of the configuration of the waveform information output circuit 300. As shown in FIG. 11, the waveform information output circuit 300 includes a reset circuit 310, a maximum voltage value acquisition circuit 320, a minimum voltage value acquisition circuit 330, and a period acquisition circuit 340.

The latch signal LAT is input to the reset circuit 310. In response to the input latch signal LAT, the reset circuit 310 outputs reset signals RST1 and RST2 whose logic levels change and an acquired signal AS.

The reset signal RST1 is a signal whose logic level rises to a high level when a latch pulse serving as the latch signal LAT rises and whose logic level lowers to a low level after a certain period elapses. The acquired signal AS is a signal whose logic level rises to a high level after the logic level of the reset signal RST1 lowers to a low level and whose logic level lowers to a low level after a certain period elapses. The reset signal RST2 is a signal whose logic level rises to a high level after the logic level of the acquired signal AS lowers to a low level, and whose logic level lowers to a low level after a certain period elapses. Here, a period in which the logic level of the reset signal RST1 is a high level, a period in which the logic level of the acquired signal AS is a high level, and a period in which the logic level of the reset signal RST2 is a high level are all included in the inspection period Ps1.

The maximum voltage value acquisition circuit 320 includes amplifier circuits OP11 and OP12, a diode D11, capacitors C11 and C12, and switches SW11, SW12, and SW13.

The residual vibration detection signal NVT is input to a positive-side input terminal of the amplifier circuit OP11. An anode terminal of the diode D11 is electrically coupled to an output terminal of the amplifier circuit OP11. A cathode terminal of the diode D11 is electrically coupled to a negative-side input terminal of the amplifier circuit OP11. The cathode terminal of the diode D11 is electrically coupled to one end of the capacitor C11, one end of the switch SW11, and one end of the switch SW12. A ground potential is supplied to the other end of the capacitor C11 and the other end of the switch SW11. The other end of the switch SW12 is electrically coupled to one end of the capacitor C12, one end of the switch SW13, and a positive-side input terminal of the amplifier circuit OP12. A ground potential is supplied to the other end of the capacitor C12 and the other end of the switch SW13. A negative-side input terminal of the amplifier circuit OP12 is electrically coupled to an output terminal of the amplifier circuit OP12. That is, the amplifier circuit OP12 configures a voltage follower circuit. The maximum voltage value acquisition circuit 320 configured as described above outputs, as a maximum voltage signal Vmax, a signal corresponding to a maximum voltage value of the input residual vibration detection signal NVT in a predetermined period, which is a signal of the output terminal of the amplifier circuit OP12 that configures the voltage follower circuit.

The reset signal RST2 is input to a control terminal of the switch SW11. When the logic level of the reset signal RST2 input to the control terminal is a high level, the switch SW11 is conductive between the one end and the other end, and when the logic level of the reset signal RST2 input to the control terminal is a low level, the switch SW11 is non-conductive between the one end and the other end. The conduction between the one end and the other end of the switch SW11 causes charges stored in the capacitor Cl1 to be discharged toward the ground potential. Accordingly, a voltage value of the one end of the capacitor Cl1 is reset to the ground potential.

The acquired signal AS is input to a control terminal of the switch SW12. When the logic level of the acquired signal AS input to the control terminal is a high level, the switch SW12 is conductive between one end and the other end, and when the logic level of the acquired signal AS input to the control terminal is a low level, the switch SW12 is non-conductive between the one end and the other end. The conduction between the one end and the other end of the switch SW12 causes charges stored in the capacitor Cl1 to be stored in the capacitor C12.

The reset signal RST1 is input to a control terminal of the switch SW13. When the logic level of the reset signal RST1 input to the control terminal is a high level, the switch SW13 is conductive between one end and the other end, and when the logic level of the reset signal RST1 input to the control terminal is a low level, the switch SW13 is non-conductive between the one end and the other end. The conduction between the one end and the other end of the switch SW13 causes charges stored in the capacitor C12 to be discharged toward the ground potential. Accordingly, a voltage value of the one end of the capacitor C12 is reset to the ground potential.

In the following description, conduction between one end and the other end of each of the switches SW11, SW12, and SW13 may be referred to as "on", and non-conduction between one end and the other end of each of the switches SW11, SW12, and SW13 may be referred to as "off".

The minimum voltage value acquisition circuit 330 includes amplifier circuits OP21 and OP22, a diode D21, capacitors C21 and C22, and switches SW21, SW22, and SW23.

The residual vibration detection signal NVT is input to a positive-side input terminal of the amplifier circuit OP21. A cathode terminal of the diode D21 is electrically coupled to an output terminal of the amplifier circuit OP21. An anode terminal of the diode D21 is electrically coupled to a negative-side input terminal of the amplifier circuit OP21. The anode terminal of the diode D21 is electrically coupled to one end of the capacitor C21, one end of the switch SW21, and one end of the switch SW22. A ground potential is supplied to the other end of the capacitor C21. A voltage signal VDD is supplied to the other end of the switch SW21. A voltage vd which has a voltage value of the voltage signal VDD may be equal to or higher than a voltage vb which has a voltage value of a bias voltage signal VB. The other end of the switch SW22 is electrically coupled to one end of the capacitor C22, one end of the switch SW23, and a positive-side input terminal of the amplifier circuit OP22. A ground potential is supplied to the other end of the capacitor C22 and the other end of the switch SW23. A negative-side input terminal of the amplifier circuit OP22 is electrically coupled to an output terminal of the amplifier circuit OP22. That is, the amplifier circuit OP22 configures a voltage follower circuit. The minimum voltage value acquisition circuit 330 configured as described above outputs, as a minimum voltage signal Vmin, a signal corresponding to a minimum voltage value of the input residual vibration detection signal NVT in a predetermined period, which is a signal of the output terminal of the amplifier circuit OP22 that configures the voltage follower circuit.

The reset signal RST2 is input to a control terminal of the switch SW21. When a logic level of the reset signal RST2 input to the control terminal is a high level, the switch SW21 is conductive between one end and the other end, and when the logic level of the reset signal RST2 input to the control terminal is a low level, the switch SW21 is non-conductive between the one end and the other end. The conduction between one end and the other end of the switch SW21 causes predetermined charges corresponding to the voltage signal VDD to be stored in the capacitor C21. Accordingly, a voltage value of the one end of the capacitor C21 is reset to the voltage vd which has a voltage value of the voltage signal VDD.

The acquired signal AS is input to a control terminal of the switch SW22. When the logic level of the acquired signal AS input to the control terminal is a high level, the switch SW22 is conductive between one end and the other end, and when the logic level of the acquired signal AS input to the control terminal is a low level, the switch SW22 is non-conductive between the one end and the other end. The conduction between the one end and the other end of the switch SW22 causes charges stored in the capacitor C21 to be stored in the capacitor C22.

The reset signal RST1 is input to a control terminal of the switch SW23. When a logic level of the reset signal RST1 input to the control terminal is a high level, the switch SW23 is conductive between one end and the other end, and when the logic level of the reset signal RST1 input to the control terminal is a low level, the switch SW23 is non-conductive between the one end and the other end. The conduction between the one end and the other end of the switch SW23 causes charges stored in the capacitor C22 to be discharged toward the ground potential. Accordingly, a voltage value of the one end of the capacitor C22 is reset to the ground potential.

In the following description, conduction between one end and the other end of each of the switches SW21, SW22, and SW23 may be referred to as "on", and non-conduction between one end and the other end of each of the switches SW21, SW22, and SW23 may be referred to as "off".

The period acquisition circuit 340 includes a comparator CP1 and a counter circuit 341.

The residual vibration detection signal NVT is input to a positive-side input terminal of the comparator CP1. A voltage signal VREF is input to a negative-side input terminal of the comparator CP1. The comparator CP1 generates a periodic pulse signal CYP that is at a high level when a voltage value of the residual vibration detection signal NVT input to the positive-side input terminal is larger than a voltage value of the voltage signal VREF input to the negative-side input terminal, and that is at a low level when the voltage value of the residual vibration detection signal NVT input to the positive-side input terminal is smaller than the voltage value of the voltage signal VREF input to the negative-side input terminal, and the comparator CP1 outputs the periodic pulse signal CYP from an output terminal to the counter circuit 341.

Here, a voltage vref which has a voltage value of the voltage signal VREF is a voltage value near the voltage vb which has a voltage value of the bias voltage signal VB, and may be stored in, for example, a storage circuit (not shown) provided in the control circuit 100. The voltage vref which has the voltage value of the voltage signal VREF may be changeable according to an operation state or an operation environment of the liquid ejection apparatus 1.

The counter circuit 341 measures a period during which the logic level of the input period signal CYC changes from a high level to a low level and then back to a high level or a period during which the logic level of the input period signal CYC changes from a low level to a high level and then back to a low level, after the logic level of the reset signal RST1 changes from a high level to a low level, and stores a measurement result as measurement result information CT. When the logic level of the acquired signal AS changes from a low level to a high level, the counter circuit 341 generates and outputs the period signal CYC including the stored measurement result information CT. The counter circuit 341 uses a clock circuit (not shown) to measure the period during which the logic level of the period signal CYC changes from a high level to a low level and then back to a high level, or a period during which the logic level of the period signal CYC changes from a low level to a high level and then back to a low level, and stores a measurement result.

As described above, the waveform information output circuit 300 outputs the maximum voltage signal Vmax output by the maximum voltage value acquisition circuit 320, the minimum voltage signal Vmin output by the minimum voltage value acquisition circuit 330, and the period signal CYC output by the period acquisition circuit 340 as waveform information about the input residual vibration detection signal NVT. That is, the maximum voltage signal Vmax, the minimum voltage signal Vmin, and the period signal CYC are included in the waveform information signal WFS including the waveform information about the residual vibration detection signal NVT.

Figure 12:
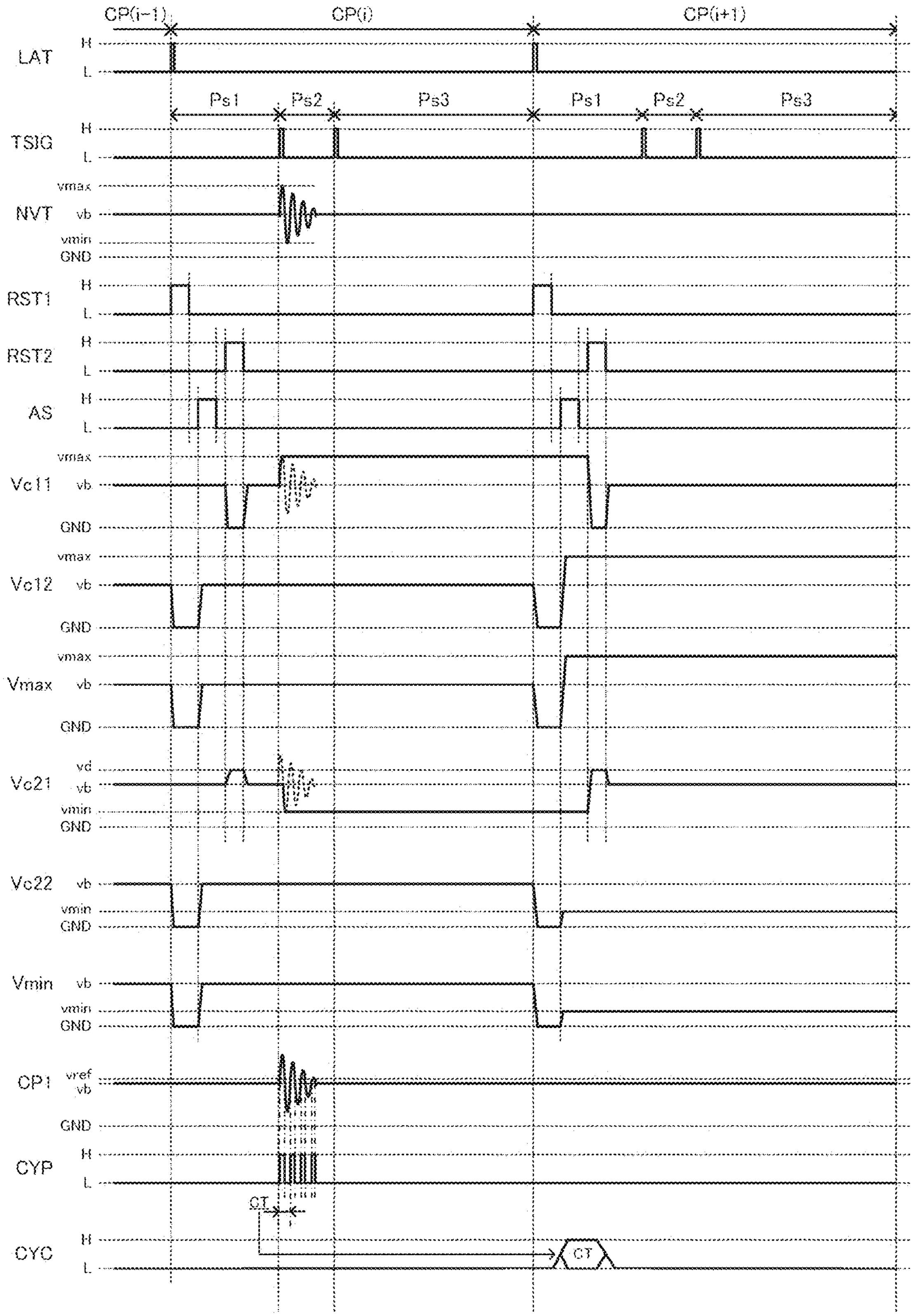
FIG. 12 is a diagram showing an operation of the waveform information output circuit.

Next, an operation of the waveform information output circuit 300 will be described. FIG. 12 is a diagram showing the operation of the waveform information output circuit 300. Here, in order to describe the operation of the waveform information output circuit 300, in the following description, a freely selected dot formation period Cp in which the state inspection CD is performed on the target ejector 600 is referred to as a dot formation period Cp(i), a dot formation period Cp that is subsequent to the dot formation period Cp(i) and in which the state inspection CD is not performed on the target ejector 600 is referred to as a dot formation period Cp(i+1), and a dot formation period Cp that is before the dot formation period Cp(i) and in which the state inspection CD is not performed on the target ejector 600 is referred to as a dot formation period Cp(i−1). In the following description, a signal held at one end of the capacitor Cl1 is referred to as a voltage signal Vc11, a signal held at one end of the capacitor C12 is referred to as a voltage signal Vc12, a signal held at one end of the capacitor C21 is referred to as a voltage signal Vc21, a signal held at one end of the capacitor C22 is referred to as a voltage signal Vc22, a maximum voltage value of the residual vibration detection signal NVT input to the waveform information output circuit 300 is referred to as a voltage vmax, and a minimum voltage value of the residual vibration detection signal NVT input to the waveform information output circuit 300 is referred to as a voltage vmin.

In the dot formation period Cp(i−1), the state inspection CD is not performed on the target ejector 600. Accordingly, immediately before the control circuit 100 outputs the latch pulse that defines the end of the dot formation period Cp(i−1) as the latch signal LAT, the residual vibration detection circuit 240 outputs a signal having a constant voltage value of the voltage vb to the waveform information output circuit 300 regardless of the input residual vibration reference signal Vo1 and residual vibration detection signal Vo2. Therefore, immediately before the control circuit 100 outputs the latch pulse that defines the end of the dot formation period Cp(i−1) as the latch signal LAT, the voltage vb serving as the voltage signal Vc11 is held at one end of the capacitor Cl1, and the voltage vb serving as the voltage signal Vc21 is held at one end of the capacitor C21.

In addition, immediately before the control circuit 100 outputs the latch pulse that defines the end of the dot formation period Cp(i−1) as the latch signal LAT, a signal that has a constant voltage value of the voltage vb and is output from the residual vibration detection circuit 240 is also input to a positive-side input terminal of the comparator CP1. At this time, a constant voltage signal VREF having a voltage value of the voltage vref is input to a negative-side input terminal of the comparator CP1. Accordingly, the comparator CP1 outputs a signal having a constant logic level at a high level or a low level as the periodic pulse signal CYP.

Thereafter, the control circuit 100 outputs, as the latch signal LAT, a latch pulse that defines the end of the dot formation period Cp(i−1) and the start of the dot formation period Cp(i). The latch signal LAT output from the control circuit 100 is input to the reset circuit 310 of the waveform information output circuit 300. The reset circuit 310 sets the logic level of the reset signal RST1 to be output to a high level when the latch pulse input as the latch signal LAT rises. Accordingly, the switch SW13 and the switch SW23 are turned on. As a result, charges stored in the capacitor C12 are discharged to the ground potential via the switch SW13, and charges stored in the capacitor C22 are discharged to the ground potential via the switch SW23. That is, the ground potential is supplied to one end of the capacitor C12 and one end of the capacitor C22.

Thereafter, the reset circuit 310 sets the logic level of the reset signal RST1 to be output to a low level. Accordingly, the switch SW13 and the switch SW23 are turned off. As a result, the ground potential is held at one end of the capacitor C12 as the voltage signal Vc12, and the ground potential is held at one end of the capacitor C22 as the voltage signal Vc22. In other words, the waveform information output circuit 300 resets the voltage value of the voltage signal Vc12 held at one end of the capacitor C12 and the voltage value of the voltage signal Vc22 held at one end of the capacitor C22 to a predetermined voltage value, that is, the ground potential, based on the logic level of the reset signal RST1 output from the reset circuit 310.

The reset circuit 310 sets the logic level of the reset signal RST1 to be output to a low level, and then sets the logic level of the acquired signal AS to be output to a high level. Accordingly, the switch SW12 and the switch SW22 are turned on. As a result, charges stored in the capacitor Cl1 flows into the capacitor C12 via the switch SW12, and charges stored in the capacitor C21 propagates to the capacitor C22 via the switch SW22. That is, the voltage vb held as the voltage signal Vc11 at one end of the capacitor Cl1 is supplied to one end of the capacitor C12, and the voltage vb held as the voltage signal Vc21 at one end of the capacitor C21 is supplied to one end of the capacitor C22.

Thereafter, the reset circuit 310 sets the logic level of the acquired signal AS to be output to a low level. Accordingly, the switch SW12 and the switch SW22 are turned off. As a result, the voltage vb is held as the voltage signal Vc12 at one end of the capacitor C12, and the voltage vb is held as the voltage signal Vc22 at one end of the capacitor C22. In other words, based on the logic level of the acquired signal AS output from the reset circuit 310, the waveform information output circuit 300 takes the voltage value of the voltage signal Vc11 held at the one end of the capacitor C11 as the voltage signal Vc12 at the one end of the capacitor C12, and holds the voltage value at the one end of the capacitor C12, and takes the voltage value of the voltage signal Vc22 held at the one end of the capacitor C21 as the voltage signal Vc22 at the one end of the capacitor C22 and holds the voltage value at the one end of the capacitor C22.

The reset circuit 310 sets the logic level of the acquired signal AS to be output to a low level, and then sets the logic level of the reset signal RST2 to be output to a high level.

Accordingly, the switch SW11 and the switch SW21 are turned on. As a result, charges stored in the capacitor Cl1 are discharged to the ground potential via the switch SW11, and charges based on the voltage vd which is the voltage value of the voltage signal VDD are stored in the capacitor C21 via the switch SW21. That is, the ground potential is supplied to one end of the capacitor Cl1, and the voltage vd is supplied to one end of the capacitor C21 as the voltage signal Vc21.

Thereafter, the reset circuit 310 sets the logic level of the reset signal RST2 to be output to a low level. Accordingly, the switch SW11 and switch SW21 are turned off. As a result, the ground potential is held at one end of the capacitor C11 as the voltage signal Vc11, and the voltage vd is held at one end of the capacitor C21 as the voltage signal Vc21. In other words, based on the logic level of the reset signal RST2, the waveform information output circuit 300 resets the voltage value of the voltage signal Vc12 held at the one end of the capacitor C11 to a predetermined voltage value, that is, the ground potential, and resets the voltage value of the voltage signal Vc22 held at the one end of the capacitor C21 to a predetermined voltage value, that is, the voltage vd.

Thereafter, the control circuit 100 outputs an inspection pulse as the inspection timing signal TSIG. Accordingly, the residual vibration detection circuit 240 outputs, to the waveform information output circuit 300, the residual vibration detection signal NVT that is the residual vibration detection signal corresponding to the residual vibration generated in the corresponding ejector 600 and is obtained by differentially amplifying the residual vibration reference signal Vo1 and the residual vibration detection signal Vo2 input from the corresponding selection circuit 230 and by adding the voltage vb. That is, when the control circuit 100 outputs the inspection pulse as the inspection timing signal TSIG, the residual vibration detection signal NVT corresponding to the residual vibration generated in the corresponding ejector 600 is input to the waveform information output circuit 300.

The residual vibration detection signal NVT input to the waveform information output circuit 300 is supplied to the positive-side input terminal of the amplifier circuit OP11. The amplifier circuit OP11 outputs a signal having the same potential as the input residual vibration detection signal NVT from an output terminal. When the voltage value of the signal output from the amplifier circuit OP11 is larger than the voltage value of the voltage signal Vc11 held at the one end of the capacitor Cl1, the signal output from the amplifier circuit OP11 is supplied to the one end of the capacitor Cl1 via the diode D11. On the other hand, when the voltage value of the signal output from the amplifier circuit OP11 is smaller than the voltage value of the voltage signal Vc11 held at the one end of the capacitor Cl1, the signal output from the amplifier circuit OP11 is blocked by the diode D11. Accordingly, the voltage vmax, which is a maximum value of the voltage value of the signal output from the amplifier circuit OP11 and a maximum voltage value of the residual vibration detection signal NVT, is held at the one end of the capacitor C11 as the voltage signal Vc11. That is, the maximum voltage value acquisition circuit 320 acquires the voltage vmax which is the maximum voltage value of the residual vibration detection signal NVT as waveform information about the residual vibration detection signal NVT, and holds the voltage vmax as the voltage signal Vc11 at the one end of the capacitor C11.

The residual vibration detection signal NVT input to the waveform information output circuit 300 is also supplied to the positive-side input terminal of the amplifier circuit OP21. The amplifier circuit OP21 outputs a signal having the same potential as the input residual vibration detection signal NVT from an output terminal. When a voltage value of the signal output from the amplifier circuit OP21 is smaller than the voltage value of the voltage signal Vc21 held at the one end of the capacitor C21, charges held at the one end of the capacitor C21 are discharged via the diode D21 and the amplifier circuit OP21. Accordingly, the voltage value of the voltage signal Vc11 held at the one end of the capacitor C21 is reduced to the voltage value of the signal output from the amplifier circuit OP21. On the other hand, when the voltage value of the signal output from the amplifier circuit OP21 is larger than the voltage value of the voltage signal Vc21 held at the one end of the capacitor C21, charges held at the one end of the capacitor C21 are not discharged via the diode D21 and the amplifier circuit OP21. At this time, the voltage value of the voltage signal Vc21 held at the one end of the capacitor C21 does not change. Accordingly, the voltage vmin, which is a minimum value of the voltage value of the signal output from the amplifier circuit OP21 and a minimum voltage value of the residual vibration detection signal NVT, is held at the one end of the capacitor C21 as the voltage signal Vc21. That is, the minimum voltage value acquisition circuit 330 acquires the voltage vmin which is the minimum voltage value of the residual vibration detection signal NVT as waveform information about the residual vibration detection signal NVT, and holds the voltage vmin as the voltage signal Vc21 at the one end of the capacitor C21.

The residual vibration detection signal NVT input to the waveform information output circuit 300 is also supplied to the positive-side input terminal of the comparator CP1. The comparator CP1 outputs the periodic pulse signal CYP that is at a high level when the voltage value of the residual vibration detection signal NVT supplied to the positive-side input terminal is larger than the voltage vref that is the voltage value of the voltage signal VREF supplied to the negative-side input terminal, and that is at a low level when the voltage value of the residual vibration detection signal NVT supplied to the positive-side input terminal is smaller than the voltage vref that is the voltage value of the voltage signal VREF supplied to the negative-side input terminal.

Here, as described above, the residual vibration detection signal NVT is a signal obtained by differentially amplifying the residual vibration reference signal Vo1 and the residual vibration detection signal Vo2 and adding the voltage vb. Therefore, the voltage value of the residual vibration detection signal NVT changes according to the residual vibration of the corresponding ejector 600 with the voltage vb as a reference potential. The voltage vref which is the voltage value of the voltage signal VREF is a voltage value near the voltage vb which is the voltage value of the bias voltage signal VB. Therefore, a period in which the logic level of the periodic pulse signal CYP is switched corresponds to a period of the residual vibration detection signal NVT.

The counter circuit 341 measures a time required to change the logic level of the input periodic pulse signal CYP, and stores the time as measurement result information CT. Here, FIG. 12 shows an example in which the counter circuit 341 measures a time required to change the logic level of the period signal CYC in one period, which is a time required to change the logic level of the period signal CYC from a high level to a low level and then back to a high level, and stores the time as the measurement result information CT. Alternatively, the counter circuit 341 may measure a time required to change the logic level of the input period signal CYC from a high level to a low level and store the time as the measurement result information CT, or may measure a time required to change the logic level of the period signal CYC in two or more periods, and store the time as the measurement result information CT. That is, the period acquisition circuit 340 acquires the measurement result information CT corresponding to a period of the residual vibration detection signal NVT as the waveform information about the residual vibration detection signal NVT, and stores the measurement result information CT in the counter circuit 341.

That is, the period acquisition circuit 340 outputs the period signal CYC according to a comparison result between the voltage vref which is the voltage value of the voltage signal VREF and the voltage value of the residual vibration detection signal NVT.

Thereafter, the control circuit 100 outputs, as the latch signal LAT, a latch pulse that defines the end of the dot formation period Cp(i) and the start of the dot formation period Cp(i+1). The latch signal LAT output from the control circuit 100 is input to the reset circuit 310 of the waveform information output circuit 300. The reset circuit 310 sets the logic level of the reset signal RST1 to be output to a high level when the latch pulse input as the latch signal LAT rises. The ground potential is supplied to one end of the capacitor C12, and the ground potential is supplied to one end of the capacitor C22. Thereafter, the reset circuit 310 sets the logic level of the reset signal RST1 to be output to a low level, so that the ground potential is held as the voltage signal Vc12 at the one end of the capacitor C12 and the ground potential is held as the voltage signal Vc22 at the one end of the capacitor C22. That is, the voltage value of the voltage signal Vc12 held at the one end of the capacitor C12 and the voltage value of the voltage signal Vc22 held at the one end of the capacitor C22 are reset to a predetermined voltage value, that is, the ground potential.

Thereafter, the reset circuit 310 sets the logic level of the reset signal RST1 to be output to a low level, and then sets the logic level of the acquired signal AS to be output to a high level. Accordingly, the voltage vmax, which is the maximum voltage value of the residual vibration detection signal NVT held at one end of the capacitor Cl1 as the voltage signal Vc11, is supplied to the one end of the capacitor C12, and the voltage vmin, which is the minimum voltage value of the residual vibration detection signal NVT held at one end of the capacitor C21 as the voltage signal Vc21, is supplied to the one end of the capacitor C22. That is, the voltage vmax held as the voltage signal Vc11 at the one end of the capacitor Cl1 is taken into the one end of the capacitor C12, and the voltage vmin held as the voltage signal Vc22 at the one end of the capacitor C21 is taken into the one end of the capacitor C22. When the reset circuit 310 sets the logic level of the acquired signal AS to be output to a low level, the capacitor C12 holds the voltage vmax as the voltage signal Vc12, and the capacitor C22 holds the voltage vmin as the voltage signal Vc22.

The voltage vmax held as the voltage signal Vc12 in the capacitor C12 is subjected to impedance conversion in the amplifier circuit OP12, and then is output as the maximum voltage signal Vmax, and the voltage vmin held as the voltage signal Vc22 in the capacitor C12 is subjected to impedance conversion in the amplifier circuit OP22 and then is output as the minimum voltage signal Vmin. The voltage vmax output by the waveform information output circuit 300 as the maximum voltage signal Vmax is one piece of waveform information about the residual vibration detection signal NVT corresponding to the residual vibration generated in the corresponding ejector 600 during the dot formation period Cp(i), and corresponds to a maximum value of an amplitude of the residual vibration detection signal NVT, and the voltage vmin output by the waveform information output circuit 300 as the minimum voltage signal Vmin is one piece of waveform information about the residual vibration detection signal NVT corresponding to the residual vibration generated in the corresponding ejector 600 during the dot formation period Cp(i), and corresponds to a minimum value of an amplitude of the residual vibration detection signal NVT.

When the reset circuit 310 sets the logic level of the acquired signal AS to be output to a high level, the counter circuit 341 generates the period signal CYC including the measurement result information CT held as the waveform information about the residual vibration detection signal NVT, and outputs the period signal CYC from the waveform information output circuit 300. The period signal CYC including the measurement result information CT held as the waveform information about the residual vibration detection signal NVT output by the waveform information output circuit 300 is one piece of waveform information about the residual vibration detection signal NVT corresponding to the residual vibration generated in the corresponding ejector 600 in the dot formation period Cp(i), and corresponds to a period of the residual vibration detection signal NVT.

That is, in the dot formation period Cp(i), the waveform information output circuit 300 acquires the maximum voltage signal Vmax corresponding to the maximum voltage of the residual vibration detection signal NVT, the minimum voltage signal Vmin corresponding to the minimum voltage of the residual vibration detection signal NVT, and the period signal CYC corresponding to the period of the residual vibration detection signal NVT as the waveform information about the residual vibration detection signal NVT corresponding to the residual vibration generated in the corresponding ejector 600. Thereafter, the waveform information output circuit 300 outputs the waveform information signal WFS including the acquired waveform information to the control circuit 100.

As described above, the waveform information output circuit 300 includes the maximum voltage value acquisition circuit 320 that holds the maximum voltage value of the residual vibration detection signal NVT as the maximum voltage signal Vmax in the dot formation period Cp, the minimum voltage value acquisition circuit 330 that holds the minimum voltage value of the residual vibration detection signal NVT as the minimum voltage signal Vmin in the dot formation period Cp, the period acquisition circuit 340 that outputs the period signal CYC corresponding to the period of the residual vibration detection signal NVT, the switches SW11 and SW13 that reset the maximum value of the residual vibration detection signal NVT held by the maximum voltage value acquisition circuit 320, and the switches SW21 and SW23 that reset the minimum value of the residual vibration detection signal NVT held by the minimum voltage value acquisition circuit 330.

5. RESIDUAL VIBRATION SIGNAL

Then, a specific example of the residual vibration generated in the ejector 600 to be inspected after the drive voltage signal Vin is supplied to the ejector 600 and a specific example of the residual vibration signal Vout corresponding to the residual vibration will be described. After the piezoelectric elements 60*a* and 60*b* provided in the ejector 600 are driven according to the drive voltage signal Vin including the drive waveform Bdp1, the liquid ejection apparatus 1 according to the embodiment acquires the residual vibration signal Vout corresponding to the residual vibration generated in the ejector 600, and determines a state of the corresponding ejector 600 based on the residual vibration detection signal NVT corresponding to the acquired residual vibration signal Vout.

Specifically, in the liquid ejection apparatus 1 according to the embodiment, each of the piezoelectric elements 60*a* and 60*b* provided in the corresponding ejector 600 is driven by being supplied with the drive voltage signal Vin including the drive waveform Bdp1. Then, the vibration plate 304 is displaced by driving the piezoelectric elements 60*a* and 60*b*, and internal pressure of the pressure chambers CB1 and CB2 changes due to the displacement of the vibration plate 304. Thereafter, when a voltage value of the drive voltage signal Vin supplied to the piezoelectric elements 60*a* and 60*b* is constant, attenuation vibration due to a change in the internal pressure of the pressure chambers CB1 and CB2 occurs in the vibration plate 304. At this time, the piezoelectric elements 60*a* and 60*b* are displaced due to the attenuation vibration generated in the vibration plate 304. Then, charges corresponding to the displacement are discharged from the piezoelectric elements 60*a* and 60*b*. A signal corresponding to the charges discharged from the piezoelectric elements 60*a* and 60*b* due to the attenuation vibration generated in the vibration plate 304 corresponds to the residual vibration signal Vout. Here, in the following description, a signal corresponding to the charges, which is output from the piezoelectric element 60*a* and is generated corresponding to an attenuation signal of the vibration plate 304, may be referred to as a residual vibration signal Vout1, and a signal corresponding to the charges, which is output from the piezoelectric element 60*b* and is generated corresponding to an attenuation signal of the vibration plate 304, may be referred to as a residual vibration signal Vout2.

Figure 13:
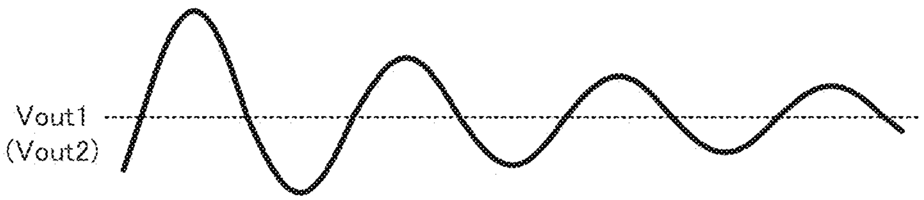
FIG. 13 is a diagram showing an example of residual vibration signals Vout1 and Vout2.

FIG. 13 is a diagram showing an example of the residual vibration signals Vout1 and Vout2. As shown in FIG. 13, a signal waveform of the residual vibration signals Vout1 and Vout2 is an attenuation vibration waveform in which a voltage amplitude decreases over time according to the attenuation vibration generated in the vibration plate 304 due to the change in the internal pressure of the pressure chambers CB1 and CB2. Waveform information such as an amplitude and a period contained in the attenuation vibration waveform of the residual vibration signals Vout1 and Vout2 changes depending on a state of the ink retained in the pressure chambers CB1 and CB2 and a state of the ink flowing through the communication flow path RR1 and the nozzle flow path RN.

Figure 14:
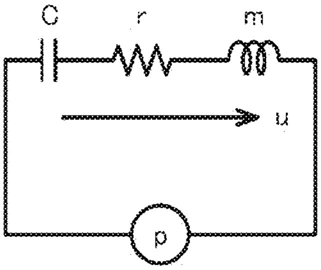
FIG. 14 is a diagram showing an example of a calculation model of a simple harmonic motion assuming that a residual vibration is generated in a pressure chamber CB1, a pressure chamber CB2, or a vibration plate 304.

Here, a relationship between the waveform information about the residual vibration signals Vout1 and Vout2 and the state of the ink retained in the pressure chambers CB1 and CB2 or the state of the ink flowing through the communication flow paths RR1 and RR2 and the nozzle flow paths RN will be described using a calculation model. FIG. 14 is a diagram showing an example of the calculation model of a simple harmonic motion assuming that the residual vibration is generated in the pressure chamber CB1, the pressure chamber CB2, or the vibration plate 304. As described above, the piezoelectric elements 60*a* and 60*b* are displaced by being supplied with the drive voltage signal Vin, and the vibration plate 304 is also displaced due to the displacement of the piezoelectric elements 60*a* and 60*b*. Then, volumes of the pressure chambers CB1 and CB2 change according to the displacement of the vibration plate 304. In this case, a part of the ink filled in the pressure chambers CB1 and CB2 is ejected from the nozzle N according to pressure generated inside the pressure chambers CB1 and CB2.

In such a series of operations of ejecting the ink from the nozzle N, the vibration plate 304 freely vibrates with a natural vibration frequency determined by a flow path resistance r based on a shape of a flow path through which the ink flows or viscosity of the ink, an inertance m caused by a liquid weight in the flow path, and a compliance C of the vibration plate 304, and the piezoelectric elements 60*a* and 60*b* are displaced corresponding to the free vibration generated in the vibration plate 304. A signal of charges generated due to the displacement of the piezoelectric element 60*a* is output as the residual vibration signal Vout1, and a signal of charges generated due to the displacement of the piezoelectric element 60*b* is output as the residual vibration signal Vout2.

Such a calculation model of the residual vibration generated in the vibration plate 304 can be expressed by pressure p, the inertance m, the compliance C, and the flow path resistance r. Then, by calculating a step response when the pressure p is applied to a circuit shown in FIG. 14 relative to a volume velocity u, the following Formulas (1) to (3) are obtained.

$$u = \frac{p}{\omega \cdot m} e^{-\alpha \cdot t} \cdot \sin\omega t \tag{1}$$

$$\omega = \sqrt{\frac{1}{m \cdot C_m} - \alpha^2} \tag{2}$$

$$\alpha = \frac{r}{2m} \tag{3}$$

Figure 15:
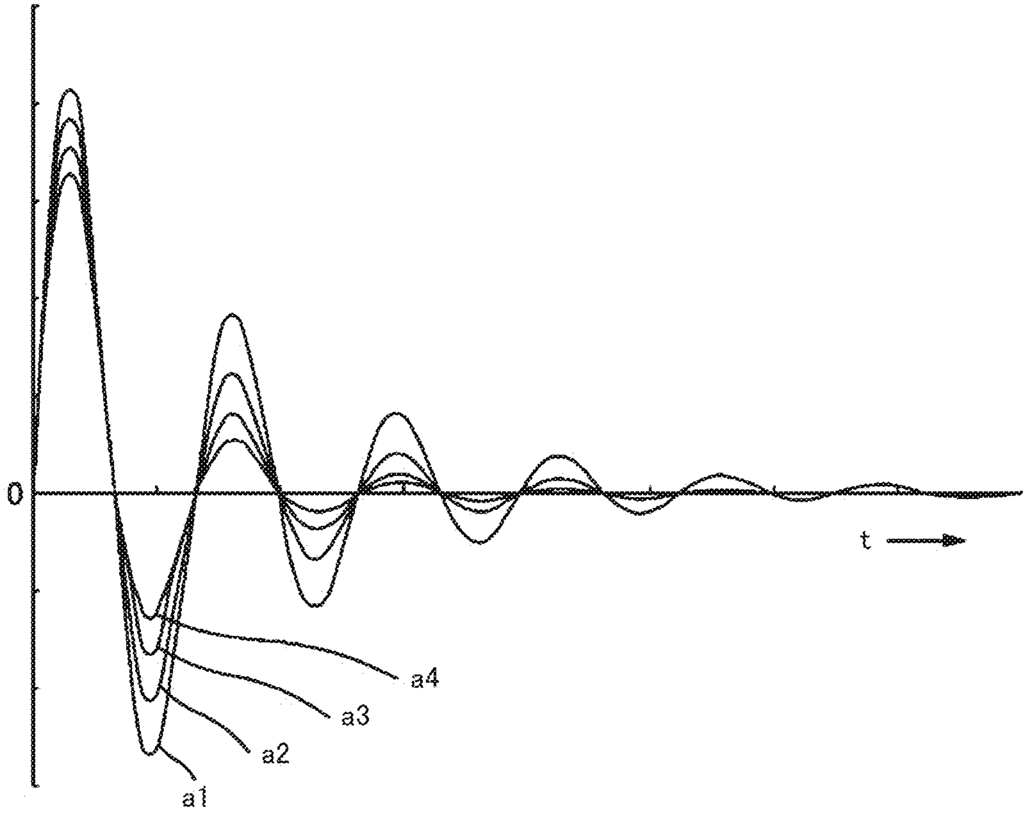
FIG. 15 is a diagram showing a relationship between viscosity of ink and signal waveforms of the residual vibration signals Vout1 and Vout2.

FIG. 15 is a diagram showing a relationship between the viscosity of the ink and the signal waveform of the residual vibration signals Vout1 and Vout2. In FIG. 15, a horizontal axis represents time, and a vertical axis represents a magnitude of the residual vibration. FIG. 15 shows a signal waveform when a viscosity increasing ratio is 1.0 as a waveform a1, a signal waveform when the viscosity increasing ratio is 1.4 as a waveform a2, a signal waveform when the viscosity increasing ratio is 1.8 as a waveform a3, and a signal waveform when the viscosity increasing ratio is 2.2 as a waveform a4, the viscosity increasing ratio being the viscosity of the ink.

As shown in FIG. 15, when the viscosity of the retained ink increases and the viscosity increasing ratio increases, amplitudes of the residual vibration signals Vout1 and Vout2 and an attenuation rate change. Specifically, when the viscosity of the ink retained in the pressure chambers CB1 and CB2, the ink flowing through the communication flow paths RR1 and RR2 and the nozzle flow path RN, the ink in the vicinity of the nozzle N, and the like increases, the flow path resistance r increases. Therefore, the amplitude of the attenuation vibration generated in the vibration plate 304 decreases, and the attenuation rate increases. As a result, when a viscosity increase abnormality occurs in the retained ink, the amplitudes of the corresponding residual vibration signals Vout1 and Vout2 decrease and the attenuation rate increases.

Figure 16:
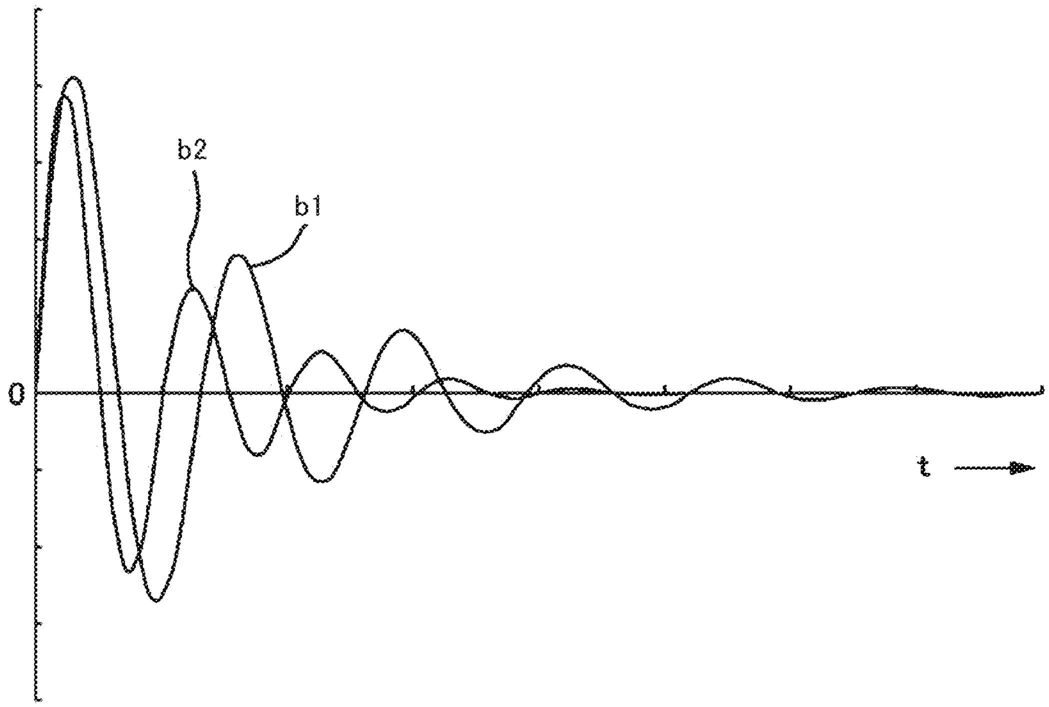
FIG. 16 is a diagram showing signal waveforms of the residual vibration signals Vout1 and Vout2 when bubbles infiltrate the pressure chambers CB1 and CB2.

FIG. 16 is a diagram showing signal waveforms of the residual vibration signals Vout1 and Vout2 when bubbles infiltrate the pressure chambers CB1 and CB2. In FIG. 16, a horizontal axis represents time, and a vertical axis represents a magnitude of the residual vibration. Further, FIG. 16 shows an example of a waveform b1 as a signal waveform in a normal state in which no bubbles infiltrates the pressure chambers CB1 and CB2, the communication flow paths RR1 and RR2, and the nozzle flow path RN, and a waveform b2 as a signal waveform when bubbles infiltrate one of the pressure chambers CB1 and CB2, the communication flow paths RR1 and RR2, and the nozzle flow path RN.

As shown in FIG. 16, when bubbles infiltrate the pressure chambers CB1 and CB2, the communication flow paths RR1 and RR2, and the nozzle flow path RN, vibration frequencies of the residual vibration signals Vout1 and Vout2 increase. Specifically, when bubbles infiltrate inner sides of the pressure chambers CB1 and CB2, the communication flow paths RR1 and RR2, the nozzle flow path RN, and the nozzle N, the inertance m corresponding to a weight of the retained ink decreases by an amount of the infiltrating bubbles. Further, when the inertance m decreases, an angular velocity ω increases as shown in Formula (2). Accordingly, a vibration period of the residual vibration generated in the vibration plate 304 is shortened, and as a result, the vibration frequencies of the residual vibration signals Vout1 and Vout2 increase, and a period is shortened.

As described above, when there is a viscosity increase abnormality in which the viscosity of the ink increases, or a bubble infiltration abnormality in which bubbles infiltrate the pressure chamber CB1, the communication flow path RR1, the nozzle flow path RN, and the like, waveform information such as an amplitude and a period of the residual vibration signal Vout1 changes, and similarly, when there is a viscosity increase abnormality or a bubble infiltration abnormality in the pressure chamber CB2, the communication flow path RR2, the nozzle flow path RN, and the like, waveform information such as an amplitude and a period of the residual vibration signal Vout2 changes. Therefore, a state of the ejector 600 including the piezoelectric elements 60*a* and 60*b* that output the residual vibration signals Vout1 and Vout2 can be determined based on the waveform information such as the amplitude and the period of each of the residual vibration signals Vout1 and Vout2.

Here, when it is assumed that the drive signal selection circuit 200 separately acquires both the residual vibration signal Vout1 and the residual vibration signal Vout2, and the control circuit 100 separately calculates the waveform information such as the amplitude and the period of the residual vibration signal Vout1 and the waveform information such as the amplitude and the period of the residual vibration signal Vout2, it may be possible to determine the state of the ejector 600 even in a configuration in which the ejector 600 includes the pressure chamber CB1 and the pressure chamber CB2. However, in the configuration in which the ejector 600 includes the pressure chamber CB1 and the pressure chamber CB2, when both the residual vibration signal Vout1 and the residual vibration signal Vout2 are separately acquired, and the state of the ejector 600 is determined, the drive signal selection circuit 200 needs to have a configuration for switching whether to acquire the residual vibration signal Vout1 or to acquire the residual vibration signal Vout2, and as a result, there is a concern that the integrated circuit 201 in which the drive signal selection circuit 200 is mounted is increased in size.

In response to this problem, in the liquid ejection apparatus 1 according to the embodiment, the drive signal selection circuit 200 acquires the residual vibration signal Vout obtained by combining the residual vibration signal Vout1 and the residual vibration signal Vout2, and outputs the residual vibration detection signal NVT corresponding to the residual vibration signal Vout. Then, the waveform information output circuit 300 acquires the waveform information about the residual vibration detection signal NVT and outputs the waveform information as the waveform information signal WFS to the control circuit 100, and the control circuit 100 determines the state of the ejector 600 based on the input waveform information signal WFS. Accordingly, there is no need for a configuration for switching to acquire the residual vibration signal Vout1 corresponding to the pressure chamber CB1 or to acquire the residual vibration signal Vout2 corresponding to the pressure chamber CB2, and the integrated circuit 201 in which the drive signal selection circuit 200 is mounted can be reduced in size.

Next, an example of a signal waveform of the residual vibration signal Vout obtained by combining the residual vibration signal Vout1 and the residual vibration signal Vout2 will be described.

Figure 17:
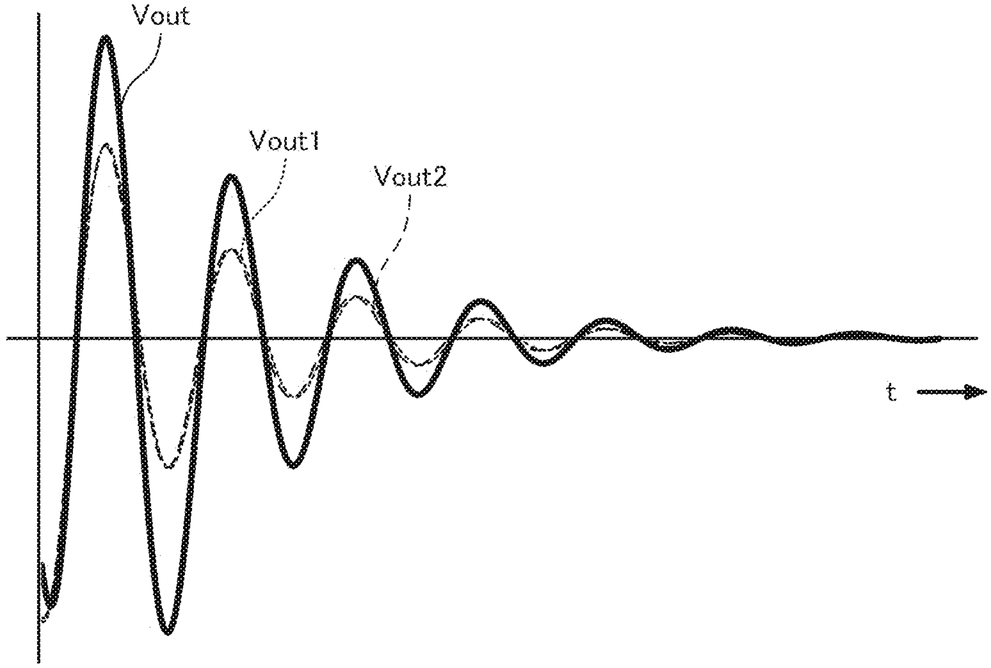
FIG. 17 is a diagram showing an example of a signal waveform of a residual vibration signal Vout when the ejector is normal.

FIG. 17 is a diagram showing an example of the signal waveform of the residual vibration signal Vout when the ejector 600 is normal. In FIG. 17, a horizontal axis represents time, and a vertical axis represents a magnitude of the residual vibration. The residual vibration signal Vout shown in FIG. 17 is an example of a signal waveform of the residual vibration signal Vout input to the drive signal selection circuit 200 when the pressure chamber CB1 corresponding to the piezoelectric element 60*a* is normal and the pressure chamber CB2 corresponding to the piezoelectric element 60*b* is normal. FIG. 17 also shows the residual vibration signal Vout1 and the residual vibration signal Vout2 together.

As shown in FIG. 17, when the pressure chamber CB1 corresponding to the piezoelectric element 60*a* is normal and the pressure chamber CB2 corresponding to the piezoelectric element 60*b* is normal, the residual vibration signal Vout1 output from the piezoelectric element 60*a* and the residual vibration signal Vout2 output from the piezoelectric element 60*b* are substantially equivalent in signal waveform. Specifically, when the drive voltage signal Vin is input to the piezoelectric elements 60*a* and 60*b*, the same residual vibration occurs in a region of the vibration plate 304 corresponding to the piezoelectric element 60*a* and a region of the vibration plate 304 corresponding to the piezoelectric element 60*b*. Therefore, when the pressure chamber CB1 corresponding to the piezoelectric element 60*a* is normal and the pressure chamber CB2 corresponding to the piezoelectric element 60*b* is normal, the residual vibration signal Vout1 and the residual vibration signal Vout2 are substantially equivalent in signal waveform. Therefore, the drive signal selection circuit 200 receives the residual vibration signal Vout that is a composite wave of the residual vibration signal Vout1 and the residual vibration signal Vout2, that has a period substantially equivalent to the period of the residual vibration signal Vout1 and the period of the residual vibration signal Vout2, and that has an amplitude larger than the amplitude of the residual vibration signal Vout1 and larger than the amplitude of the residual vibration signal Vout2.

Figure 18:
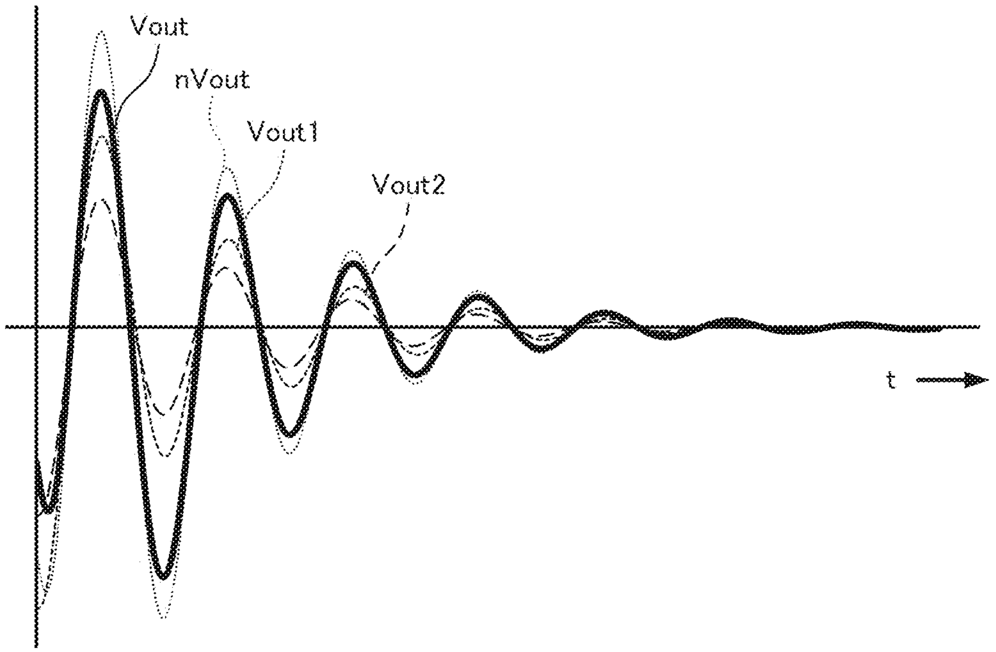
FIG. 18 is a diagram showing an example of a signal waveform of the residual vibration signal Vout when a viscosity increase abnormality occurs in the ejector.

FIG. 18 is a diagram showing an example of a signal waveform of the residual vibration signal Vout when the viscosity increase abnormality occurs in the ejector 600. In FIG. 18, a horizontal axis represents time, and a vertical axis represents a magnitude of the residual vibration. The residual vibration signal Vout shown in FIG. 18 is an example of a signal waveform of the residual vibration signal Vout input to the drive signal selection circuit 200 when the pressure chamber CB1 corresponding to the piezoelectric element 60*a* is normal, and the viscosity increase abnormality occurs in the ink retained in the pressure chamber CB2 corresponding to the piezoelectric element 60*b*. In addition to the residual vibration signal Vout1 and the residual vibration signal Vout2, FIG. 18 shows a residual vibration detection signal nVout corresponding to the residual vibration signal Vout when the ejector 600 is normal, which is shown in FIG. 17.

As shown in FIG. 18, when the pressure chamber CB1 corresponding to the piezoelectric element 60*a* is normal and the viscosity increase abnormality occurs in the pressure chamber CB2 corresponding to the piezoelectric element 60*b*, an amplitude of the residual vibration signal Vout2 output from the piezoelectric element 60*b* is smaller than an amplitude of the residual vibration signal Vout1 output from the piezoelectric element 60*a*. Specifically, the drive voltage signal Vin is input to the piezoelectric elements 60*a* and 60*b*. At this time, residual vibration generated in a region of the vibration plate 304 corresponding to the piezoelectric element 60*b* has a smaller amplitude than residual vibration generated in a region of the vibration plate 304 corresponding to the piezoelectric element 60*a*. Therefore, when the pressure chamber CB1 corresponding to the piezoelectric element 60*a* is normal and the viscosity increase abnormality occurs in the pressure chamber CB2 corresponding to the piezoelectric element 60*b*, the amplitude of the residual vibration signal Vout2 is smaller than the amplitude of the residual vibration signal Vout1. Therefore, the drive signal selection circuit 200 receives the residual vibration signal Vout that is a composite wave of the residual vibration signal Vout1 and the residual vibration signal Vout2, that has a period substantially equivalent to the period of the residual vibration signal Vout1 and the period of the residual vibration signal Vout2, and that has an amplitude smaller than the amplitude of the residual vibration detection signal nVout.

Figure 19:
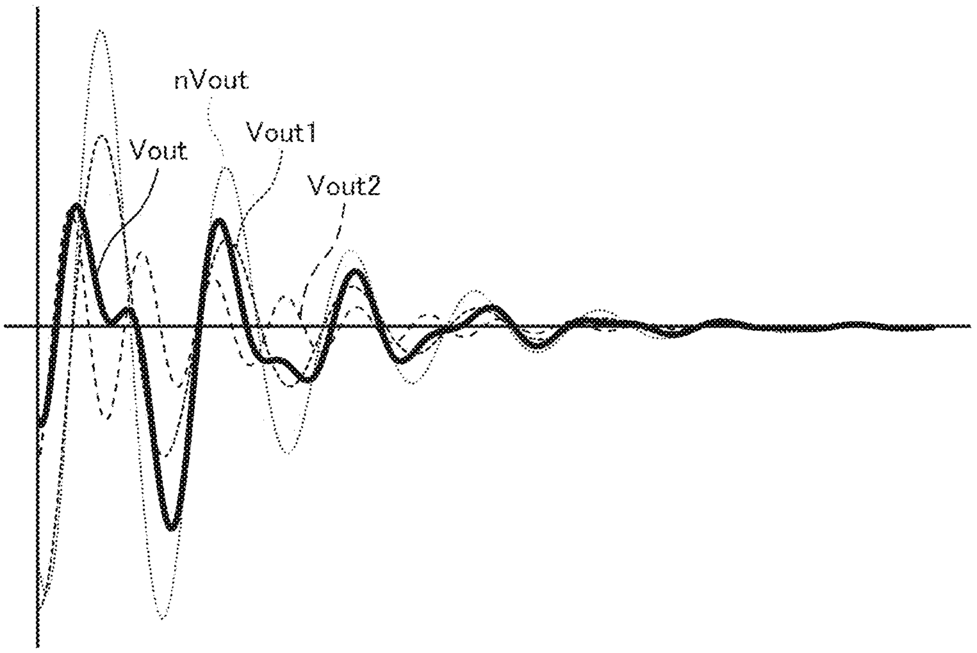
FIG. 19 is a diagram showing an example of a signal waveform of the residual vibration signal Vout when a bubble infiltration abnormality occurs in the ejector.

FIG. 19 is a diagram showing an example of a signal waveform of the residual vibration signal Vout when a bubble infiltration abnormality occurs in the ejector 600. In FIG. 19, a horizontal axis represents time, and a vertical axis represents a magnitude of the residual vibration. The residual vibration signal Vout shown in FIG. 19 is an example of a signal waveform of the residual vibration signal Vout input to the drive signal selection circuit 200 when the pressure chamber CB1 corresponding to the piezoelectric element 60*a* is normal, and the bubble infiltration abnormality occurs in the pressure chamber CB2 corresponding to the piezoelectric element 60*b*. In addition to the residual vibration signal Vout1 and the residual vibration signal Vout2, FIG. 19 shows the residual vibration detection signal nVout corresponding to the residual vibration signal Vout when the ejector 600 is normal, which is shown in FIG. 17.

As shown in FIG. 19, when the pressure chamber CB1 corresponding to the piezoelectric element 60*a* is normal, and the bubble infiltration abnormality occurs in the pressure chamber CB2 corresponding to the piezoelectric element 60*b*, the residual vibration signal Vout2 output from the piezoelectric element 60*b* has a higher frequency and a shorter period than a frequency and a period of the residual vibration signal Vout1 output from the piezoelectric element 60*a*. Specifically, the drive voltage signal Vin is input to the piezoelectric elements 60*a* and 60*b*. At this time, residual vibration generated in a region of the vibration plate 304 corresponding to the piezoelectric element 60*b* has a shorter period than residual vibration generated in a region of the vibration plate 304 corresponding to the piezoelectric element 60*a*. Therefore, when the pressure chamber CB1 corresponding to the piezoelectric element 60*a* is normal and the bubble infiltration abnormality occurs in the pressure chamber CB2 corresponding to the piezoelectric element 60*b*, a period of the residual vibration signal Vout2 is shorter than a period of the residual vibration signal Vout1. Therefore, the drive signal selection circuit 200 receives the residual vibration signal Vout that is a composite wave of the residual vibration signal Vout1 and the residual vibration signal Vout2, and that has a different period and a different frequency from the residual vibration detection signal nVout.

As described above, when the pressure chamber CB1 corresponding to the residual vibration signal Vout1 and the pressure chamber CB2 corresponding to the residual vibration signal Vout2 are both normal, both the period and the amplitude of the residual vibration signal Vout that is a composite wave of the residual vibration signal Vout1 and the residual vibration signal Vout2 are in predetermined ranges. On the other hand, when the viscosity of the ink retained in at least one of the pressure chamber CB1 corresponding to the residual vibration signal Vout1 and the pressure chamber CB2 corresponding to the residual vibration signal Vout2 increases, the amplitude of the residual vibration signal Vout is smaller than the amplitude when the pressure chamber CB1 corresponding to the residual vibration signal Vout1 and the pressure chamber CB2 corresponding to the residual vibration signal Vout2 are both normal, and further, when bubbles infiltrate at least one of the pressure chamber CB1 corresponding to the residual vibration signal Vout1 and the pressure chamber CB2 corresponding to the residual vibration signal Vout2, the period of the residual vibration signal Vout falls out of the predetermined range when the pressure chamber CB1 corresponding to the residual vibration signal Vout1 and the pressure chamber CB2 corresponding to the residual vibration signal Vout2 are both normal. That is, when an abnormality occurs in at least one of the pressure chamber CB1 corresponding to the residual vibration signal Vout1 and the pressure chamber CB2 corresponding to the residual vibration signal Vout2, the amplitude and the period of the residual vibration signal Vout are changed.

In the liquid ejection apparatus 1 according to the embodiment, the drive signal selection circuit 200 acquires and amplifies the residual vibration signal Vout to output the residual vibration detection signal NVT corresponding to the residual vibration signal Vout, and the waveform information output circuit 300 acquires the maximum voltage signal Vmax corresponding to the maximum voltage of the residual vibration detection signal NVT, the minimum voltage signal Vmin corresponding to the minimum voltage of the residual vibration detection signal NVT, and the period signal CYC corresponding to the period of the residual vibration detection signal NVT as the waveform information about the residual vibration detection signal NVT. Then, the waveform information output circuit 300 outputs the waveform information signal WFS including the acquired waveform information to the control circuit 100, and the control circuit 100 calculates at least one of the amplitude and the period of the residual vibration signal Vout according to the maximum voltage signal Vmax, the minimum voltage signal Vmin, and the period signal CYC contained in the input waveform information signal WFS, thereby determining an ejection state of the ink from the ejector 600 to be inspected.

The waveform information output circuit 300 may acquire various types of waveform information about the residual vibration detection signal NVT in addition to the maximum voltage signal Vmax, the minimum voltage signal Vmin, and the period signal CYC. Then, the control circuit 100 may determine an ejection state of the ink from the nozzle N provided in the ejector 600, that is, whether the ink is normally ejected from the nozzle N based on the acquired various types of waveform information in addition to the amplitude and the period of the residual vibration detection signal NVT calculated based on the maximum voltage signal Vmax, the minimum voltage signal Vmin, and the period signal CYC. Naturally, the amplitude of the residual vibration signal Vout includes an attenuation rate and the like that can be calculated from the amplitude, and the period of the residual vibration signal Vout includes a frequency, a phase, and the like that can be calculated based on the period.

Here, the ejection module 20 corresponds to a head unit, the drive waveform Bdp1 is an example of a drive signal, and the drive voltage signals ComB, COM, and Vin including the drive waveform Bdp1 are also examples of a drive signal. The pressure chamber CB1 is an example of a first pressure chamber, the pressure chamber CB2 is an example of a second pressure chamber, the residual vibration generated in the pressure chamber CB1 is an example of first residual vibration, the piezoelectric element 60*a* that outputs a signal corresponding to the residual vibration generated in the pressure chamber CB1 is an example of a first piezoelectric element, the residual vibration signal Vout1 which is a signal corresponding to the residual vibration generated in the pressure chamber CB1 and is output from the piezoelectric element 60*a* is an example of a first residual vibration signal, the residual vibration generated in the pressure chamber CB2 is an example of second residual vibration, the piezoelectric element 60*b* that outputs a signal corresponding to the residual vibration generated in the pressure chamber CB2 is an example of a second piezoelectric element, and the residual vibration signal Vout2 which is a signal corresponding to the residual vibration generated in the pressure chamber CB2 and is output from the piezoelectric element 60*b* is an example of a second residual vibration signal. The residual vibration signal Vout corresponding to the residual vibration signal Vout1 and the residual vibration signal Vout2 is an example of a composite residual vibration signal, the residual vibration detection circuit 240 and the waveform information output circuit 300 that acquire the residual vibration signal Vout are an example of a residual vibration signal acquisition circuit, the residual vibration detection circuit 240 is an example of a waveform shaping circuit, and the residual vibration detection signal NVT output from the residual vibration detection circuit 240 is an example of a shaped residual vibration signal. The dot formation period Cp is an example of a predetermined period, the maximum voltage value acquisition circuit 320 is an example of a first hold circuit, the maximum voltage signal Vmax is an example of a maximum residual vibration signal, the minimum voltage value acquisition circuit 330 is an example of a second hold circuit, the minimum voltage signal Vmin is an example of a minimum residual vibration signal, the period acquisition circuit 340 is an example of a periodic signal output circuit, and the periodic signal CYC is an example of a residual vibration periodic signal. The switches SW11 and SW13 are an example of a first reset circuit, the switches SW21 and SW23 are an example of a second reset circuit, and the voltage vrsf, which is the voltage signal VREF, is an example of threshold information. The control circuit 100 is an example of a determination circuit.

6. FUNCTIONS AND EFFECTS

In the liquid ejection apparatus 1 according to the embodiment configured as described above, the print head 21 includes the transfer gate 234*b* having one end configured to receive the drive voltage signal ComB including the drive waveform Bdp2 that causes the residual vibration in the ejector 600 and the other end electrically coupled to the ejector 600, and includes the residual vibration detection circuit 240 configured to output the residual vibration detection signal NVT according to the residual vibration signal Vout corresponding to the residual vibration generated in the ejector 600. In the print head 21, one end of the residual vibration detection circuit 240 is electrically coupled to one end of the transfer gate 234*b*, and the other end of the residual vibration detection circuit 240 is electrically coupled to the other end of the transfer gate 234*b*.

In the print head 21 configured as described above, the two ends of the transfer gate 234*b* have a potential difference corresponding to a resistance value of the on-resistance of the transfer gate 234*b* and the residual vibration signal Vout corresponding to the charges which is output from the piezoelectric elements 60*a* and 60*b* corresponding to the residual vibration generated in the ejector 600, and the residual vibration detection circuit 240 acquires the potential difference of the two ends of the transfer gate 234*b*. In this case, since the residual vibration detection circuit 240 acquires the potential difference between the two ends of the transfer gate 234*b*, the print head 21 does not need to control a conduction state of the transfer gate 234*b* to a specific state for acquiring the residual vibration signal Vout generated in the ejector 600. That is, in the print head 21 according to the embodiment, it is possible to acquire the residual vibration signal Vout generated in the ejector 600 without controlling the conduction state of the transfer gate 234*b* to a specific state for acquiring the residual vibration signal Vout corresponding to the residual vibration generated in the ejector 600. Accordingly, it is possible to further increase a detection speed of the residual vibration generated in the ejector 600 after the piezoelectric elements 60*a* and 60*b* are driven.

In the liquid ejection apparatus 1 according to the embodiment, the print head 21 includes the residual vibration detection circuit 240 corresponding to each of the m ejectors 600. Accordingly, the residual vibration signal Vout corresponding to the residual vibration generated in the ejector 600 after the piezoelectric elements 60*a* and 60*b* provided in each of the m ejectors 600 are driven can be individually acquired for each of the m ejectors 600. That is, it is possible to acquire in parallel the residual vibration signals Vout corresponding to the residual vibration generated in the ejectors 600 after the piezoelectric elements 60*a* and 60*b* provided in each of the m ejectors 600 are driven. Accordingly, it is possible to further increase the detection speed of the residual vibration generated in the ejector 600 after the piezoelectric elements 60*a* and 60*b* are driven.

Further, in the liquid ejection apparatus 1 according to the embodiment, in the print head 21, the residual vibration detection circuit 240 corresponding to each of the m ejectors 600 acquires the residual vibration signal Vout corresponding to a residual signal generated when the drive waveform Bdp1 for causing micro-vibration in the ejector 600 is supplied to the piezoelectric elements 60*a* and 60*b*. That is, the residual vibration detection circuit 240 acquires the residual vibration signal Vout corresponding to the residual vibration generated in a period in which no ink is ejected from the ejector 600. Accordingly, acquisition accuracy of the residual vibration signal Vout in the residual vibration detection circuit 240 is improved, and determination accuracy of the ejection state of the ink from the ejector 600 based on the acquired residual vibration signal Vout is improved.

In the liquid ejection apparatus 1 according to the embodiment configured as described above, in the ejection module 20, the piezoelectric element 60*a* provided in the print head 21 outputs the residual vibration signal Vout1 corresponding to the residual vibration generated according to a volume change of the pressure chamber CB1, and the piezoelectric element 60*b* outputs the residual vibration signal Vout2 corresponding to the residual vibration generated according to a volume change of the pressure chamber CB2. The residual vibration detection circuit 240 acquires the residual vibration signal Vout corresponding to the residual vibration signal Vout1 and the residual vibration signal Vout2, and outputs the residual vibration detection signal NVT obtained by shaping the signal waveform of the acquired residual vibration signal Vout, the maximum voltage value acquisition circuit 320 outputs the maximum voltage value of the residual vibration detection signal NVT in the dot formation period Cp as the maximum voltage signal Vmax, the minimum voltage value acquisition circuit 330 outputs the minimum voltage value of the residual vibration detection signal NVT in the dot formation period Cp as the minimum voltage signal Vmin, and the period acquisition circuit 340 outputs the period signal CYC corresponding to the period of the residual vibration detection signal NVT.

That is, the ejection module 20 according to the embodiment can directly acquire the amplitude and the period of the residual vibration detection signal NVT corresponding to the residual vibration signal Vout corresponding to the acquired residual vibration. Accordingly, in the ejection module 20 according to the embodiment, since the ejector 600 includes the pressure chamber CB1 and the pressure chamber CB2, even when it is difficult to acquire the amplitude and the period of the residual vibration signal Vout, it is possible to acquire the waveform information about the residual vibration detection signal NVT with high accuracy without performing processing such as AD conversion. Accordingly, in the ejection module 20 according to the embodiment, the waveform information about the residual vibration generated in the ejector 600 after the piezoelectric elements 60*a* and 60*b* are driven can be acquired with high accuracy and at high speed.

7. MODIFICATIONS

In the liquid ejection apparatus 1 according to the embodiment described above, an example of a configuration is described in which the ejector 600 that ejects ink includes the pressure chamber CB1 and the pressure chamber CB2, but the configuration of the ejector 600 that ejects ink is not limited thereto. For example, the ejector 600 may have a configuration in which one pressure chamber is provided for one nozzle N, or a configuration in which three pressure chambers are provided for one nozzle N. Even with such a configuration, the same functions and effects are obtained.

In the liquid ejection apparatus 1 according to the embodiment described above, the waveform information output circuit 300 acquires the maximum voltage signal Vmax corresponding to the maximum voltage value of the residual vibration detection signal NVT in the dot formation period Cp and the minimum voltage signal Vmin corresponding to the minimum voltage value of the residual vibration detection signal NVT in the dot formation period Cp. Alternatively, the waveform information output circuit 300 may acquire the maximum voltage signal Vmax corresponding to the maximum voltage value of the residual vibration detection signal NVT and the minimum voltage signal Vmin corresponding to the minimum voltage value for each vibration period of the residual vibration detection signal NVT, and calculate an amplitude attenuation rate as waveform information about the residual vibration detection signal NVT based on the acquired multiple maximum voltage signals Vmax and multiple minimum voltage signals Vmin.

Specifically, the reset circuit 310 provided in the waveform information output circuit 300 receives the periodic pulse signal CYP output from the comparator CP1 instead of or in addition to the latch signal LAT.

The reset circuit 310 controls the switch SW12 to be on for a certain period at a timing when the logic level of the input periodic pulse signal CYP changes from a high level to a low level, and then controls the switch SW12 to be off from on. The reset circuit 310 controls the switch SW12 to be off from on, then controls the switch SW11 to be on for a certain period, and then controls the switch SW11 to be off from on. Then, the reset circuit 310 controls the switch SW13 to be on for a certain period at a timing when the logic level of the input periodic pulse signal CYP changes from a low level to a high level, and then controls the switch SW13 to be off from on. Accordingly, the maximum voltage value acquisition circuit 320 holds the maximum voltage value at one end of the capacitor C13 for each vibration period of the residual vibration detection signal NVT, and the maximum voltage value is output as the maximum voltage signal Vmax from the maximum voltage value acquisition circuit 320.

The reset circuit 310 controls the switch SW22 to be on for a certain period at a timing when the logic level of the input periodic pulse signal CYP changes from a low level to a high level, and then controls the switch SW22 to be off from on. The reset circuit 310 controls the switch SW22 to be off from on, then controls the switch SW21 to be on for a certain period, and then controls the switch SW21 to be off from on. Then, the reset circuit 310 controls the switch SW23 to be on for a certain period at a timing when the logic level of the input periodic pulse signal CYP changes from a high level to a low level, and then controls the switch SW23 to be off from on. Accordingly, the minimum voltage value acquisition circuit 330 holds the minimum voltage value at one end of the capacitor C23 for each vibration period of the residual vibration detection signal NVT, and the minimum voltage value is output as the minimum voltage signal Vmin from the minimum voltage value acquisition circuit 330.

The control circuit 100 holds each of the maximum voltage signals Vmax output from the maximum voltage value acquisition circuit 320 during a period in which the periodic pulse signal CYP output from the comparator CP1 is at a low level, and holds each of the minimum voltage signals Vmin output from the minimum voltage value acquisition circuit 330 during a period in which the periodic pulse signal CYP output from the comparator CP1 is at a high level. Accordingly, the control circuit 100 can acquire the maximum voltage signal Vmax corresponding to the maximum voltage value and the minimum voltage signal Vmin corresponding to the minimum voltage value of the residual vibration detection signal NVT for each vibration period of the residual vibration detection signal NVT.

In the liquid ejection apparatus 1 according to the modification configured as described above, the attenuation rate of the amplitude of the residual vibration detection signal NVT can be calculated using both the maximum voltage value and the minimum voltage value of the residual vibration detection signal NVT. In this case, the control circuit 100 can acquire amplitude information about twice the amplitude in the case of calculating the attenuation rate of the amplitude of the residual vibration detection signal NVT using one of the maximum voltage value and the minimum voltage value of the residual vibration detection signal NVT. Accordingly, in addition to the above-described functions and effects, the attenuation rate of the amplitude of the residual vibration detection signal NVT serving as the waveform information can be accurately calculated, and as a result, the determination accuracy of the ejection state of the ink from the corresponding ejector 600 is further improved.

Although the embodiments and the modifications are described as above, the present disclosure is not limited to the embodiments and can be implemented in various aspects without departing from the gist thereof. For example, the above described embodiments can be combined as appropriate.

The present disclosure includes substantially the same configuration (for example, a configuration having the same function, method, and result, or a configuration having the same object and effect) as the configuration described in the embodiments. The disclosure includes configurations obtained by replacing non-essential portions of the configurations described in the embodiments. The disclosure includes configurations that can obtain the same functions and effects and configurations that can achieve the same object as the configurations described in the embodiments. The disclosure includes configurations obtained by adding a known technique to the configurations described in the embodiments.

The following configurations are derived from the embodiments described above.

A head unit according to a first aspect including:

a first pressure chamber whose volume changes according to a drive signal;

a second pressure chamber whose volume changes according to the drive signal;

a nozzle communicating with the first pressure chamber and the second pressure chamber and configured to allow a liquid to be ejected;

a first piezoelectric element configured to output a first residual vibration signal according to first residual vibration generated according to a volume change of the first pressure chamber;

a second piezoelectric element configured to output a second residual vibration signal according to second residual vibration generated according to a volume change of the second pressure chamber; and a residual vibration signal acquisition circuit configured to acquire a composite residual vibration signal corresponding to the first residual vibration signal and the second residual vibration signal, wherein the residual vibration signal acquisition circuit includes a waveform shaping circuit configured to output a shaped residual vibration signal obtained by shaping a signal waveform of the composite residual vibration signal, a first hold circuit configured to hold a maximum value of the shaped residual vibration signal in a predetermined period as a maximum residual vibration signal, a second hold circuit configured to hold a minimum value of the shaped residual vibration signal in the predetermined period as a minimum residual vibration signal, and a period signal output circuit configured to output a residual vibration period signal according to a period of the shaped residual vibration signal.

According to the head unit, the residual vibration signal acquisition circuit configured to acquire the composite residual vibration signal corresponding to the first residual vibration signal and the second residual vibration signal includes the waveform shaping circuit configured to output the shaped residual vibration signal obtained by shaping a signal waveform of the composite residual vibration signal, the first hold circuit configured to hold the maximum value of the shaped residual vibration signal in the predetermined period as the maximum residual vibration signal, the second hold circuit configured to hold the minimum value of the shaped residual vibration signal in the predetermined period as the minimum residual vibration signal, and the period signal output circuit configured to output the residual vibration period signal according to the period of the shaped residual vibration signal, so that an amplitude and a period of the composite residual vibration signal which is waveform information about the composite residual vibration signal corresponding to the first residual vibration signal and the second residual vibration signal can be directly acquired without performing processing such as AD conversion. Accordingly, the waveform information about the composite residual vibration signal can be acquired at high speed and with high accuracy.

In the head unit according to the first aspect, the first piezoelectric element and the second piezoelectric element may be displaced according to the drive signal, the volume of the first pressure chamber may change according to the displacement of the first piezoelectric element, and the volume of the second pressure chamber may change according to the displacement of the second piezoelectric element.

According to the head unit, the first piezoelectric element changes the volume of the first pressure chamber and acquires the first residual vibration signal, the second piezoelectric element changes the volume of the second pressure chamber and acquires the second residual vibration signal, so that there is no need to provide a configuration dedicated to change the volume of the first pressure chamber and a configuration dedicated to change the volume of the second pressure chamber separately, and as a result, the print head can be reduced in size.

In the head unit according to the first aspect, the residual vibration signal acquisition circuit may include a first reset circuit configured to reset the maximum value of the shaped residual vibration signal held by the first hold circuit, and a second reset circuit configured to reset the minimum value of the shaped residual vibration signal held by the second hold circuit.

In the head unit according to the first aspect, the period signal output circuit may output the residual vibration period signal according to a comparison result between threshold information stored in a storage circuit and the shaped residual vibration signal.

The head unit according to the first aspect, further including:

a determination circuit configured to determine an ejection state of the liquid from the nozzle, in which the determination circuit may determine the ejection state of the liquid from the nozzle according to the maximum residual vibration signal, the minimum residual vibration signal, and the residual vibration period signal.

A liquid ejection apparatus according to a second aspect including:

a drive circuit configured to output a drive signal;

a first pressure chamber whose volume changes according to the drive signal;

a second pressure chamber whose volume changes according to the drive signal;

a nozzle communicating with the first pressure chamber and the second pressure chamber and configured to allow a liquid to be ejected;

a first piezoelectric element configured to output a first residual vibration signal according to first residual vibration generated according to a volume change of the first pressure chamber;

a second piezoelectric element configured to output a second residual vibration signal according to second residual vibration generated according to a volume change of the second pressure chamber; and a residual vibration signal acquisition circuit configured to acquire a composite residual vibration signal corresponding to the first residual vibration signal and the second residual vibration signal, wherein the residual vibration signal acquisition circuit includes a waveform shaping circuit configured to output a shaped residual vibration signal obtained by shaping a signal waveform of the composite residual vibration signal, a first hold circuit configured to hold a maximum value of the shaped residual vibration signal in a predetermined period as a maximum residual vibration signal, a second hold circuit configured to hold a minimum value of the shaped residual vibration signal in the predetermined period as a minimum residual vibration signal, and a period signal output circuit configured to output a residual vibration period signal according to a period of the shaped residual vibration signal.

According to the liquid ejection apparatus, the residual vibration signal acquisition circuit configured to acquire the composite residual vibration signal corresponding to the first residual vibration signal and the second residual vibration signal includes the waveform shaping circuit configured to output the shaped residual vibration signal obtained by shaping a signal waveform of the composite residual vibration signal, the first hold circuit configured to hold the maximum value of the shaped residual vibration signal in the predetermined period as the maximum residual vibration signal, the second hold circuit configured to hold the minimum value of the shaped residual vibration signal in the predetermined period as the minimum residual vibration signal, and the period signal output circuit configured to output the residual vibration period signal according to the period of the shaped residual vibration signal, so that an amplitude and a period of the composite residual vibration signal which is waveform information about the composite residual vibration signal corresponding to the first residual vibration signal and the second residual vibration signal can be directly acquired without performing processing such as AD conversion. Accordingly, the waveform information about the composite residual vibration signal can be acquired at high speed and with high accuracy.

In the liquid ejection apparatus according to the second aspect, the first piezoelectric element and the second piezoelectric element may be displaced according to the drive signal, the volume of the first pressure chamber may change according to the displacement of the first piezoelectric element, and the volume of the second pressure chamber may change according to the displacement of the second piezoelectric element.

According to the liquid ejection apparatus, the first piezoelectric element changes the volume of the first pressure chamber and acquires the first residual vibration signal, the second piezoelectric element changes the volume of the second pressure chamber and acquires the second residual vibration signal, so that there is no need to provide a configuration dedicated to change the volume of the first pressure chamber and a configuration dedicated to change the volume of the second pressure chamber separately, and as a result, the print head can be reduced in size.

In the liquid ejection apparatus according to the second aspect, the residual vibration signal acquisition circuit may include a first reset circuit configured to reset the maximum value of the shaped residual vibration signal held by the first hold circuit, and a second reset circuit configured to reset the minimum value of the shaped residual vibration signal held by the second hold circuit.

In the liquid ejection apparatus according to the second aspect, the period signal output circuit may output the residual vibration period signal according to a comparison result between threshold information stored in a storage circuit and the shaped residual vibration signal.

The liquid ejection apparatus according to the second aspect, further including:

a determination circuit configured to determine an ejection state of the liquid from the nozzle, in which the determination circuit may determine the ejection state of the liquid from the nozzle according to the maximum residual vibration signal, the minimum residual vibration signal, and the residual vibration period signal.

What is claimed is:

1. A head unit comprising:

a first pressure chamber whose volume changes according to a drive signal;

a second pressure chamber whose volume changes according to the drive signal;

a nozzle communicating with the first pressure chamber and the second pressure chamber and configured to allow a liquid to be ejected;

a first piezoelectric element configured to output a first residual vibration signal according to first residual vibration generated according to a volume change of the first pressure chamber;

a second piezoelectric element configured to output a second residual vibration signal according to second residual vibration generated according to a volume change of the second pressure chamber; and a residual vibration signal acquisition circuit configured to acquire a composite residual vibration signal corresponding to the first residual vibration signal and the second residual vibration signal, wherein the residual vibration signal acquisition circuit includes a waveform shaping circuit configured to output a shaped residual vibration signal obtained by shaping a signal waveform of the composite residual vibration signal, a first hold circuit configured to hold a maximum value of the shaped residual vibration signal in a predetermined period as a maximum residual vibration signal, a second hold circuit configured to hold a minimum value of the shaped residual vibration signal in the predetermined period as a minimum residual vibration signal, and a period signal output circuit configured to output a residual vibration period signal according to a period of the shaped residual vibration signal.

2. The head unit according to claim 1, wherein the first piezoelectric element and the second piezoelectric element are displaced according to the drive signal, the volume of the first pressure chamber changes according to the displacement of the first piezoelectric element, and the volume of the second pressure chamber changes according to the displacement of the second piezoelectric element.

3. The head unit according to claim 1, wherein the residual vibration signal acquisition circuit includes a first reset circuit configured to reset the maximum value of the shaped residual vibration signal held by the first hold circuit, and a second reset circuit configured to reset the minimum value of the shaped residual vibration signal held by the second hold circuit.

4. The head unit according to claim 3, wherein the period signal output circuit outputs the residual vibration period signal according to a comparison result between threshold information stored in a storage circuit and the shaped residual vibration signal.

5. The head unit according to claim 1, further comprising:

a determination circuit configured to determine an ejection state of the liquid from the nozzle, wherein the determination circuit determines the ejection state of the liquid from the nozzle according to the maximum residual vibration signal, the minimum residual vibration signal, and the residual vibration period signal.

6. A liquid ejection apparatus comprising:

a drive circuit configured to output a drive signal;

a first pressure chamber whose volume changes according to the drive signal;

a second pressure chamber whose volume changes according to the drive signal;

a nozzle communicating with the first pressure chamber and the second pressure chamber and configured to allow a liquid to be ejected;

a first piezoelectric element configured to output a first residual vibration signal according to first residual vibration generated according to a volume change of the first pressure chamber;

a second piezoelectric element configured to output a second residual vibration signal according to second residual vibration generated according to a volume change of the second pressure chamber; and a residual vibration signal acquisition circuit configured to acquire a composite residual vibration signal corresponding to the first residual vibration signal and the second residual vibration signal, wherein the residual vibration signal acquisition circuit includes a waveform shaping circuit configured to output a shaped residual vibration signal obtained by shaping a signal waveform of the composite residual vibration signal, a first hold circuit configured to hold a maximum value of the shaped residual vibration signal in a predetermined period as a maximum residual vibration signal, a second hold circuit configured to hold a minimum value of the shaped residual vibration signal in the predetermined period as a minimum residual vibration signal, and a period signal output circuit configured to output a residual vibration period signal according to a period of the shaped residual vibration signal.

7. The liquid ejection apparatus according to claim 6, wherein the first piezoelectric element and the second piezoelectric element are displaced according to the drive signal, the volume of the first pressure chamber changes according to the displacement of the first piezoelectric element, and the volume of the second pressure chamber changes according to the displacement of the second piezoelectric element.

8. The liquid ejection apparatus according to claim 6, wherein the residual vibration signal acquisition circuit includes a first reset circuit configured to reset the maximum value of the shaped residual vibration signal held by the first hold circuit, and a second reset circuit configured to reset the minimum value of the shaped residual vibration signal held by the second hold circuit.

9. The liquid ejection apparatus according to claim 8, wherein the period signal output circuit outputs the residual vibration period signal according to a comparison result between threshold information stored in a storage circuit and the shaped residual vibration signal.

10. The liquid ejection apparatus according to claim 6, further comprising:

a determination circuit configured to determine an ejection state of the liquid from the nozzle, wherein the determination circuit determines the ejection state of the liquid from the nozzle according to the maximum residual vibration signal, the minimum residual vibration signal, and the residual vibration period signal.

* * * * *